(12) United States Patent
Ishibashi

(10) Patent No.: US 7,643,228 B2
(45) Date of Patent: Jan. 5, 2010

(54) OPTICAL SYSTEM AND OPTICAL APPARATUS INCLUDING OPTICAL SYSTEM

(75) Inventor: Tomohiko Ishibashi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 11/949,494

(22) Filed: Dec. 3, 2007

(65) Prior Publication Data

US 2008/0130141 A1 Jun. 5, 2008

(30) Foreign Application Priority Data

| Dec. 4, 2006 | (JP) | ............................. 2006-326868 |
| Feb. 16, 2007 | (JP) | ............................. 2007-035936 |
| May 24, 2007 | (JP) | ............................. 2007-137748 |

(51) Int. Cl.
G02B 15/14 (2006.01)
G02B 9/04 (2006.01)

(52) U.S. Cl. .................. 359/793; 359/687; 359/689; 359/690; 359/795

(58) Field of Classification Search ......... 359/784–785, 359/771–772, 774, 680–692, 755–758, 713–716, 359/793–795, 797; 348/349, 240.99–240.3; 396/72–88
See application file for complete search history.

(56) References Cited

U.S. PATENT DOCUMENTS

| 4,241,983 A | 12/1980 | Kitagishi |
| 4,348,084 A | 9/1982 | Kitagishi |
| 4,913,535 A | 4/1990 | Robb |
| 5,731,907 A | 3/1998 | Sigler |
| 6,115,188 A | 9/2000 | Nishio |
| 7,136,237 B2 | 6/2005 | Ogawa |
| 7,057,831 B2 | 8/2005 | Ogawa |
| 7,116,497 B2 | 11/2005 | Endo |
| 7,193,789 B2 | 5/2006 | Maetaki |
| 7,164,544 B2 | 12/2006 | Ogawa |
| 7,292,398 B1 * | 11/2007 | Misaka ........................ 359/781 |
| 7,304,805 B2 * | 12/2007 | Endo et al. ................... 359/690 |
| 7,480,102 B2 * | 1/2009 | Yokoyama ................... 359/676 |
| 2007/0014025 A1 | 1/2007 | Yokoyama |
| 2009/0185282 A1 * | 7/2009 | Ishibashi ..................... 359/687 |

FOREIGN PATENT DOCUMENTS

| JP | 06-082689 | 3/1994 |
| JP | 2002-287031 | 10/2002 |

* cited by examiner

*Primary Examiner*—Darryl J Collins
*Assistant Examiner*—Zachary Wilkes
(74) *Attorney, Agent, or Firm*—Canon USA Inc IP Div

(57) ABSTRACT

An optical system includes a first optical element and a second optical element on at least one of an enlargement side and a reduction side relative to a point P at which a light axis and a paraxial chief ray intersect. Each of the first optical element and second optical element is composed of a solid material having a refractive light incident surface and a refractive light emergent surface. The optical system satisfies the following conditional expressions: $\Delta\theta gF1 > 0.0272$, $\Delta\theta gF2 < -0.0278$, and $f1 \times f2 < 0$ where $\Delta\theta gF1$ and $\Delta\theta gF2$ denote anomalous partial dispersion values of the first and second optical elements for the g-line and F-line, respectively, and $f1$ and $f2$ denote focal lengths of the first and second optical elements, respectively, when the light incident surfaces and the light emergent surfaces of the first and second optical elements are in contact with air.

25 Claims, 43 Drawing Sheets

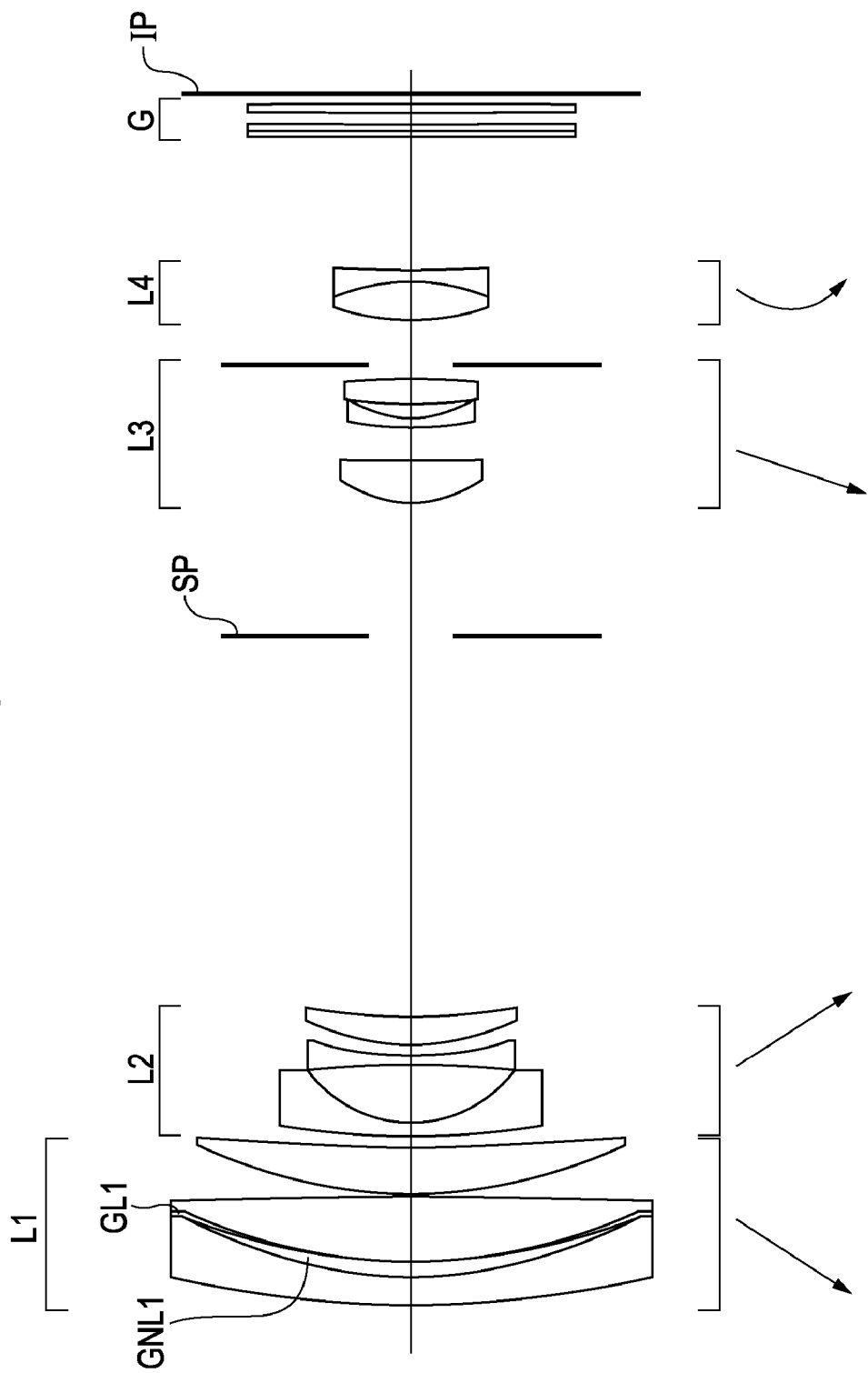

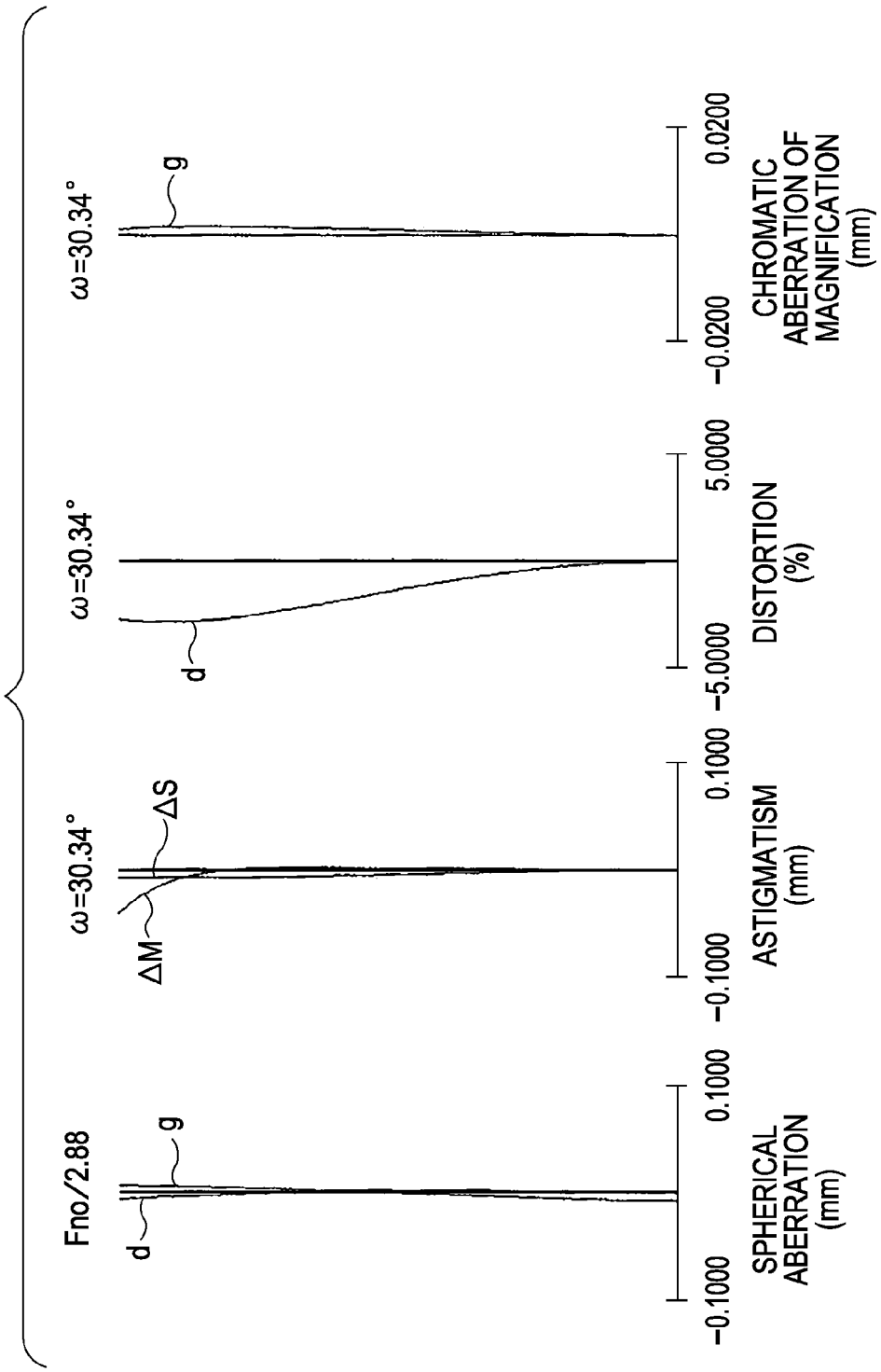

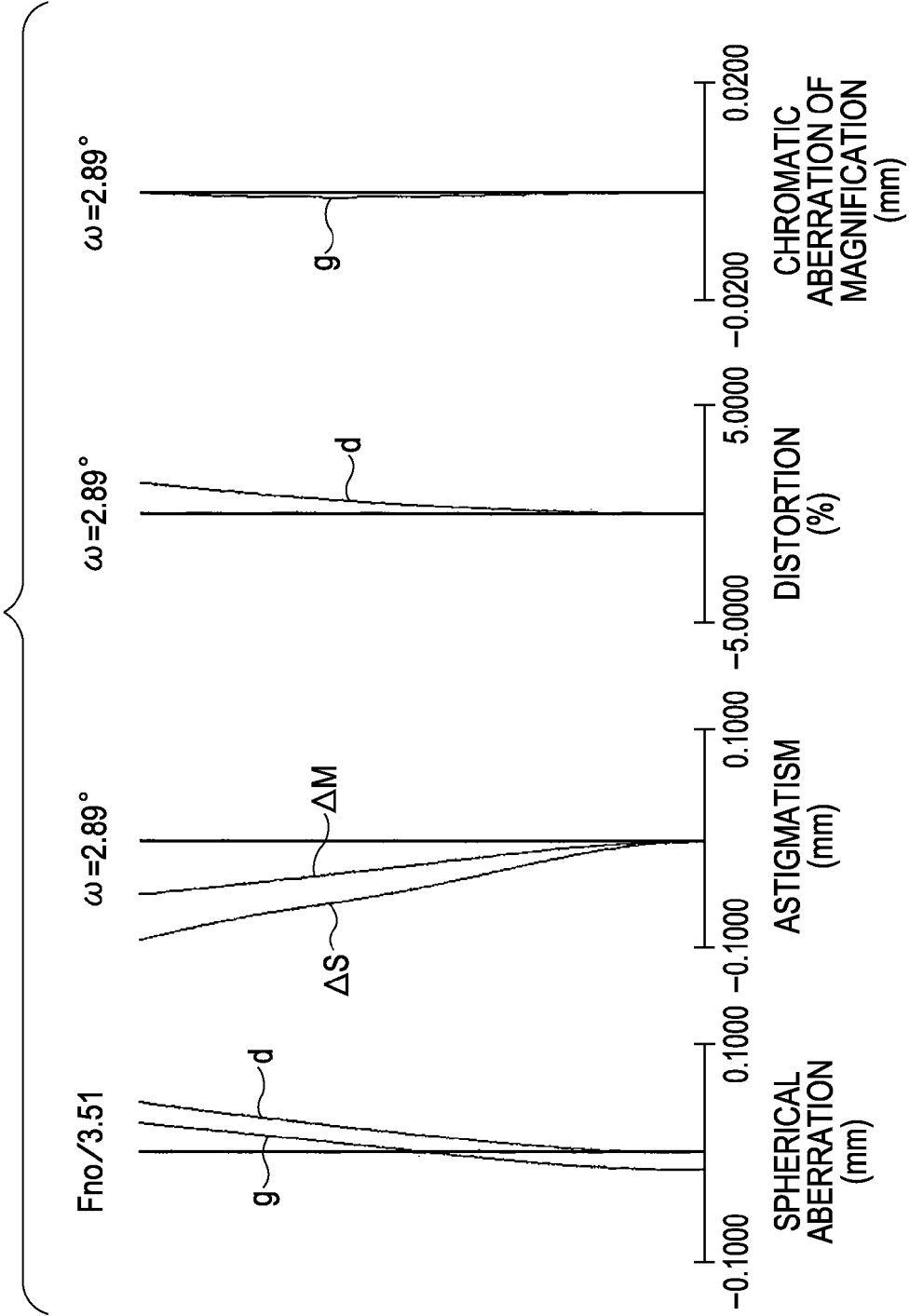

OPTICAL SYSTEM AND OPTICAL APPARATUS INCLUDING OPTICAL SYSTEM

BACKGROUND OF THE INVENTION

1. Field of the Invention

The present invention relates to an optical system and, in particular, an optical system suitable for optical apparatuses, such as silver-halide film cameras, digital still cameras, video cameras, digital video cameras, telescopes, binoculars, projectors, and copying machines.

2. Description of the Related Art

Optical systems used for optical apparatuses, such as digital cameras and video cameras, need to have a short total lens length (optical length: the length between the first lens surface on the object side and the image plane) and the short length of the optical systems. In general, as the size of an optical system decreases, the aberrations and, in particular, the axial chromatic aberration and the chromatic aberration of magnification of the optical system significantly increase. Thus, the optical performance of the optical system decreases.

In telephoto optical systems having a short total lens length, as the focal length increases, chromatic aberration increases. A telephoto optical system that corrects the chromatic aberration by using an anomalous partial dispersion material is described in, for example, U.S. Pat. Nos. 4,241,983, 4,348,084, and 6,115,188.

In addition, retrofocus optical systems are known that have a short focal length and a long back focus of the optical system. In a retrofocus optical system, a lens group having a negative refractive power is disposed in the front portion of the optical system (on the object side for photo-taking lens systems, such as cameras, and on a screen side (an enlargement side) for projection optical systems, such as projectors). In addition, a lens group having a positive refractive power is disposed in the rear portion of the optical system (on the image side for photo-taking lens systems, such as cameras, and on an original image side (a reduction side) for projection optical systems, such as projectors). Using such a structure, an optical system having a long back focus can be achieved.

However, retrofocus optical systems have an asymmetric refractive power arrangement with respect to an aperture stop. Thus, a negative distortion aberration (barrel distortion aberration) and chromatic aberration of magnification tend to occur. To correct the chromatic aberration of magnification of retrofocus optical systems, an anomalous partial dispersion material, such as fluorite, is used for a lens group on the reduction side, in which a height at which a paraxial chief ray passes through the lens surface from the light axis is relatively high (refer to, for example, Japanese Patent Laid-Open Nos. 06-082689 and 2002-287031).

In addition, the chromatic aberration of magnification of optical systems can be corrected using a liquid material having a high dispersion characteristic and an anomalous partial dispersion characteristic (refer to, for example, U.S. Pat. Nos. 4,913,535 and 5,731,907).

Furthermore, the chromatic aberration of magnification of optical systems can be corrected using a solid material composed of a mixture of a transparent material and indium tin oxide (ITO) fine particles dispersed therein (refer to, for example, U.S. Pat. Nos. 7,136,237, 7,057,831, and 7,116,497).

Still furthermore, the chromatic aberration of magnification of optical systems can be corrected using a solid material composed of a mixture of a transparent material and TiO$_2$ fine particles dispersed therein or a solid material made of resin (refer to, for example, U.S. Pat. Nos. 7,193,789, 7,164,544, and 2007/0014025).

The optical systems using fluorite for the optical material and having a relatively large lens length can be easily corrected for chromatic aberration of magnification. However, as the lens length decreases, occurrence of chromatic aberration of magnification significantly increases. It is difficult to sufficiently correct such a chromatic aberration. This is because chromatic aberration occurring in a front lens unit of a telephoto optical system having a positive refractive power or chromatic aberration occurring in a lens unit of a retrofocus optical system disposed closer to the reduction side than the aperture stop and having a positive refractive power is simply reduced by using a low dispersion characteristic and an anomalous partial dispersion characteristic of the material of the lens, such as fluorite.

For example, for a fluorite lens using low-dispersion glass having a large Abbe number, in order to correct chromatic aberration that is increased by reducing the length of the optical system, the refractive power of the lens surface needs to be significantly changed. However, if the refractive power of the lens surface is significantly changed, a variety of aberrations, such as spherical aberration, coma aberration, and astigmatism aberration, occur. Accordingly, it is difficult to correct chromatic aberration and other aberrations at the same time. In addition, the fabrication of a glass material having an anomalous partial dispersion characteristic (such as fluorite) is significantly difficult. Furthermore, since the surface of the glass material is easily damaged, the usage of the glass material is limited for some parts of the optical system.

Since the materials described in U.S. Pat. Nos. 4,913,535 and 5,731,907 are liquid, a structure to enclose the materials is needed. Thus, when these materials are used for an optical system, the fabrication of the optical system is difficult. In addition, characteristics, such as the index of refraction and dispersion significantly vary with a change in temperature, and therefore, the resistance to the surrounding environment is not sufficient. Furthermore, since the interface with air cannot be obtained, it is difficult to sufficiently correct chromatic aberration.

The transmittance of the solid material having an anomalous partial dispersion characteristic by dispersing ITO fine particles or TiO$_2$ fine particles in a transparent material is relatively low, compared with a widely used optical material. To prevent a decrease in transmittance of the entire optical system, it is desirable that the thickness of the solid material in the light axis direction is reduced. However, in order to sufficiently correct chromatic aberration using the solid material, a certain thickness is required. As the thickness of the solid material in the optical path increases, variation in the optical performance increases in the use environment. Thus, the resistance to the surrounding environment deteriorates. In addition, it is difficult to mold a thick solid material. Accordingly, the fabrication of an optical system is not easy. Therefore, when an optical element composed of a solid material having an anomalous partial dispersion characteristic is used for a lens or a layer having a refractive power in an optical system, it can be useful that chromatic aberration is corrected while reducing the thickness of the optical element in the light axis direction.

SUMMARY OF THE INVENTION

The present invention is directed to an optical system that can sufficiently correct a variety of aberrations including chromatic aberration, that can be easily fabricated, and that has an excellent resistance to the surrounding environment, and an optical apparatus including the optical system.

According to an embodiment of the present invention, an optical system includes a first optical element and a second optical element on at least one of an enlargement side and a reduction side relative to a point P at which a light axis and a paraxial chief ray intersect. Each of the first optical element and second optical element includes a solid material having a refractive light incident surface and a refractive light emergent surface. The optical system satisfies the following conditional expressions:

$\Delta\theta gF1 > 0.0272,$ $\Delta\theta gF2 < -0.0278,$ and $f1 \times f2 < 0,$ where $\Delta\theta gF1$ and $\Delta\theta gF2$ denote anomalous partial dispersion values of the first optical element and the second optical element for the Fraunhofer g-line and F-line, respectively, and f1 and f2 denote focal lengths of the first optical element and the second optical element, respectively, when the light incident surfaces and the light emergent surfaces of the first optical element and the second optical element are in contact with air.

Further features of the present invention will become apparent from the following description of exemplary embodiments with reference to the attached drawings.

BRIEF DESCRIPTION OF THE DRAWINGS

FIG. 1 is a cross-sectional view of an optical system according to a first numerical embodiment of the present invention.

FIG. 2A is an aberration diagram according to the first numerical embodiment.

FIG. 2C is an aberration diagram according to the first numerical embodiment.

DESCRIPTION OF THE EMBODIMENTS

Figure 2B:
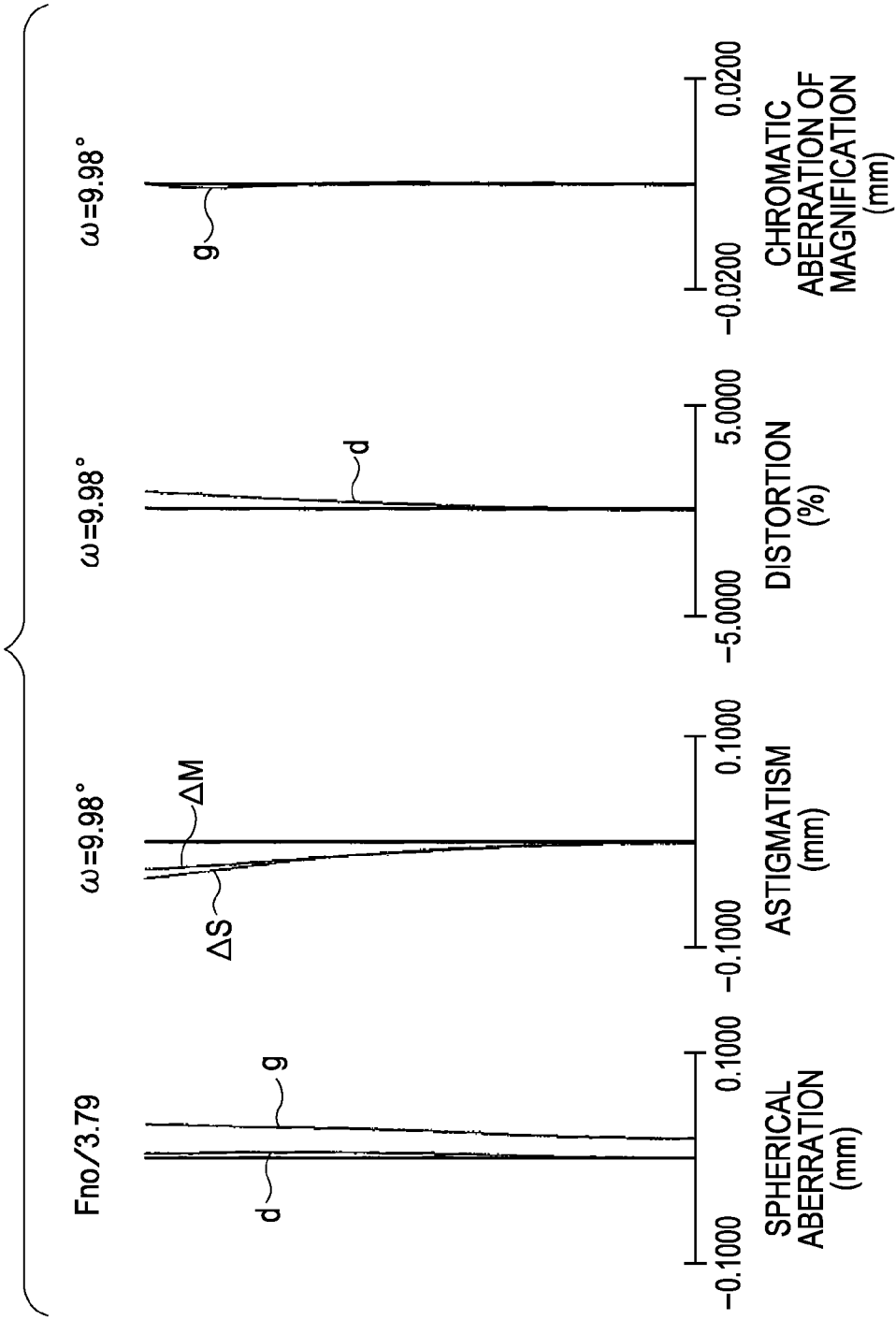
FIG. 2B is an aberration diagram according to the first numerical embodiment.

Zoom lenses and image pickup apparatuses including the zoom lenses according to exemplary embodiments of the present invention are described below with reference to the accompanying drawings.

First Exemplary Embodiment

According to a first exemplary embodiment, an optical system includes a refractive optical element (hereinafter also referred to as an "optical element") obtained by providing a refractive function to a solid material that satisfies the following conditions.

As used herein, the term "solid material" of the refractive optical element refers to a material that is solid in a use environment of the optical system. Accordingly, the material may be in any state before the optical system is in use (e.g., during a fabrication period). For example, even when the material is liquid during a fabrication period, the material is referred to as a "solid material" if the liquid material is cured into a solid material.

The features of an optical system OL according to the present embodiment is as follows.

A paraxial marginal ray is a paraxial ray that, when the focal length of the entire optical system is normalized to "1", travels parallel to the light axis of the optical system at a height of "1" from the light axis and is made incident on the optical system. Hereinafter, it is assumed that an object is disposed on the left side of the optical system, and a light ray made incident on the optical system from the object side travels from the left to the right. A paraxial chief ray is a paraxial ray that, when the focal length of the entire optical system is normalized to "1", passes through an intersection between the entrance pupil and the light axis of the optical system among light rays made incident on the optical system at an angle of −45° with respect to the light axis. The incident angle of a ray is positive if the ray is measured from the light axis in a clockwise direction, while the incident angle is negative if the ray is measured from the light axis in a counterclockwise direction. The intersecting point of a light axis La and a paraxial chief ray R is defined as "P".

The optical system OL includes a first optical element GNL1 and a second optical element GL1 on at least one of the enlargement side and the reduction side relative to the point P. Each of the first optical element GNL1 and the second optical element GNL2 has a refractive light incident surface and a refractive light emergent surface and is made of a solid material. Let $\Delta\theta gF1$ and $\Delta\theta gF2$ denote the anomalous partial dispersion values of the first optical element GNL1 and the second optical element GL1 for the Fraunhofer g-line and F-line, respectively.

Let f1 and f2 denote the focal lengths of the first optical element GNL1 and the second optical element GL1 when the light incident surfaces and the light emergent surfaces of the first optical element GNL1 and the second optical element GL1 are in contact with air.

Let $\Delta\theta gd1$ and $\Delta\theta gd2$ denote the anomalous partial dispersion values of the first optical element GNL1 and the second optical element GL1 for the Fraunhofer g-line and d-line, respectively.

Let vd1 and vd2 denote the Abbe numbers of the solid materials of the first optical element GNL1 and the second optical element GL1, respectively.

Then, at least one of the following conditions is satisfied:

$$\Delta\theta gF1 > 0.0272 \quad (1)$$

$$\Delta\theta gF2 < -0.0278 \quad (2)$$

$$\Delta\theta gd1 > 0.038 \quad (3)$$

$$\Delta\theta gd2 < -0.037 \quad (4)$$

$$vd1 < 60 \quad (5)$$

$$vd2 < 60 \quad (6)$$

$$f1 \times f2 < 0 \quad (7)$$

For the solid material of the optical element used in the optical system according to the present embodiment, the Abbe number vd, the relative partial dispersion $\theta gd$ for the Fraunhofer g-line and d-line, and the relative partial dispersion $\theta gF$ for the Fraunhofer g-line and F-line are defined as follows:

$$vd = (Nd-1)/(NF-NC)$$

$$\theta gd = (Ng-Nd)/(NF-NC)$$

$$\theta gF = (Ng-NF)/(NF-NC)$$

where Ng, NF, Nd, and NC denote the indices of refraction of the solid material for the Fraunhofer g-line (wavelength=435.8 nm), the Fraunhofer F-line (wavelength=486.1 nm), the Fraunhofer d-line (wavelength=587.6 nm), and the Fraunhofer C-line (wavelength=656.3 nm), respectively.

In general, the relative partial dispersions $\theta gd$ and $\theta gF$ of the solid material used for a lens unit are approximated as follows:

$$\theta gd = -1.687 \times 10^{-7} vd^3 + 5.702 \times 10^{-5} vd^2 - 6.603 \times 10^{-3} vd + 1.462$$

$$\theta gF = -1.665 \times 10^{-7} vd^3 + 5.213 \times 10^{-5} vd^2 - 5.656 \times 10^{-3} vd + 0.7278$$

Here, the anomalous partial dispersion values $\Delta\theta gd$ and $\Delta\theta gF$ are expressed as follows:

$$\Delta\theta gd = \theta gd - (-1.687 \times 10^{-7} vd^3 + 5.702 \times 10^{-5} vd^2 - 6.603 \times 10^{-3} vd + 1.462)$$

$$\Delta\theta gF = \theta gF - (-1.665 \times 10^{-7} vd^3 + 5.213 \times 10^{-5} vd^2 - 5.656 \times 10^{-3} vd + 0.7278)$$

According to the present embodiment, the optical system OL includes refractive optical elements having refractive powers. That is, the optical system OL includes at least one first optical element GNL1 that is composed of a solid material having high dispersion and high relative partial dispersion and at least one second optical element GL1 that is composed of a solid material having high dispersion and low relative partial dispersion.

As used herein, the term "refractive optical element" refers to an optical element, such as a refractive lens, that produces refractive power using a refracting effect. Thus, a diffractive optical element that produces refractive power using a diffracting effect is not included in the category of the term "refractive optical element".

By employing at least one first optical element GNL1 composed of a solid material that satisfies conditional expression (1) and at least one second optical element GL1 composed of a solid material that satisfies conditional expression (2), chromatic aberration of the optical system in the entire range of the wavelength of visible light can be sufficiently corrected.

By satisfying conditional expressions (3) and (4), chromatic aberration of the optical system in the range of a short wavelength to a medium wavelength can easily and sufficiently be corrected. In this way, chromatic aberration can be further sufficiently corrected in a wide wavelength range from a short wavelength to a long wavelength.

By employing solid materials that satisfy conditional expressions (5) and (6), chromatic aberration of the optical system can easily be corrected.

By configuring the first optical element GNL1 and the second optical element GL1 so that conditional expression (7) is satisfied, chromatic aberration of the optical system in a wide wavelength range can sufficiently be corrected.

According to the present embodiment, when the first optical element GNL1 and the second optical element GL1 are provided in the optical system, both optical elements can be disposed in the same lens group. At that time, the first optical element GNL1 and the second optical element GL1 may be cemented.

In addition, at least one of the surfaces of the first optical element GNL1 and the second optical element GL1 can be aspherical in order to correct the aberrations.

Furthermore, at least one of the surfaces of the first optical element GNL1 and the second optical element GL1 can be in contact with air in order to correct the aberrations.

Examples of the solid material (hereinafter also referred to as an "optical material") that satisfies conditional expression (1) include a variety of resins. Among the variety of resins, a UV-curable resin (Nd=1.63, vd=22.7, and θgF=0.69) and N-polyvinyl carbazole (Nd=1.696, vd=17.7, and θgF=0.69) are typical optical materials that satisfy conditional expression (1). However, in addition to these materials, any solid material that satisfies conditional expression (1) can be employed.

In addition, an optical material having a characteristic that is different from that of a widely used glass material can be used. Examples of such an optical material include a mixture of a synthetic resin and inorganic oxide nanoparticles dispersed therein. Examples of the inorganic oxide nanoparticles include $TiO_2$ particles (Nd=2.304 and vd=13.8), $Nb_2O_5$ particles (Nd=2.367 and vd=14.0), ITO particles (Nd=1.8571 and vd=5.69), $CrO_3$ particles (Nd=2.2178 and vd=13.4), and $BaTiO_3$ particles (Nd=2.4362 and vd=11.3).

Among these types of inorganic oxide, by dispersing $TiO_2$ particles (Nd=2.304, vd=13.8, and θgF=0.87) in a synthetic resin in an appropriate volume ratio, an optical material that satisfies conditional expression (1) can be obtained. In addition, by dispersing ITO particles (Nd=1.8571, vd=5.69, and θgF=0.873) in a synthetic resin in an appropriate volume ratio, an optical material that satisfies conditional expression (2) can be obtained. However, any solid material that satisfies conditional expression (2) can be employed.

According to the present embodiment, by using an optical material having a relative partial dispersion higher than that of a widely used optical material and an optical material having a relative partial dispersion lower than that of a widely used optical material, the chromatic aberration is sufficiently corrected.

In the wavelength-dependent characteristic of the index of refraction (dispersion characteristic) of an optical material, the Abbe number represents the slope of the dispersion characteristic curve, and the relative partial dispersion represents the curvature of the dispersion characteristic curve.

Figure 41:
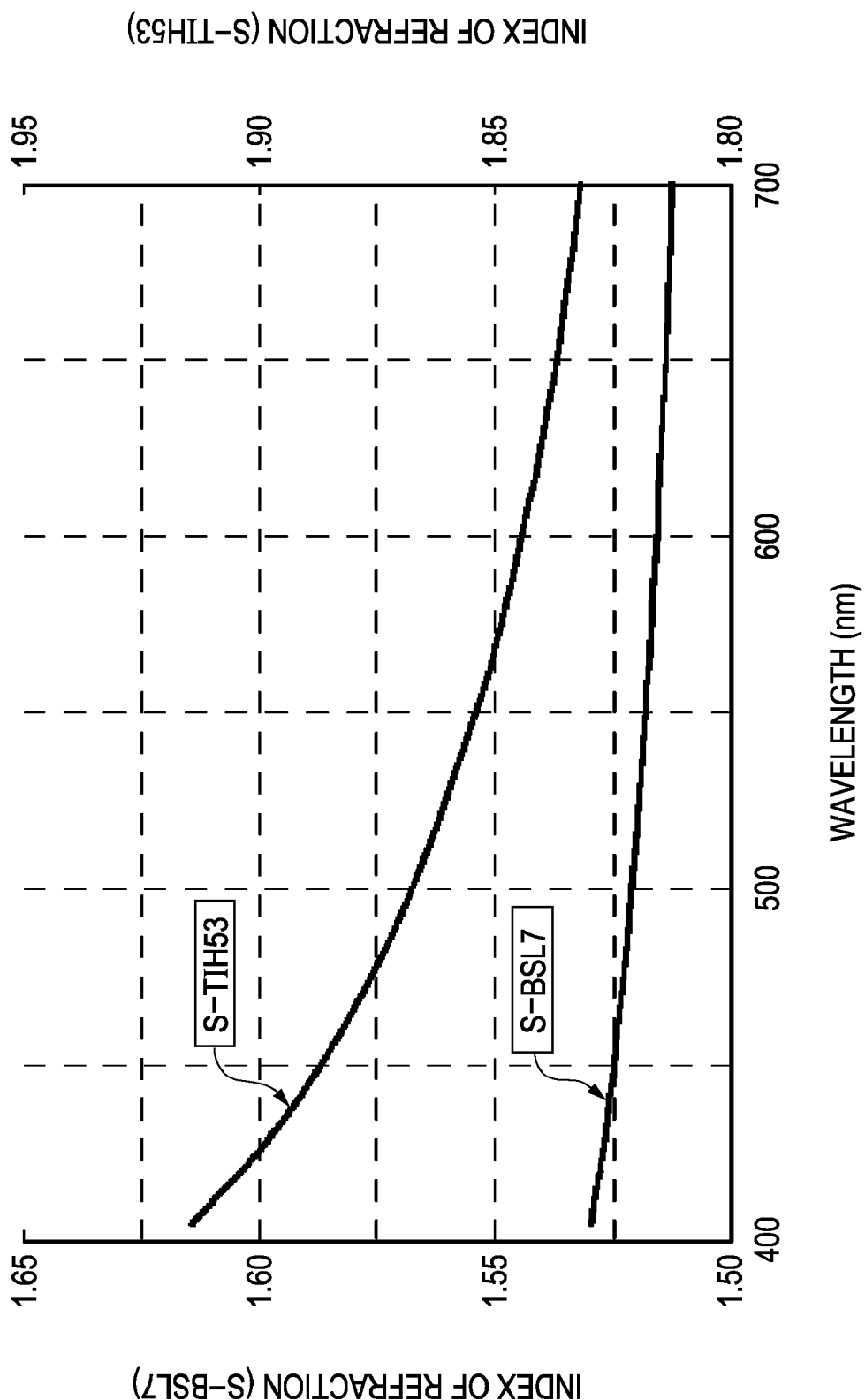
FIG. 41 illustrates an index of refraction-wavelength characteristic of a widely used optical element.

In general, the index of refraction of an optical material in a short-wavelength range is higher than that in a long-wavelength range. At that time, the Abbe number and the relative partial dispersion are positive. Accordingly, the dispersion characteristic curve is downwardly convex. A change in the index of refraction with respect to a change in the wavelength increases towards a short-wavelength range. For example, refractive index characteristics with respect to a wavelength for S-BSL7 (Nd=1.516 and vd=64.1) and S-TIH53 (Nd=1.847 and vd=23.8) available from OHARA corporation are shown in FIG. 41.

In addition, a high-dispersion optical material having a smaller Abbe number tends to have a higher relative partial dispersion. In widely used optical materials, the relative partial dispersion substantially linearly changes with respect to the Abbe number. However, an optical material having an anomalous partial dispersion changes differently from the linear change. A typical example of such an anomalous partial dispersion material is fluorite.

The wavelength-dependent characteristic curve of a chromatic aberration coefficient of an optical material having a high relative partial dispersion has a large curvature in a short-wavelength range, compared with that of a widely used optical material.

When the refractive power of the lens surface of an optical material having a high relative partial dispersion is changed in order to control the chromatic aberration, the slope of the entire wavelength-dependent characteristic curve of a chromatic aberration coefficient changes such that the entire wavelength-dependent characteristic curve rotates about a point of a reference design wavelength. In particular, the change is significant in a short-wavelength range for an optical material having a high relative partial dispersion. As a result, the slope of the entire wavelength-dependent characteristic curve is changed while significantly changing the curvature in the short-wavelength range.

By using this property, the curvature of the wavelength-dependent characteristic curve of a chromatic aberration coefficient in the short-wavelength range can be canceled. However, it is difficult to correct the remaining slope of the wavelength-dependent characteristic curve of a chromatic aberration coefficient at the same time. In addition, the correction of the curvature in the short-wavelength range relatively increases chromatic aberration in a long-wavelength range. To prevent the increase in chromatic aberration in a long-wavelength range, the refractive power of an appropriate one of the glass surfaces of the optical system needs to be changed. However, this is not suitable for correcting a variety of aberrations other than chromatic aberration.

In contrast, the wavelength-dependent characteristic curve of a chromatic aberration coefficient of an optical material having a low relative partial dispersion has a small curvature in a short-wavelength range. Accordingly, the chromatic aberration coefficient linearly changes with a change in wavelength, compared with that of a widely used optical material. When the refractive power of the lens surface of an optical material having a low relative partial dispersion is changed in order to control the chromatic aberration, the slope of the entire wavelength-dependent characteristic curve of a chromatic aberration coefficient changes such that the entire wavelength-dependent characteristic curve rotates about a point of a reference design wavelength while relatively retaining linearity with respect to the wavelength. In this way, the slope of the wavelength-dependent characteristic curve of a chromatic aberration coefficient can be corrected.

Accordingly, by employing an optical material having a low relative partial dispersion in addition to an optical material having a high relative partial dispersion, the curvature of the wavelength-dependent characteristic curve of a chromatic aberration coefficient in a short-wavelength range and the slope of the entire wavelength-dependent characteristic curve can be corrected at the same time. That is, the chromatic aberration of the optical system can be sufficiently corrected in a wide wavelength range of the g-line to C-line.

Such correction of chromatic aberration of an optical system is described next with reference to an optical system including a refractive optical system portion GNL using an optical material having a high relative partial dispersion, a refractive optical system portion GL using an optical material having a low relative partial dispersion, and a refractive optical system portion G using a widely used optical material having a normal relative partial dispersion.

Chromatic aberration of the refractive optical system portion G is corrected to some extent first. Then, a relatively high-dispersion optical material is selected for a negative lens included in the refractive optical system portion G. The slope of the entire wavelength-dependent characteristic curve of a chromatic aberration coefficient of the refractive optical system portion G is changed while the portion in a short-wavelength range is significantly curved from the original shape.

At that time, an appropriate refractive power is provided to the refractive optical system portion GNL, and a relatively high-dispersion optical material is selected for a positive lens included in the refractive optical system portion G. However, in the case where the refractive optical system portion GNL is composed of a widely used optical material having a relative partial dispersion that is uniform for an Abbe number, the refractive optical system portion GNL is partially responsible equally for a curvature component and a slope component of the wavelength-dependent characteristic curve of a chromatic aberration coefficient of the refractive optical system portion G. Therefore, the curvature component and the slope component cannot be canceled at the same time. As a result, it is difficult to correct the chromatic aberration sufficiently.

In contrast, in the case where the refractive optical system portion GNL is composed of an optical material having a relative partial dispersion higher than that of a widely used optical material, the refractive optical system portion GNL is relatively largely responsible for the slope component of the entire wavelength-dependent characteristic curve of a chromatic aberration coefficient of the main refractive optical system portion G. Therefore, the curvature component can be mainly canceled. As a result, the slope of the entire wavelength-dependent characteristic curve of a chromatic aberration coefficient can be changed while increasing linearity from the original shape.

At that time, by further providing the refractive optical system portion GL with an appropriate refractive power of a sign opposite to that of the refractive optical system portion GNL, the slope of the entire wavelength-dependent characteristic curve of a chromatic aberration coefficient of the refractive optical system portion G can be corrected. However, if the refractive optical system portion GL is composed of a widely used optical material, the refractive optical system portion GL has a characteristic in which the wavelength-dependent characteristic curve of a chromatic aberration coefficient is relatively largely convex in a direction opposite to that corresponding to the wavelength-dependent characteristic curve of the refractive optical system portion G. Accordingly, although the slope component of the entire wavelength-dependent characteristic curve of a chromatic aberration coefficient can be canceled, a curvature component that increases the chromatic aberration occurs.

In contrast, in the case where the refractive optical system portion GL is composed of an optical material having a low relative partial dispersion, the linearity of the wavelength-dependent characteristic curve of a chromatic aberration coefficient of the refractive optical system portion GL is relatively increased. That is, by changing the refractive power of the refractive optical system portion GL in order to correct the chromatic aberration, the slope of the wavelength-dependent characteristic curve of a chromatic aberration coefficient can be changed so that the wavelength-dependent characteristic curve rotates about the point of the design reference wavelength while substantially maintaining linearity.

As described above, by using the refractive optical system portion GNL, the refractive optical system portion GL, and the refractive optical system portion G, the slope component and the curvature component of the wavelength-dependent characteristic curve of a chromatic aberration coefficient can be relatively easily corrected at the same time.

To sufficiently correct chromatic aberration by using one of the refractive optical system portion GNL and the refractive optical system portion GL, the refractive power of a lens surface of one of the refractive optical system portions GNL and GL and the refractive power of a lens surface of the refractive optical system portion G need to be increased.

That is, by employing the refractive optical system portions GNL and GL, the refractive power of each of the refractive optical system portion GNL and the refractive optical system portion GL can be relatively reduced. As a result, the thickness of the solid material in the light axis direction can be reduced. Furthermore, by employing the refractive optical system portions GNL and GL, the chromatic aberration can be reduced without significantly changing the refractive power of the refractive optical system portion G. Accordingly, a variety of aberrations other than the chromatic aberration can be maintained unchanged.

At that time, in order to independently correct chromatic aberration, it is desirable that the refractive optical system portion GNL and the refractive optical system portion GL is composed of an optical material having a small Abbe number, that is, a high-dispersion optical material. Furthermore, it is desirable that at least one refractive optical system portion GNL and at least one refractive optical system portion GL are disposed on the enlargement side or the reduction side relative to the point P at which the paraxial chief ray intersects the light axis. This is described in detail next with reference to an axial chromatic aberration coefficient and a chromatic aberration coefficient of magnification of a lens surface.

Let $\Delta\Psi$ denote a change in refractive power of a surface of a refractive lens, and $v$ denote the Abbe number. Let $h$ and $H$ denote the heights of the paraxial marginal ray and the paraxial chief ray from the light axis when the paraxial marginal ray and the paraxial chief ray pass through the surface of the refractive lens, respectively. Then, a change $\Delta L$ in the axial chromatic aberration coefficient and a change $\Delta T$ in a chromatic aberration coefficient of magnification can be expressed as follows:

$$\Delta L = h^2 \cdot \Delta\Psi / v \qquad (a)$$

$$\Delta T = h \cdot H \cdot \Delta\Psi / v \qquad (b)$$

As can be seen from equations (a) and (b), the changes in these aberration coefficients with respect to a change in the refractive power of the lens surface increase as the absolute value of the Abbe number decreases (i.e., as the dispersion increases). Accordingly, by using a high-dispersion material having a small absolute value of the Abbe number, the change amount of the refractive power that is required for obtaining a desired chromatic aberration can be reduced.

According to an aberration theory, this allows the chromatic aberration to be controlled without significantly affecting the spherical aberration, coma aberration, and astigmatism aberration. Thus, the chromatic aberration can be highly independently controlled.

However, if a low-dispersion material is employed, the change amount of the refractive power that is required for obtaining a desired chromatic aberration is increased. With the increase in the change amount of the refractive power, a variety of aberrations, such as spherical aberration, significantly change. Thus, the chromatic aberration cannot be independently controlled. Therefore, in order to correct aberrations, it can be useful that, among the lenses of the optical system, at least one of the surfaces of the lenses is a surface of a refractive lens made of a high-dispersion material.

In addition, equations (a) and (b) indicate that the changes in the axial chromatic aberration coefficient and the chromatic aberration coefficient of magnification are determined by the values of the heights h and H. Using this result, the optimal arrangement of the refractive optical system portion GNL and the refractive optical system portion GL in the optical system is described next.

To sufficiently correct chromatic aberration, the slope component and the curvature components need to be corrected at the same time. However, if the refractive power change $\Delta\Psi$ is decreased, sufficient correction of the chromatic aberration cannot be achieved. In contrast, if the refractive power change $\Delta\Psi$ is increased, the thickness of an optical element serving as a lens is increased.

In general, since the transmittance of the optical material of the refractive optical system portion GNL and the refractive optical system portion GL having an anomalous partial dispersion characteristic is low, the thickness of a lens composed of the optical material needs to be relatively reduced when the refractive optical system portions are used for lenses.

That is, in order to reduce the thicknesses of the refractive optical system portion GNL and the refractive optical system portion GL and sufficiently correct the chromatic aberration, the effects of the arrangement on the slope component and the curvature component of the wavelength-dependent characteristic curve of a chromatic aberration coefficient can be substantially the same. Accordingly, the heights h and H from the light axis in the refractive optical system portion GNL and the refractive optical system portion GL can be similar values.

The plus/minus sign of H on the enlargement side is different from that on the reduction side. That is, when the refractive optical system portion GNL is disposed on the enlargement side of the point P and the refractive optical system portion GL is disposed on the reduction side of the point P, the values of h and H are significantly different. Therefore, in order to correct chromatic aberration, at least one refractive optical system portion GNL and at least one refractive optical system portion GL can be disposed on the enlargement side of the point P or on the reduction side of the point P. At that time, to cancel the curvature component and the slope component of the wavelength-dependent characteristic curve of a chromatic aberration coefficient, the product of the focal length (f1) of the refractive optical system portion GNL and the focal length (f2) of the refractive optical system portion GL can be negative, as indicated by conditional expression (7).

The telephoto optical system is configured so that the maximum height of the paraxial marginal ray from the light axis when the paraxial marginal ray passes through the lens surface on the enlargement side of the point P where the light axis intersects the paraxial chief ray is greater than that on the reduction side of the point P. In the telephoto optical system, by disposing the refractive optical system portion GNL and the refractive optical system portion GL on the enlargement side, the axial chromatic aberration and the chromatic aberration of magnification can be sufficiently corrected.

In contrast, the retrofocus optical system is configured so that the maximum height of the paraxial marginal ray from the light axis when the paraxial marginal ray passes through the lens surface on the enlargement side of the point P where the light axis intersects the paraxial chief ray is less than that on the reduction side of the point P. In the retrofocus optical system, by disposing the refractive optical system portion GNL and the refractive optical system portion GL on the reduction side, the axial chromatic aberration and the chromatic aberration of magnification can be sufficiently corrected.

If the refractive optical system portion GNL and the refractive optical system portion GL are disposed so that the distance therebetween is relatively large, the heights h and H at the lens surfaces thereof are significantly different. At that time, the aberration coefficients $\Delta L$ and $\Delta T$ of the lens surfaces thereof are significantly different. Accordingly, the slope component and the curvature component of the wavelength-dependent characteristic curve of a chromatic aberration coefficient of the entire optical system are significantly differently affected.

However, if the refractive optical system portion GNL and the refractive optical system portion GL are disposed near each other, the heights h and H at the lens surfaces thereof are relatively similar values. At that time, the slope component and the curvature component of the wavelength-dependent characteristic curve of a chromatic aberration coefficient of the entire optical system are substantially equally effected. Thus, the chromatic aberration can be sufficiently corrected.

As a result, it is desirable that the refractive optical system portion GNL and the refractive optical system portion GL are disposed near each other. For example, the refractive optical system portion GNL and the refractive optical system portion GL can be cemented. In addition, since both the heights h and H do not significantly change in the same lens group of the optical system, it is more desirable that the refractive optical system portions GNL and GL are disposed in the same lens group.

In general, when a lens group is moved in order to perform zooming and focusing and control the position of the image, the states of a ray made incident on the lens groups change, and therefore, aberrations occurring in the lens groups change. Accordingly, in order to sufficiently correct the aberrations of the optical system in all the use cases, aberration coefficients that simultaneously change in all the use cases need to be determined for each of the lens groups. By disposing the refractive optical system portions GNL and GL in the same lens group, desired aberration values can be easily obtained.

In addition, if the thicknesses of the refractive optical system portions GNL and GL are reduced, a change in the thickness due to the surrounding environment is reduced. Furthermore, by satisfying conditional expression (7), the resistance to the surrounding environment can be increased.

A variety of aberrations including chromatic aberration are corrected by the refractive optical system portions GNL and GL in cooperation with a widely used optical material. Accordingly, the characteristics of the relative partial dispersions of the refractive optical system portions GNL and GL need to be different from that of the widely used optical material in order to correct the aberrations. However, a strong anomalous partial dispersion should be avoided.

When a lens made of an optical material having a characteristic significantly different from that of a widely used optical material is employed, the curvature of the wavelength-dependent characteristic curve of a chromatic aberration coefficient of the lens surface is particularly large. To correct the large curvature component, the refractive powers of other lenses need to be increased. This gives a significant impact on the spherical aberration, the coma aberration, and the astigmatism aberration. Thus, it is difficult to correct these aberrations.

That is, the material of the refractive optical system portion GNL needs to be an optical material having a relative partial dispersion higher than that of a widely used optical material, but not having a relative partial dispersion significantly different from that of a widely used optical material.

To obtain further sufficient correction of chromatic aberration, the range of the anomalous partial dispersion value $\Delta\theta gF1$ defined in conditional expression (1) can be redefined as follows:

$$0.0272 < \Delta\theta gF1 < 0.2832 \tag{1a}$$

To obtain still further sufficient correction of chromatic aberration, the range of the anomalous partial dispersion value $\Delta\theta gF1$ defined in conditional expression (1a) can be redefined as follows:

$$0.0342 < \Delta\theta gF1 < 0.2832 \tag{1b}$$

To obtain further sufficient correction of chromatic aberration, the range of the anomalous partial dispersion value $\Delta\theta gF2$ defined in conditional expression (2) can be redefined as follows:

$$-0.4278 < \Delta\theta gF2 < -0.0528 \tag{2a}$$

To obtain still further sufficient correction of chromatic aberration, the range of the anomalous partial dispersion value $\Delta\theta gF2$ defined in conditional expression (2a) can be redefined as follows:

$$-0.4278 < \Delta\theta gF2 < -0.0778 \tag{2b}$$

To obtain further sufficient correction of chromatic aberration, the range of the anomalous partial dispersion value $\Delta\theta gd1$ defined in conditional expression (3) can be redefined as follows:

$$0.038 < \Delta\theta gd1 < 0.347 \tag{3a}$$

To obtain still further sufficient correction of chromatic aberration, the range of the anomalous partial dispersion value $\Delta\theta gd1$ defined in conditional expression (3a) can be redefined as follows:

$$0.051 < \Delta\theta gd1 < 0.347 \tag{3b}$$

To obtain further sufficient correction of chromatic aberration, the range of the anomalous partial dispersion value $\Delta\theta gd2$ defined in conditional expression (4) can be redefined as follows:

$$-0.5620 < \Delta\theta gd2 < -0.062 \tag{4a}$$

To obtain still further sufficient correction of chromatic aberration, the range of the anomalous partial dispersion value $\Delta\theta gd1$ defined in conditional expression (4a) can be redefined as follows:

$$-0.5620 < \Delta\theta gd2 < -0.112 \tag{4b}$$

To obtain further sufficient correction of chromatic aberration, the ranges of the Abbe numbers vd1 and vd2 defined in conditional expressions (5) and (6) can be redefined as follows:

$$vd1 < 50 \tag{5a}$$

$$vd2 < 50 \tag{6a}$$

To obtain still further sufficient correction of chromatic aberration, the ranges of the Abbe numbers vd1 and vd2 defined in conditional expressions (5a) and (6a) can be redefined as follows:

$$vd1 < 45 \tag{5b}$$

$$vd2 < 45 \tag{6b}$$

To obtain yet still further sufficient correction of chromatic aberration, the ranges of the Abbe numbers vd1 and vd2 defined in conditional expressions (5b) and (6b) can be redefined as follows:

$$vd1 < 40 \tag{5c}$$

$$vd2 < 40 \tag{6c}$$

In the above-described exemplary embodiments, the first optical element GNL1 and the second optical element GL1 made of an optical material that satisfies conditional expressions (1) and (2) are employed for a lens and refractive layers provided on a lens of the optical system. In addition, if the refractive surface composed of such an optical material is aspherical, chromatic aberration flare, such as spherical aberration of a color, can be corrected. Furthermore, by forming an interface between the optical element and air atmosphere or between the optical element and an optical material having a relatively low index of refraction, the chromatic aberration can be relatively significantly changed by slightly changing the radius of curvature of the interface.

Exemplary embodiments in which an optical element composed of the optical material that satisfies conditional expressions (1) to (7) is employed for a particular optical system are described in detail next. In these exemplary embodiments, a UV-curable resin 1, N-polyvinyl carbazole, or a mixture of a UV-curable resin 2 and $TiO_2$ fine particles dispersed therein is used for an optical material that satisfies conditional expressions (1), (3), and (5). A mixture of the UV-curable resin 2 and ITO fine particles dispersed therein or a mixture of N-polyvinyl carbazole and ITO fine particles dispersed therein is used for an optical material that satisfies conditional expressions (2), (4), and (6).

An optical system used in each of the exemplary embodiments is a photo-taking lens system used in an image pickup apparatus, such as a video camera, a digital camera, or a silver-halide film camera. In the cross-sectional views of lenses, an object is located on the left side (the front side), and an image plane is located on the right side (the rear side).

In the case where the optical systems of the exemplary embodiments are used for projection lenses of, for example, projectors, a screen is located on the left side, and an image to be projected is located on the right side.

In the cross-sectional views of lenses, "i" represents the order of a lens group numbered from the object. "Li" represents an ith lens group.

In addition, "SP" represents an aperture stop. "G" represents an optical block including an optical filter, a face plate, a quartz low-pass filter, and an infrared-cut filter.

Furthermore, an image plane IP is shown in the drawings. When the optical system is used for a photo-taking lens of a video camera or a digital still camera, an imaging surface of a solid-state image pickup element (a photoelectric conversion element), such as a charged coupled device (CCD) sensor or a complementary metal oxide semiconductor (CMOS) sensor, is disposed in the image plane IP. When the optical system is used for a photo-taking lens of a silver-halide film camera, a light-sensitive surface corresponding to the film surface is disposed in the image plane IP.

In aberration diagrams, "d" and "g" represent the d-line and g-line, respectively. "ΔM" and "ΔS" represent the meridional image plane and the sagittal image plane, respectively. The chromatic aberration of magnification is represented using the g-line. "ω" denotes the half angle of field. "Fno" denotes the F number.

According to the first exemplary embodiment, as shown in FIG. 1, an optical system is a zoom lens having a zoom ratio of about 12 and including four lens groups. That is, the optical system includes a first lens group L1 having a positive refractive power, a second lens group L2 having a negative refractive power, a third lens group L3 having a positive refractive power, and a fourth lens group L4 having a positive refractive power in this order from an object side to an image side.

When zooming is performed from the wide-angle end to the telephoto end, the lens groups are moved in trajectories as indicated by arrows. That is, when zooming is performed, the lens groups are moved so that the distances between the lens groups are changed.

In the present embodiment, the optical system includes a lens composed of a mixture of a UV-curable resin and ITO fine particles dispersed therein. In FIG. 1, the first optical element GNL1 is a lens (layer) composed of the UV-curable resin 1. The second optical element GL1 is a lens (layer) composed of a mixture of the UV-curable resin 2 and 14.2% by volume ITO fine particles dispersed therein.

According to the first exemplary embodiment, the lens GNL1 composed of the UV-curable resin 1 and the lens GL1 composed of a mixture of the UV-curable resin 2 and ITO fine particles are used in the first lens group L1. The first lens group L1 is located on the object side among the lens groups included in the zoom lens. When the paraxial marginal ray passes through the first lens group L1, the height of the paraxial marginal ray from the light axis is relatively large. In addition, the lens GNL1 and the lens GL1 are in tight contact with each other and are cemented between the other lenses.

The lens (layer) GNL1 composed of the UV-curable resin 1 has a positive refractive power. The lens (layer) GL1 composed of a mixture including the ITO fine particles has a negative refractive power. In this way, when zooming is performed from the wide-angle end to the telephoto end, axial chromatic aberration and chromatic aberration of magnification are sufficiently corrected. In addition, the size of the entire optical system can be reduced.

According to second to sixth exemplary embodiments, as shown in FIGS. 3, 5, 7, 9, and 11, optical systems are telephoto lenses. As used herein, the term "telephoto lens" refers to a lens system having a total lens length that is shorter than the focal length thereof.

Figure 3:
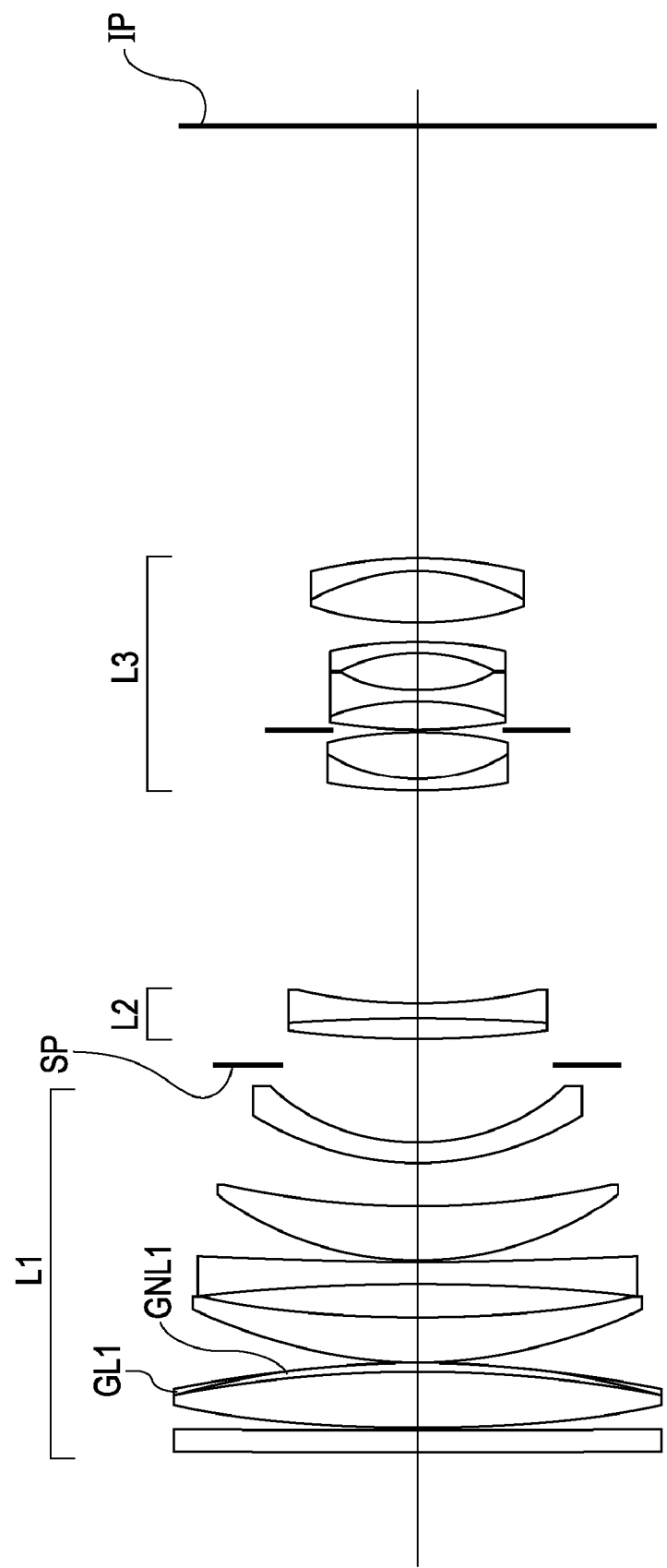
FIG. 3 is a cross-sectional view of an optical system according to a second numerical embodiment of the present invention.
Figure 4:
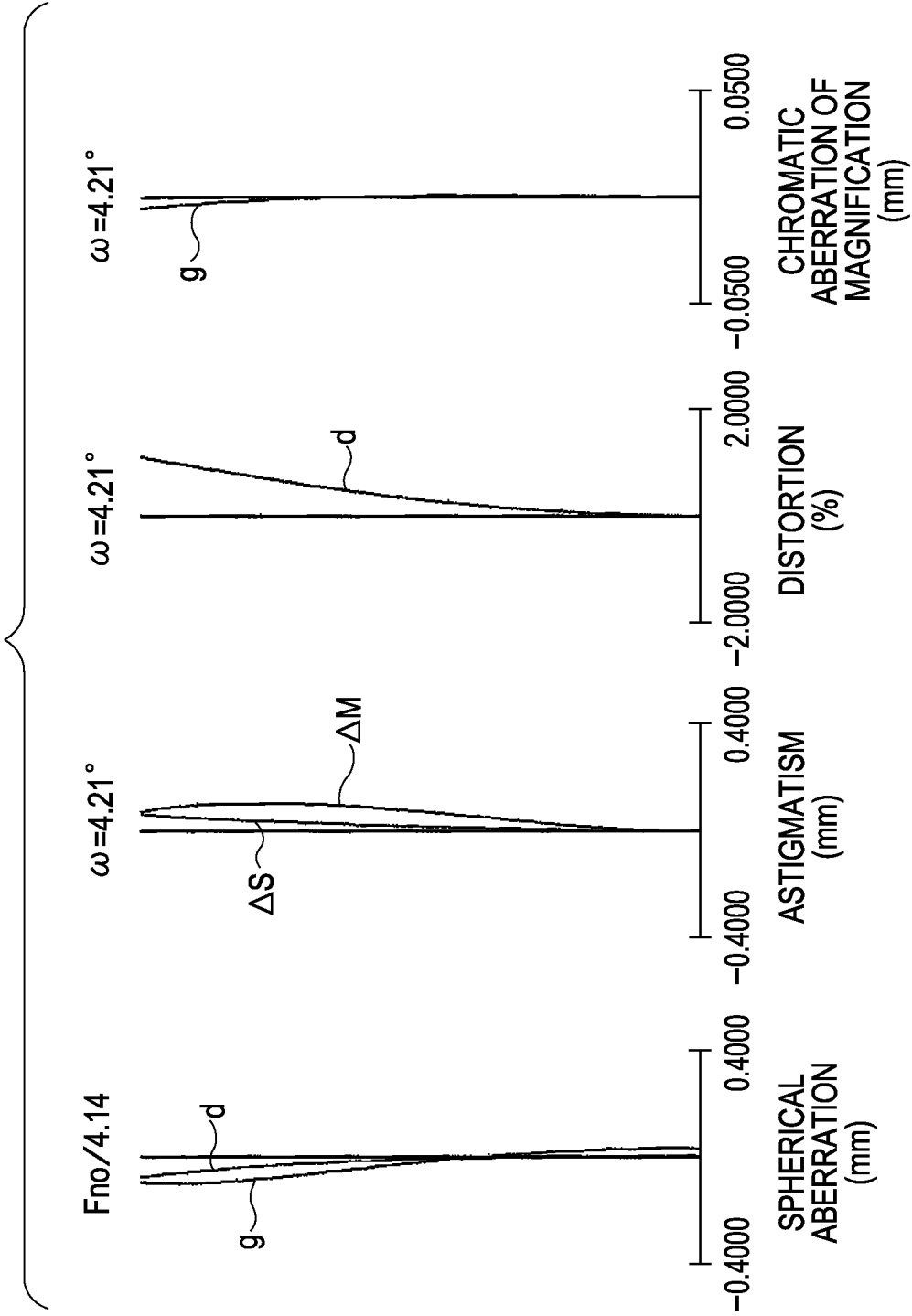
FIG. 4 is an aberration diagram according to the second numerical embodiment.

According to a second exemplary embodiment, as shown in FIG. 3, the optical system is an ultra-telephoto lens having a focal length of 300 mm. The optical system includes a first lens group L1 having a positive refractive power, a second lens group L2 having a negative refractive power, and a third lens group L3 having a positive refractive power. The second lens group L2 is moved along the light axis for a focusing purpose.

According to the exemplary present embodiment, the lens (layer) GNL1 composed of the UV-curable resin 1 is employed as part of the optical system. In addition, the lens (layer) GL1 composed of a mixture of the UV-curable resin 2 and 14.2% by volume ITO fine particles dispersed therein is employed.

That is, according to the exemplary present embodiment, the optical system includes the lens (layer) GNL1 composed of the UV-curable resin 1 and having a positive refractive power and the lens (layer) GL1 composed of a mixture of the UV-curable resin 2 and ITO fine particles and having a negative refractive power on the object side where a point at which the paraxial marginal ray passes the lenses has a relatively large height from the light axis. In addition, the lens GNL1 is in tight contact with the lens GL1 so that the contact surface is aspherical. In this way, axial chromatic aberration and chromatic aberration of magnification are sufficiently corrected. Thus, a compact ultra-telephoto lens having a telephoto ratio of 0.681 can be achieved.

Figure 5:
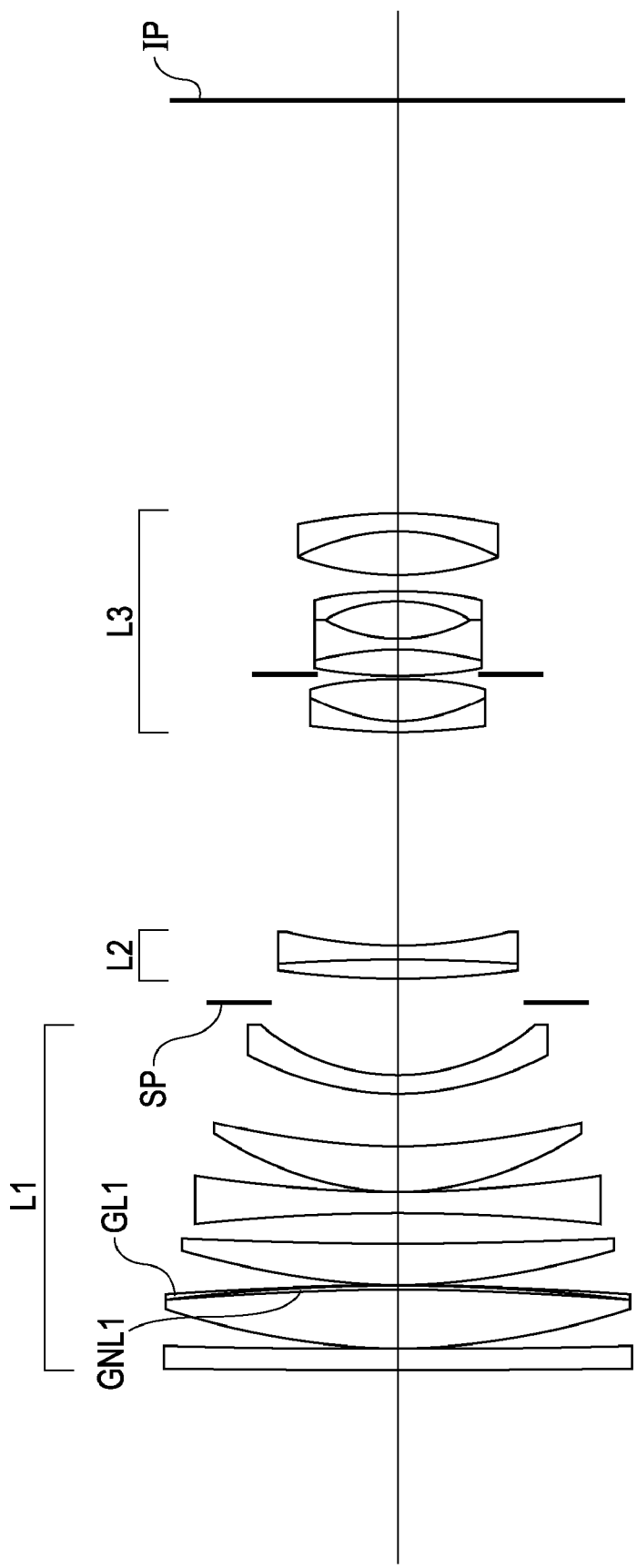
FIG. 5 is a cross-sectional view of an optical system according to a third numerical embodiment of the present invention.
Figure 6:
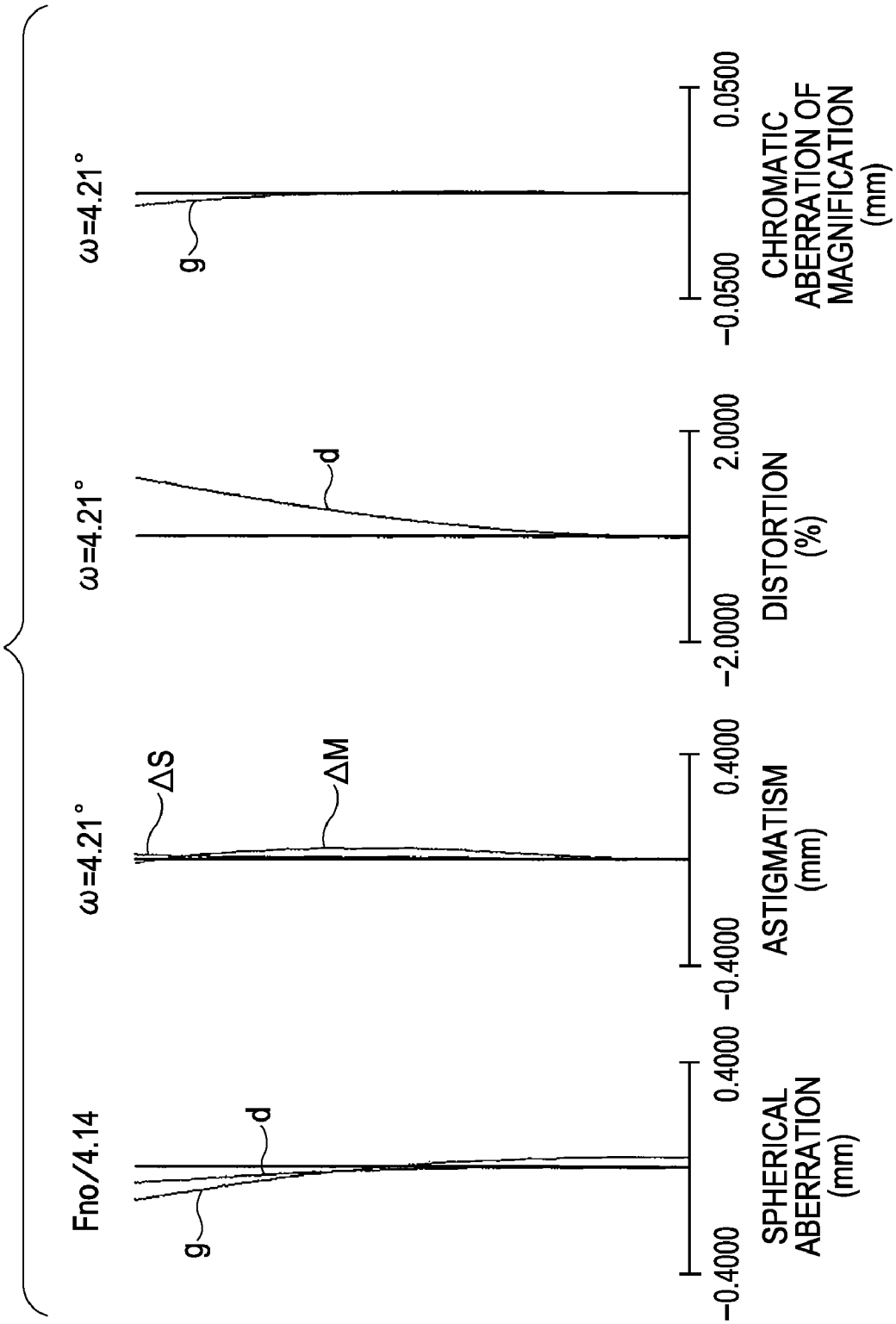
FIG. 6 is an aberration diagram according to the third numerical embodiment.

According to a third exemplary embodiment, as shown in FIG. 5, the optical system is an ultra-telephoto lens having a focal length of 300 mm. The optical system includes a first lens group L1 having a positive refractive power, a second lens group L2 having a negative refractive power, and a third lens group L3 having a positive refractive power. The second lens group L2 is moved along the light axis for a focusing purpose.

According to the present exemplary embodiment, the lens (layer) GNL1 composed of a mixture of the UV-curable resin 2 and 20% by volume $TiO_2$ fine particles dispersed therein is employed as part of the optical system. In addition, the lens (layer) GL1 composed of a mixture of the UV-curable resin 2 and 20% by volume ITO fine particles dispersed therein is employed.

According to the third exemplary embodiment, the optical system includes the lens (layer) GNL1 composed of a mixture of the UV-curable resin 2 and $TiO_2$ fine particles dispersed therein and having a positive refractive power and the lens (layer) GL1 composed of a mixture of the UV-curable resin 2 and ITO fine particles and having a negative refractive power on the object side where a point at which the paraxial marginal ray passes the lenses has a relatively large height from the light axis. In this way, axial chromatic aberration and chromatic aberration of magnification are sufficiently corrected. Thus, a compact ultra-telephoto lens having a telephoto ratio of 0.680 can be achieved.

Figure 7:
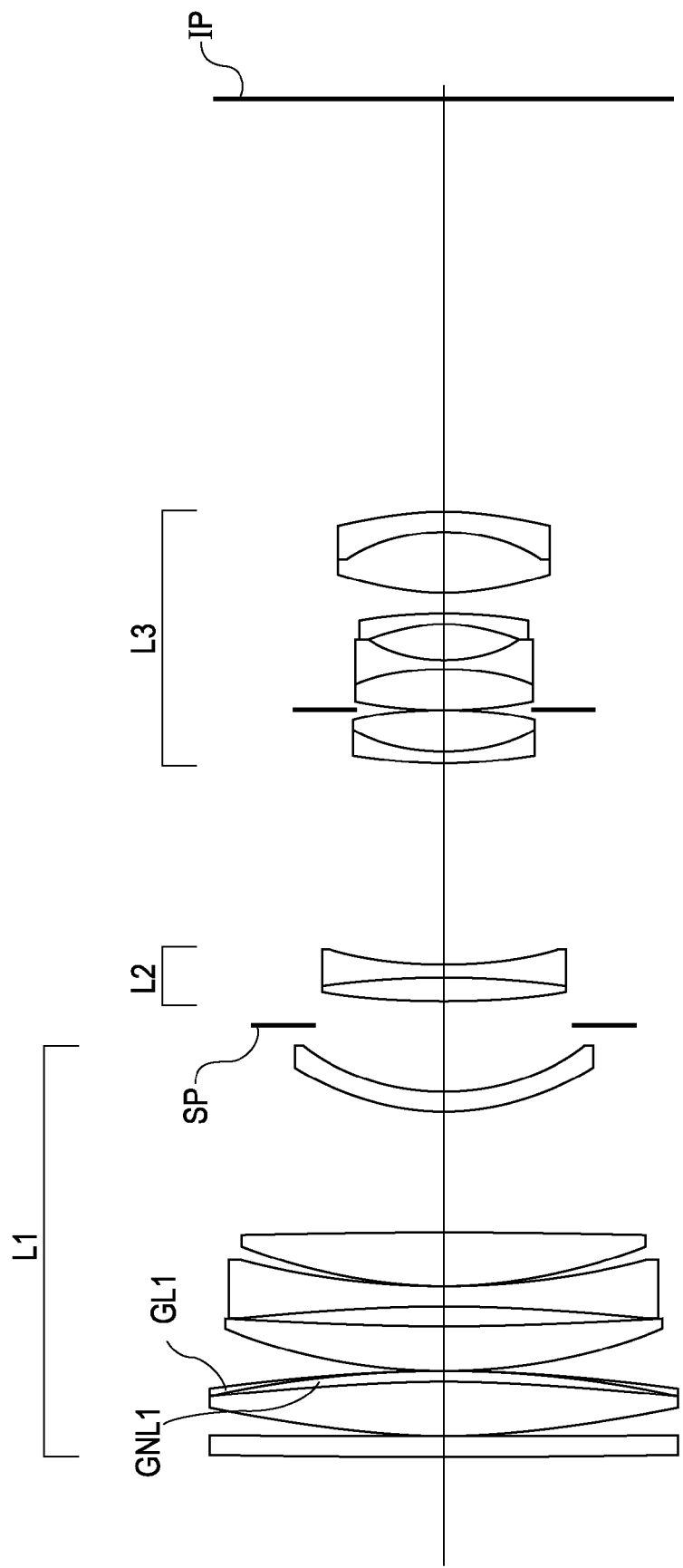
FIG. 7 is a cross-sectional view of an optical system according to a fourth numerical embodiment of the present invention.
Figure 8:
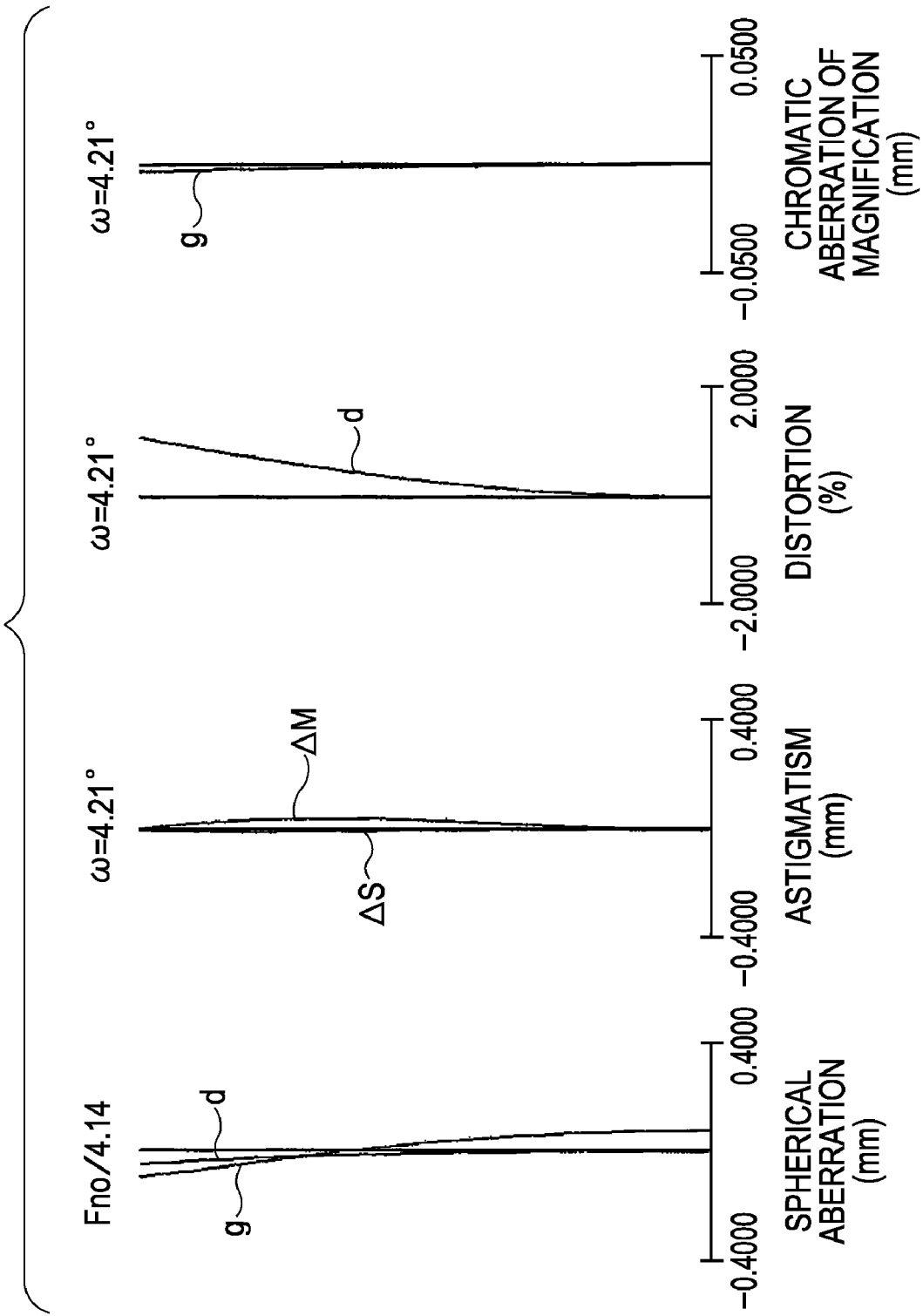
FIG. 8 is an aberration diagram according to the fourth numerical embodiment.

According to a fourth exemplary embodiment, as shown in FIG. 7, the optical system is an ultra-telephoto lens having a focal length of 300 mm. The optical system includes a first lens group L1 having a positive refractive power, a second lens group L2 having a negative refractive power, and a third lens group L3 having a positive refractive power. The second lens group L2 is moved along the light axis for a focusing purpose.

According to the present exemplary embodiment, the lens (layer) GNL1 composed of N-polyvinyl carbazole is employed as part of the optical system. In addition, the lens (layer) GL1 composed of a mixture of the UV-curable resin 2 and 5% by volume ITO fine particles dispersed therein is employed.

According to the fourth exemplary embodiment, the optical system includes the lens (layer) GNL1 composed of a mixture of the UV-curable resin 2 and $TiO_2$ fine particles dispersed therein and having a positive refractive power and the lens (layer) GL1 composed of a mixture of the UV-curable resin 2 and ITO fine particles and having a negative refractive power on the object side where a point at which the paraxial marginal ray passes the lenses has a relatively large height from the light axis. In this way, axial chromatic aberration and chromatic aberration of magnification are sufficiently corrected. Thus, a compact ultra-telephoto lens having a telephoto ratio of 0.731 can be achieved.

Figure 9:
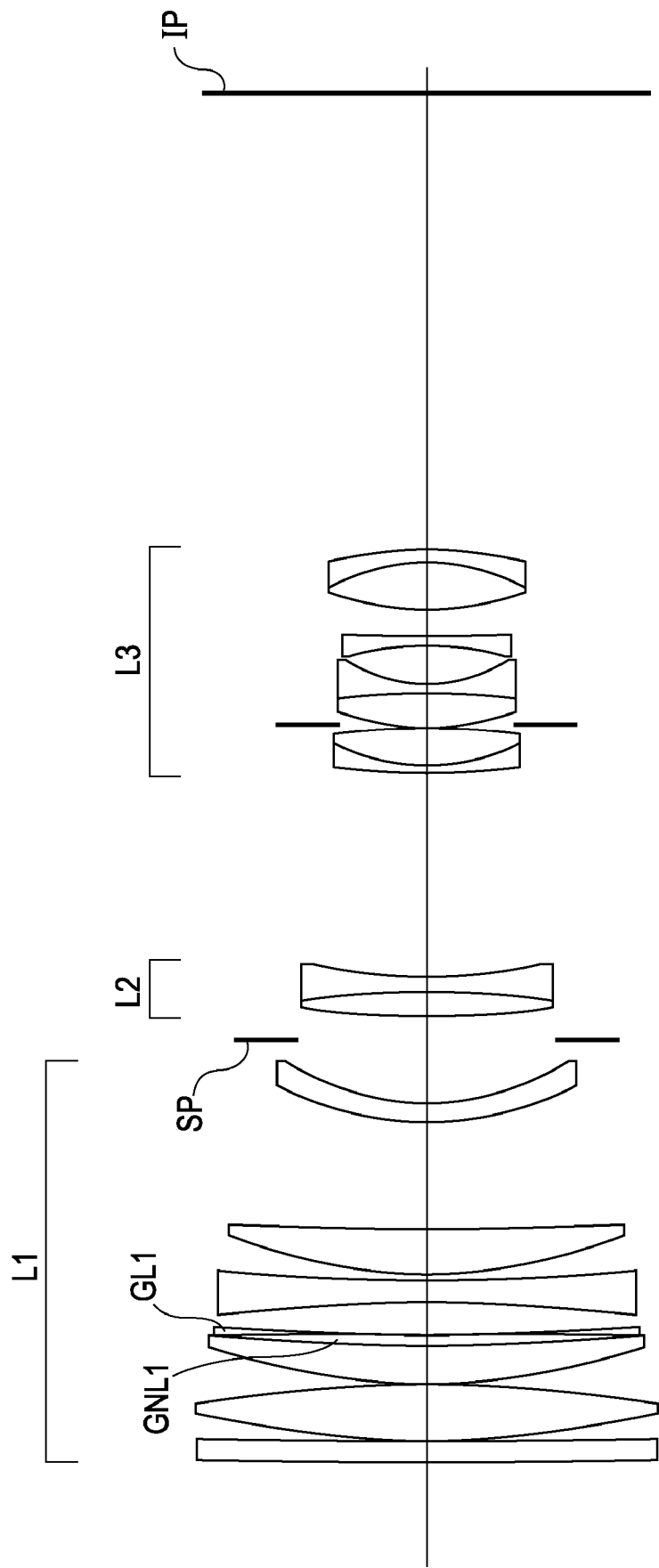
FIG. 9 is a cross-sectional view of an optical system according to a fifth numerical embodiment of the present invention.
Figure 10:
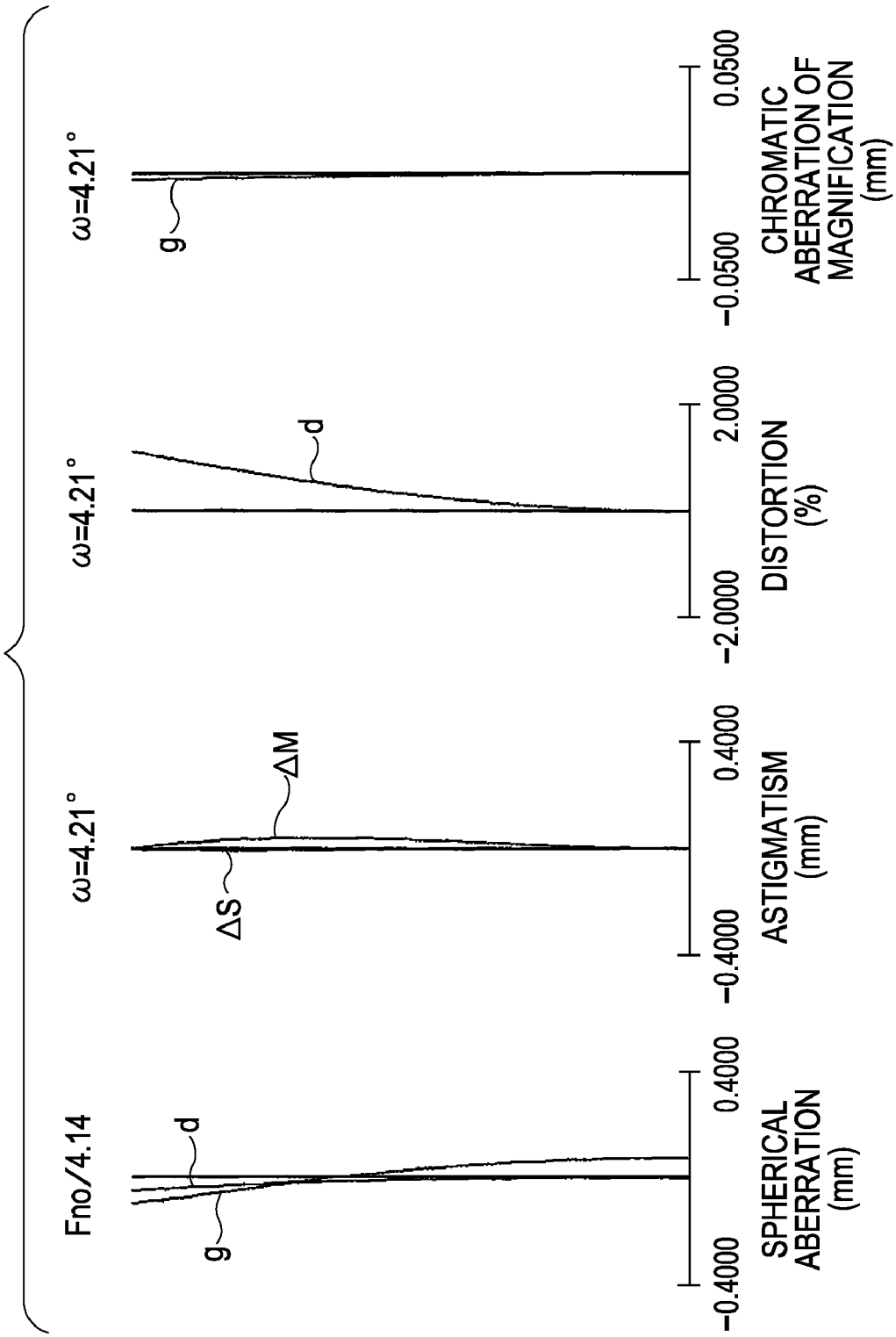
FIG. 10 is an aberration diagram according to the fifth numerical embodiment.

According to a fifth exemplary embodiment, as shown in FIG. 9, the optical system is an ultra-telephoto lens having a focal length of 300 mm. The optical system includes a first lens group L1 having a positive refractive power, a second lens group L2 having a negative refractive power, and a third lens group L3 having a positive refractive power. The second lens group L2 is moved along the light axis direction for a focusing purpose.

According to the present exemplary embodiment, the lens (layer) GNL1 composed of a mixture of the UV-curable resin 2 and 3% by volume $TiO_2$ fine particles dispersed therein is employed as part of the optical system. In addition, the lens (layer) GL1 composed of a mixture of N-polyvinyl carbazole and 10% by volume ITO fine particles dispersed therein is employed.

According to the fifth exemplary embodiment, the optical system includes the lens (layer) GNL1 composed of a mixture including $TiO_2$ fine particles dispersed therein and having a positive refractive power and the lens (layer) GL1 composed of a mixture including ITO fine particles and having a negative refractive power on the object side where a point at which the paraxial marginal ray passes the lenses has a relatively large height from the light axis. In this way, axial chromatic aberration and chromatic aberration of magnification are sufficiently corrected. Thus, a compact ultra-telephoto lens having a telephoto ratio of 0.748 can be achieved.

Figure 11:
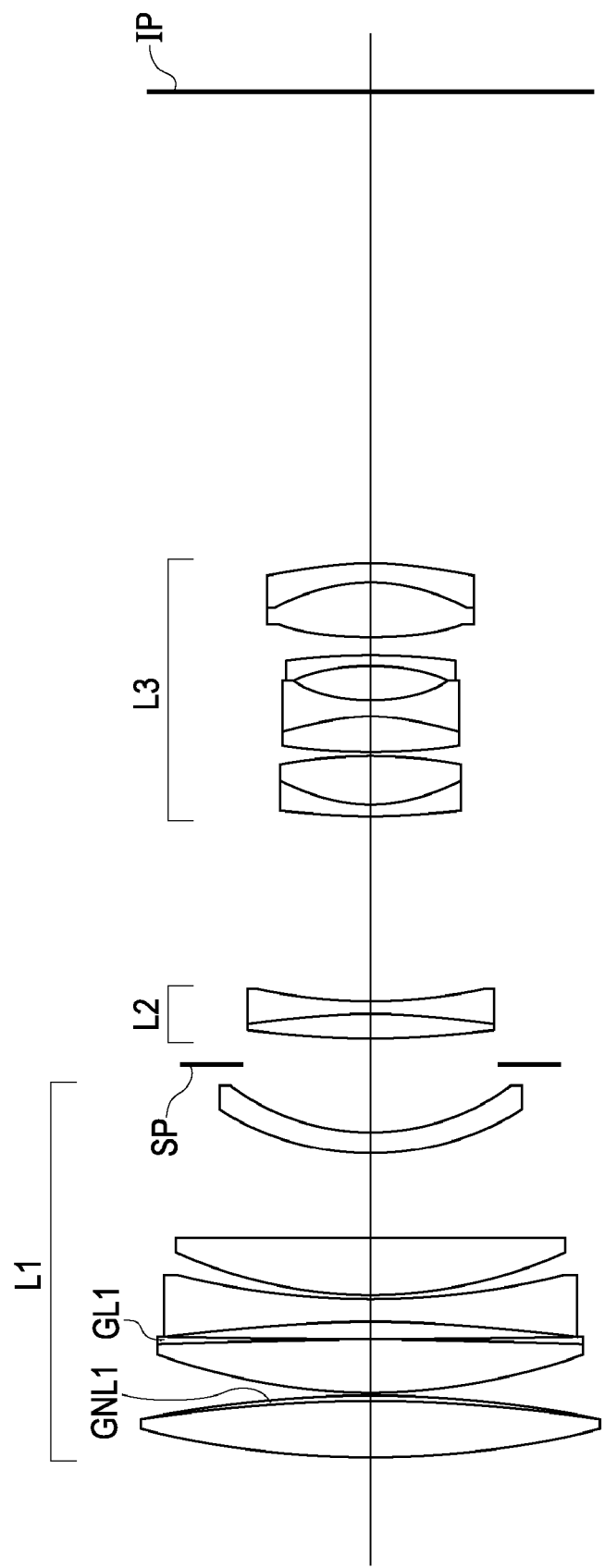
FIG. 11 is a cross-sectional view of an optical system according to a sixth numerical embodiment of the present invention.
Figure 12:
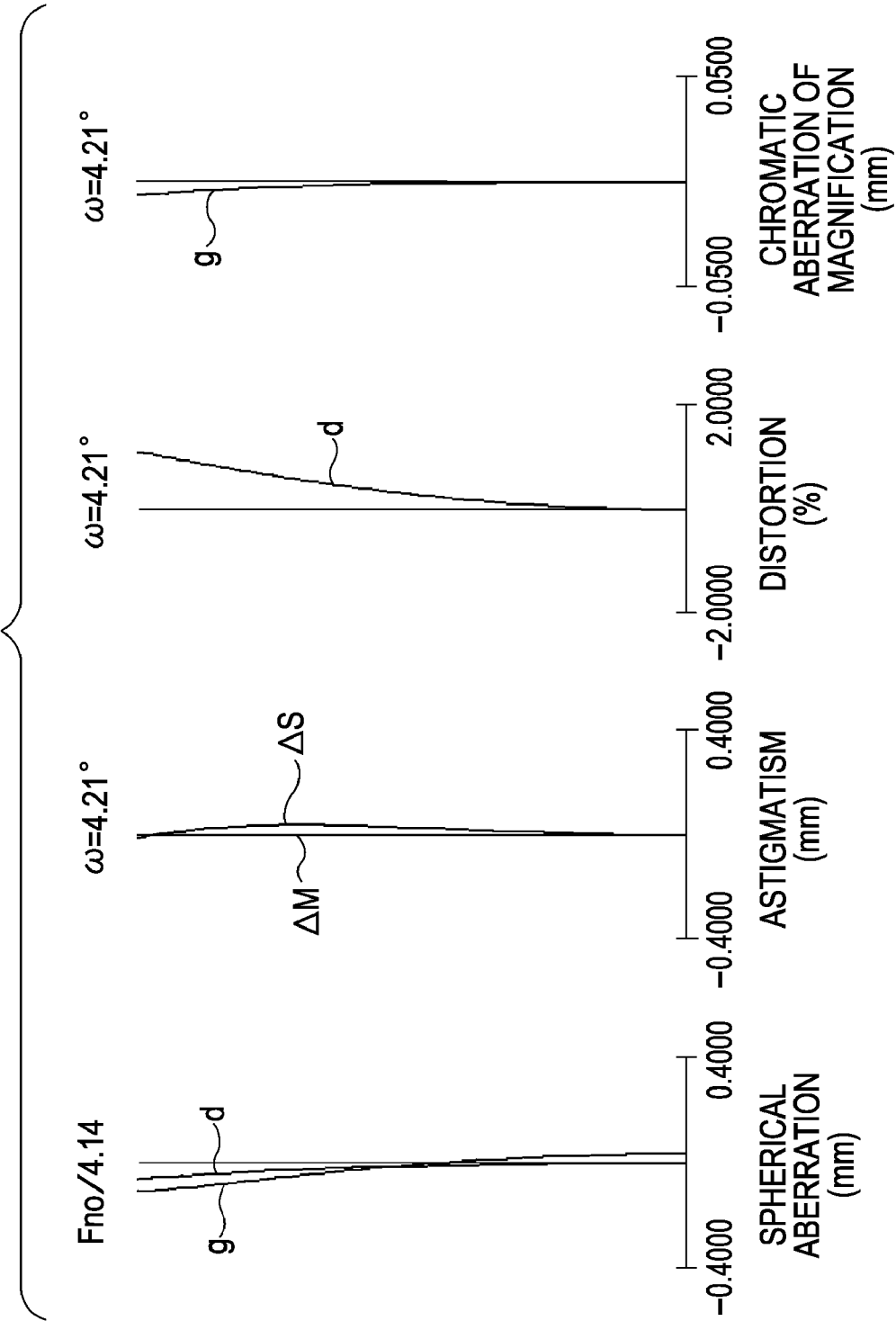
FIG. 12 is an aberration diagram according to the sixth numerical embodiment.

According to a sixth exemplary embodiment, as shown in FIG. 11, the optical system is an ultra-telephoto lens having a focal length of 300 mm. The optical system includes a first lens group L1 having a positive refractive power, a second lens group L2 having a negative refractive power, and a third lens group L3 having a positive refractive power. The second lens group L2 is moved along the light axis for a focusing purpose.

According to the present exemplary embodiment, the lens (layer) GNL1 composed of the UV-curable resin 1 is employed as part of the optical system. In addition, the lens (layer) GL1 composed of a mixture of the UV-curable resin 2 and 5% by volume ITO fine particles dispersed therein is employed.

According to the sixth exemplary embodiment, the optical system includes the lens (layer) GNL1 composed of an UV-curable resin and having a positive refractive power and the lens (layer) GL1 composed of a mixture including ITO fine particles and having a negative refractive power on the object side where a point at which the paraxial marginal ray passes the lenses has a relatively large height from the light axis. In this way, axial chromatic aberration and chromatic aberration of magnification are sufficiently corrected. Thus, a compact ultra-telephoto lens having a telephoto ratio of 0.737 can be achieved.

Figure 13:
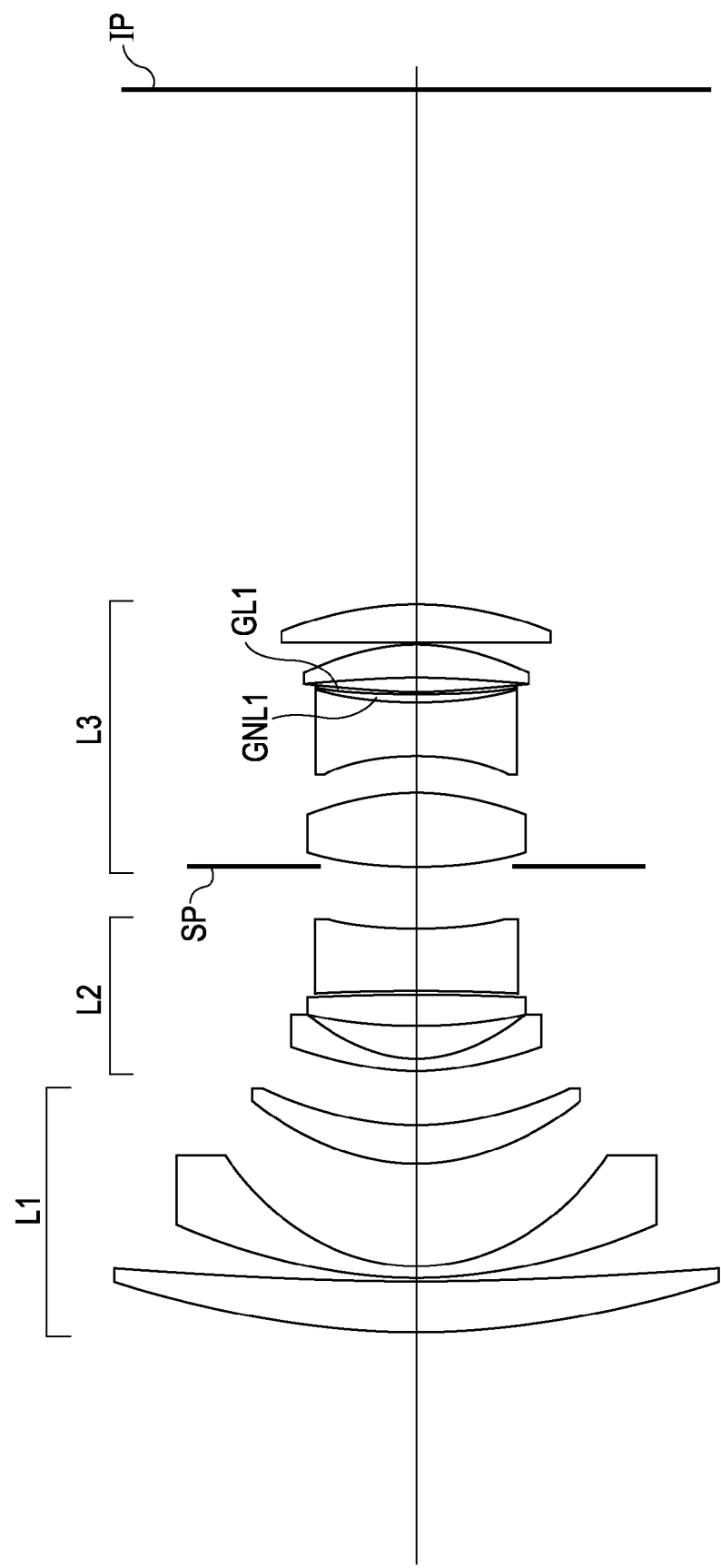
FIG. 13 is a cross-sectional view of an optical system according to a seventh numerical embodiment of the present invention.
Figure 14:
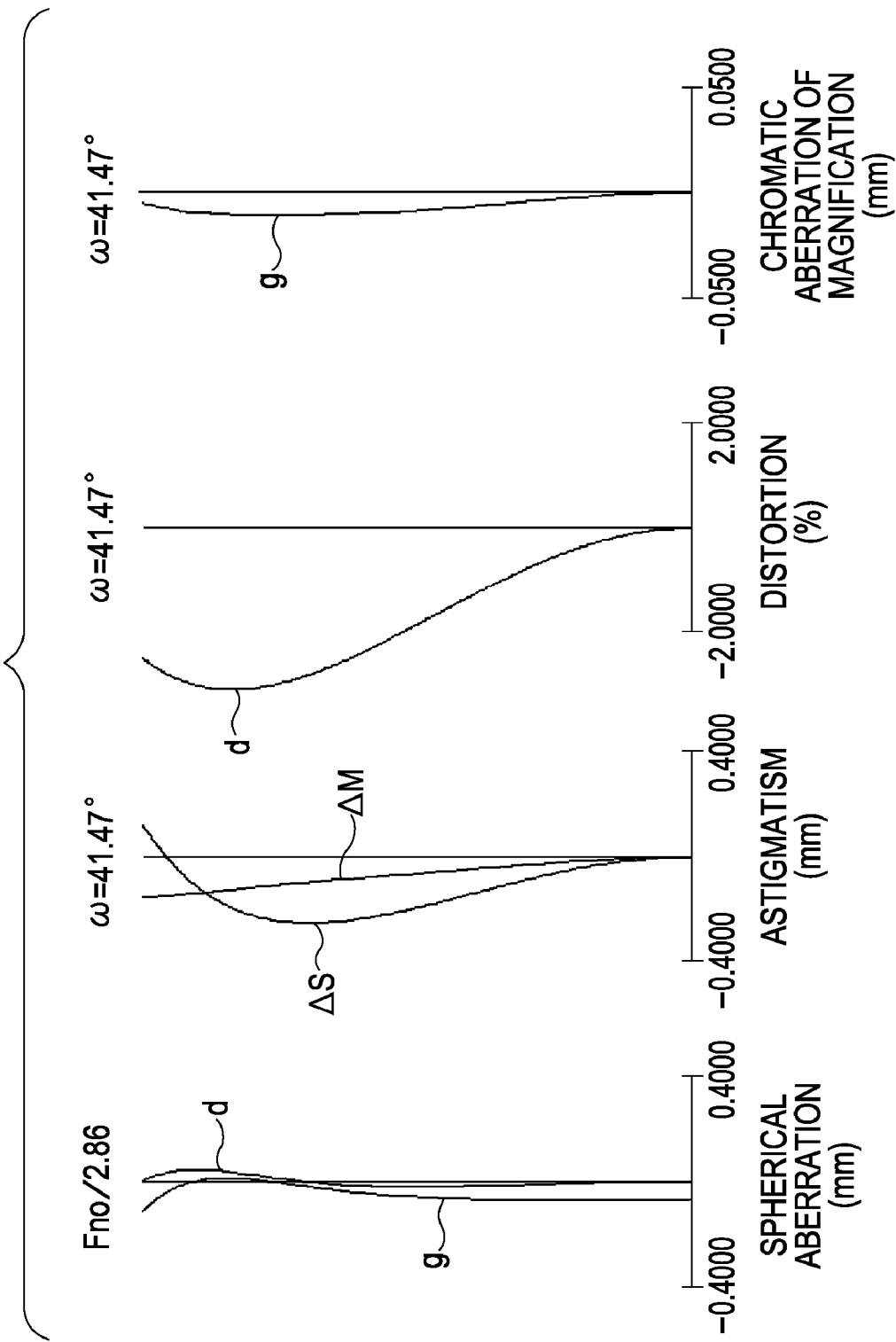
FIG. 14 is an aberration diagram according to the seventh numerical embodiment.

According to a seventh exemplary embodiment, as shown in FIG. 13, an optical system is a wide-angle (retrofocus) lens. As used herein, the term "wide-angle lens" refers to a lens system having the focal length that is shorter than the total lens length thereof.

According to the seventh exemplary embodiment, as shown in FIG. 13, the optical system is a wide-angle lens having a focal length of 24.5 mm. The optical system includes a first lens group L1 having a negative refractive power, a second lens group L2 having a negative refractive power, and a third lens group L3 having a positive refractive power. The first lens group L1 is moved along the light axis for a focusing purpose.

According to the present exemplary embodiment, the lens (layer) GNL1 composed of the UV-curable resin 1 is employed as part of the optical system. In addition, the lens (layer) GL1 composed of a mixture of the UV-curable resin 2 and 5% by volume ITO fine particles dispersed therein is employed.

According to the seventh exemplary embodiment, the optical system includes the lens (layer) GNL1 composed of a UV-curable resin and having a positive refractive power and the lens (layer) GL1 composed of a mixture including ITO fine particles and having a negative refractive power on the image side of the point P at which the light axis intersects the paraxial chief ray. In this way, a wide-angle lens having sufficiently corrected axial chromatic aberration and chromatic aberration of magnification can be achieved.

Particular values used in first to seventh numerical embodiments, which correspond to the first to seventh exemplary embodiments, are described below. In the following numerical embodiments, i denotes the order of a surface numbered from the object. Ri denotes the radius of curvature of the ith optical surface, and Di denotes a distance between the ith surface and the (i+1)th surface along the light axis. Ni and vi denote the index of refraction and the Abbe number of a material of the ith optical element (excluding a lens (layer) composed of a resin, a material including $TiO_2$ fine particles dispersed therein, or a material including ITO fine particles dispersed therein) for the d-line, respectively. NGNLj and vGNLj denote the index of refraction and the Abbe number of a material of a lens GNLj composed of a resin, a material including $TiO_2$ fine particles dispersed therein, or a material including ITO fine particles dispersed therein for the d-line, respectively. Here, j=1, 2, . . . "f" denotes the focal length of an optical system. "Fno" denotes the F number. "ω" denotes the half angle of field.

The shape of an aspherical surface is expressed by the following equation:

$$x(h) = \frac{(1/r)h^2}{1 + \sqrt{\{1 - (1+k)(h/r^2)\}}} + Bh^4 + Ch^6 + Dh^8 + Eh^{10} + \ldots$$

where
X is an amount of displacement from the surface vertex in the light axis direction,
h is a height from the light axis in a direction perpendicular to the light axis,
r is the paraxial radius of curvature,
k is the conic constant, and
B, C, D, E, . . . are aspherical coefficients at respective orders.

In Table 3 and in each aspherical coefficient, "E±XX" means "$\times 10^{\pm XX}$".

In the first numerical embodiment, the five planes (the planes having a radius of curvature of ∞) that are the closest to the image side correspond to an insertion filter, an optical lowpass filter, an infrared cut filter and the like.

Table 1 shows the indices of refraction, the Abbe numbers, and the relative partial dispersions of the refractive optical system portions GNL1 and GL1 for d-line, g-line, C-line, and F-line. Table 2 shows the indices of refraction, the Abbe numbers, and the relative partial dispersions of the UV-curable resin 2, ITO, and $TiO_2$ for d-line, g-line, C-line, and F-line. Table 3 shows the focal lengths fGNLj and fGLj of the refractive optical elements GNLj and GLj.

(First Numerical Embodiment)
f = 6.15~20.45~71.28 Fno = 2.88~3.80~3.55 2ω = 60.68°~19.96°~5.78°

| | | | |
|---|---|---|---|
| R1 = 71.850 | D1 = 2.00 | N1 = 1.8500 | ν1 = 23.0 |
| R2 = 31.416 | D2 = 0.99 | NGNL1 = 1.6356 | νGNL1 = 22.7 |
| R3 = 40.451 | D3 = 0.05 | NGL1 = 1.5648 | νGL1 = 20.0 |
| R4 = 37.918 | D4 = 4.41 | N2 = 1.4932 | ν2 = 69.7 |
| R5 = −323.443 | D5 = 0.15 | | |
| R6 = 33.430 | D6 = 3.10 | N3 = 1.7498 | ν3 = 51.4 |
| R7 = 151.878 | D7 = Variable | | |
| R8 = 57.767 | D8 = 0.90 | N4 = 1.8582 | ν4 = 42.8 |
| R9 = 8.856 | D9 = 3.82 | | |
| R10 = −30.420 | D10 = 0.75 | N5 = 1.6017 | ν5 = 61.3 |
| R11 = 24.070 | D11 = 0.79 | | |
| R12 = 16.552 | D12 = 1.89 | N6 = 1.9152 | ν6 = 20.6 |
| R13 = 50.082 | D13 = Variable | | |
| R14 = ∞ (Aperture Stop) | D14 = Variable | | |
| R15 = 7.672 (Aspherical | D15 = 2.81 | N7 = 1.5604 | ν7 = 63.9 |
| R16 = 262.567 Surface) | D16 = 2.30 | | |
| R17 = 20.630 | D17 = 0.70 | N8 = 1.8167 | ν8 = 31.9 |
| R18 = 7.094 | D18 = 0.98 | | |
| R19 = 36.555 | D19 = 1.70 | N9 = 1.6129 | ν9 = 60.7 |
| R20 = −67.789 | D20 = Variable | | |
| R21 = ∞ | D21 = Variable | | |
| R22 = 16.043 | D22 = 2.65 | N10 = 1.7753 | ν10 = 50.2 |
| R23 = −12.932 | D23 = 0.80 | N11 = 1.7103 | ν11 = 29.1 |
| R24 = 116.489 | D24 = Variable | | |
| R25 = ∞ | D25 = 0.31 | N12 = 1.5443 | ν12 = 70.6 |
| R26 = ∞ | D26 = 0.50 | N13 = 1.4940 | ν13 = 75.0 |
| R27 = ∞ | D27 = 0.80 | | |
| R28 = ∞ | D28 = 0.50 | N14 = 1.4983 | ν14 = 65.1 |
| R29 = ∞ | | | |

| | Focal Length | | |
|---|---|---|---|
| Variable Distance | 6.15 | 20.45 | 71.28 |
| D7 | 0.80 | 18.23 | 31.76 |
| D13 | 25.61 | 13.43 | 1.29 |
| D14 | 9.13 | 1.20 | 2.48 |
| D20 | 1.10 | 2.19 | 4.98 |
| D21 | 3.00 | 4.99 | 5.92 |
| D24 | 9.09 | 12.28 | 6.87 |

Aspherical Coefficient

| | k | B | C | D | E |
|---|---|---|---|---|---|
| 15th Surface | −4.1923E−01 | −6.0718E−05 | 7.5575E−08 | −2.3825E−08 | 4.7278E−10 |

(Second Numerical Embodiment)
f = 294.0 Fno = 4.14 2ω = 8.42°

| | | | |
|---|---|---|---|
| R1 = ∞ | D1 = 3.30 | N1 = 1.5860 | ν1 = 58.6 |
| R2 = ∞ | D2 = 0.15 | | |
| R3 = 193.388 | D3 = 8.76 | N2 = 1.5212 | ν2 = 67.0 |
| R4 = −173.765 | D4 = 1.20 | NGNL1 = 1.6356 | νGNL1 = 22.7 |
| R5 = −131.984 (Aspherical | D5 = 0.05 | NGL1 = 1.5648 | νGL1 = 20.0 |
| R6 = −161.149 Surface) | D6 = 0.15 | | |
| R7 = 74.247 | D7 = 6.64 | N3 = 1.4870 | ν3 = 70.4 |
| R8 = 176.418 | D8 = 5.16 | | |
| R9 = −257.193 | D9 = 3.40 | N4 = 1.7641 | ν4 = 27.9 |
| R10 = 845.002 | D10 = 0.15 | | |
| R11 = 50.201 | D11 = 8.33 | N5 = 1.4870 | ν5 = 40.4 |
| R12 = 138.171 | D12 = 6.50 | | |
| R13 = 45.368 | D13 = 3.00 | N6 = 1.8490 | ν6 = 26.7 |
| R14 = 33.543 | D14 = 11.75 | | |
| R15 = ∞ (Aperture Stop) | D15 = 0.00 | | |
| R16 = ∞ | D16 = 4.00 | | |
| R17 = 159.894 | D17 = 3.17 | N7 = 1.7294 | ν7 = 27.0 |
| R18 = −216.482 | D18 = 2.00 | N8 = 1.8850 | ν8 = 41.0 |
| R19 = 81.708 | D19 = 32.13 | | |
| R20 = 99.214 | D20 = 1.60 | N9 = 1.8500 | ν9 = 23.0 |

-continued (Second Numerical Embodiment)
f = 294.0 Fno = 4.14 2ω = 8.42°

| | | | |
|---|---|---|---|
| R21 = 26.424 | D21 = 7.15 | N10 = 1.5812 | ν10 = 39.5 |
| R22 = −50.918 | D22 = 0.16 | | |
| R23 = ∞ | D23 = 0.00 | | |
| R24 = 95.554 | D24 = 4.32 | N11 = 1.8600 | ν11 = 26.4 |
| R25 = −37.008 | D25 = 1.50 | N12 = 1.7800 | ν12 = 50.0 |
| R26 = 26.014 | D26 = 5.75 | | |
| R27 = −24.230 | D27 = 1.50 | N13 = 1.6200 | ν13 = 60.3 |
| R28 = −56.688 | D28 = 2.93 | | |
| R29 = 47.995 | D29 = 7.97 | N14 = 1.5450 | ν14 = 46.5 |
| R30 = −28.966 | D30 = 1.80 | N15 = 1.8850 | ν15 = 41.0 |
| R31 = −63.496 | | | |

Aspherical Coefficient

| | k | B | C | D | E |
|---|---|---|---|---|---|
| 5th Surface | −4.36842E−01 | 2.38651E−08 | 3.19153E−13 | 5.47944E−15 | 4.24280E−19 |

(Third Numerical Embodiment)
f = 294.0 Fno = 4.14 2ω = 8.42°

| | | | |
|---|---|---|---|
| R1 = ∞ | D1 = 3.30 | N1 = 1.5860 | ν1 = 58.6 |
| R2 = ∞ | D2 = 0.15 | | |
| R3 = 118.585 | D3 = 9.49 | N2 = 1.7581 | ν2 = 51.0 |
| R4 = −282.888 | D4 = 0.39 | NGNL1 = 1.7088 | νGNL1 = 21.63 |
| R5 = −245.580 | D5 = 0.05 | NGL1 = 1.5963 | νGL1 = 13.86 |
| R6 = −304.535 | D6 = 0.15 | | |
| R7 = 111.528 | D7 = 6.25 | N3 = 1.4870 | ν3 = 70.4 |
| R8 = 790.662 | D8 = 5.08 | | |
| R9 = −257.290 | D9 = 3.40 | N4 = 1.8571 | ν4 = 25.3 |
| R10 = 198.501 | D10 = 0.15 | | |
| R11 = 51.772 | D11 = 7.14 | N5 = 1.4872 | ν5 = 70.3 |
| R12 = 122.949 | D12 = 8.63 | | |
| R13 = 48.864 | D13 = 3.00 | N6 = 1.6224 | ν6 = 60.1 |
| R14 = 34.346 | D14 = 10.96 | | |
| R15 = ∞ (Aperture Stop) | D15 = 0.00 | | |
| R16 = ∞ | D16 = 4.00 | | |
| R17 = 165.105 | D17 = 3.24 | N7 = 1.7308 | ν7 = 26.9 |
| R18 = −171.100 | D18 = 2.00 | N8 = 1.8850 | ν8 = 41.0 |
| R19 = 81.708 | D19 = 33.04 | | |
| R20 = 103.672 | D20 = 1.60 | N9 = 1.8500 | ν9 = 23.0 |
| R21 = 27.632 | D21 = 6.69 | N10 = 1.6240 | ν10 = 36.0 |
| R22 = −55.631 | D22 = 0.75 | | |
| R23 = ∞ | D23 = 0.00 | | |
| R24 = 73.585 | D24 = 4.11 | N11 = 1.8610 | ν11 = 26.8 |
| R25 = −50.590 | D25 = 1.50 | N12 = 1.7800 | ν12 = 50.0 |
| R26 = 25.300 | D26 = 5.81 | | |
| R27 = −27.223 | D27 = 1.50 | N13 = 1.7800 | ν13 = 50.0 |
| R28 = −56.849 | D28 = 2.74 | | |
| R29 = 46.248 | D29 = 7.00 | N14 = 1.5348 | ν14 = 49.2 |
| R30 = −30.195 | D30 = 2.38 | N15 = 1.8850 | ν15 = 41.0 |
| R31 = −70.012 | | | |

(Fourth Numerical Embodiment)
f = 294.0 Fno = 4.14 2ω = 8.42°

| | | | |
|---|---|---|---|
| R1 = ∞ | D1 = 3.30 | N1 = 1.5860 | ν1 = 58.6 |
| R2 = ∞ | D2 = 0.15 | | |
| R3 = 155.141 | D3 = 8.31 | N2 = 1.5797 | ν2 = 62.6 |
| R4 = −266.200 | D4 = 1.50 | NGNL1 = 1.6959 | νGNL1 = 17.7 |
| R5 = −167.163 | D5 = 0.05 | NGL1 = 1.5425 | νGL1 = 29.0 |
| R6 = −220.744 | D6 = 0.15 | | |
| R7 = 92.229 | D7 = 7.11 | N3 = 1.5387 | ν3 = 65.5 |
| R8 = 532.897 | D8 = 3.14 | | |
| R9 = −269.965 | D9 = 3.40 | N4 = 1.8654 | ν4 = 28.7 |
| R10 = 130.581 | D10 = 0.15 | | |
| R11 = 84.739 | D11 = 8.54 | N5 = 1.4873 | ν5 = 70.4 |

-continued (Fourth Numerical Embodiment)
f = 294.0 Fno = 4.14 2ω = 8.42°

| | | | |
|---|---|---|---|
| R12 = −562.348 | D12 = 19.08 | | |
| R13 = 41.082 | D13 = 3.00 | N6 = 1.4870 | ν6 = 70.4 |
| R14 = 36.019 | D14 = 10.63 | | |
| R15 = ∞ (Aperture Stop) | D15 = 0.00 | | |
| R16 = ∞ | D16 = 4.00 | | |
| R17 = 169.956 | D17 = 3.76 | N7 = 1.7498 | ν7 = 26.2 |
| R18 = −111.526 | D18 = 2.00 | N8 = 1.8819 | ν8 = 38.5 |
| R19 = 81.708 | D19 = 31.37 | | |
| R20 = 93.664 | D20 = 1.60 | N9 = 1.8500 | ν9 = 23.0 |
| R21 = 28.356 | D21 = 6.58 | N10 = 1.6279 | ν10 = 42.0 |
| R22 = −61.505 | D22 = 0.15 | | |
| R23 = ∞ | D23 = 0.00 | | |
| R24 = 78.718 | D24 = 6.43 | N11 = 1.8610 | ν11 = 26.8 |
| R25 = −42.700 | D25 = 1.50 | N12 = 1.7568 | ν12 = 51.0 |
| R26 = 24.842 | D26 = 5.87 | | |
| R27 = −27.135 | D27 = 1.50 | N13 = 1.5906 | ν13 = 61.9 |
| R28 = −86.343 | D28 = 3.52 | | |
| R29 = 45.811 | D29 = 9.72 | N14 = 1.5202 | ν14 = 53.8 |
| R30 = −29.816 | D30 = 3.00 | N15 = 1.8850 | ν15 = 41.0 |
| R31 = −67.113 | | | |

(Fifth Numerical Embodiment)
f = 294.0 Fno = 4.14 2ω = 8.42°

| | | | |
|---|---|---|---|
| R1 = ∞ | D1 = 3.30 | N1 = 1.5860 | ν1 = 58.6 |
| R2 = ∞ | D2 = 0.15 | | |
| R3 = 165.948 | D3 = 9.02 | N2 = 1.4870 | ν2 = 70.4 |
| R4 = −189.026 | D4 = 0.15 | | |
| R5 = 107.153 | D5 = 6.00 | N3 = 1.4870 | ν3 = 70.4 |
| R6 = 379.005 | D6 = 1.50 | NGNL1 = 1.5532 | νGNL1 = 39.8 |
| R7 = 27779.873 (Aspherical Surface) | D7 = 0.05 | NGL1 = 1.7127 | νGL1 = 13.8 |
| R8 = 556.147 | D8 = 5.47 | | |
| R9 = −242.960 | D9 = 3.40 | N4 = 1.8838 | ν4 = 39.94 |
| R10 = 503.260 | D10 = 1.11 | | |
| R11 = 83.132 | D11 = 7.39 | N5 = 1.4870 | ν5 = 70.4 |
| R12 = 1008.384 | D12 = 17.33 | | |
| R13 = 51.173 | D13 = 3.00 | N6 = 1.5115 | ν6 = 64.0 |
| R14 = 40.513 | D14 = 10.12 | | |
| R15 = ∞ (Aperture Stop) | D15 = 0.00 | | |
| R16 = ∞ | D16 = 4.00 | | |
| R17 = 177.678 | D17 = 4.00 | N7 = 1.7652 | ν7 = 25.6 |
| R18 = −105.297 | D18 = 2.00 | N8 = 1.8823 | ν8 = 38.8 |
| R19 = 81.708 | D19 = 32.54 | | |
| R20 = 103.789 | D20 = 1.60 | N9 = 1.8564 | ν9 = 25.1 |
| R21 = 34.769 | D21 = 6.04 | N10 = 1.6702 | ν10 = 53.7 |
| R22 = −79.264 | D22 = 0.15 | | |
| R23 = ∞ | D23 = 0.00 | | |
| R24 = 49.645 | D24 = 5.28 | N11 = 1.8585 | ν11 = 26.3 |
| R25 = −132.812 | D25 = 1.50 | N12 = 1.7276 | ν12 = 52.5 |
| R26 = 23.745 | D26 = 6.39 | | |
| R27 = −41.576 | D27 = 1.50 | N13 = 1.6958 | ν13 = 54.4 |
| R28 = 342.785 | D28 = 4.04 | | |
| R29 = 47.170 | D29 = 7.53 | N14 = 1.5269 | ν14 = 51.6 |
| R30 = −30.301 | D30 = 1.80 | N15 = 1.8850 | ν15 = 41.0 |
| R31 = −67.490 | | | |

Aspherical Coefficient

| | k | B | C | D | E |
|---|---|---|---|---|---|
| 7th Surface | 1.46158E+05 | 1.69205E−09 | −3.32770E−12 | 1.16835E−15 | −5.92857E−19 |

(Sixth Numerical Embodiment)
f = 294.0 Fno = 4.14 2ω = 8.42°

| | | | |
|---|---|---|---|
| R1 = 157.370 | D1 = 8.97 | N1 = 1.5163 | ν1 = 64.1 |
| R2 = −204.567 | D2 = 0.76 | NGNL1 = 1.6356 | νGNL1 = 22.7 |
| R3 = −168.921 | D3 = 0.15 | | |
| R4 = 96.414 | D4 = 8.62 | N2 = 1.5638 | ν2 = 60.7 |
| R5 = −643.669 | D5 = 0.05 | NGL1 = 1.5425 | νGL1 = 29.1 |
| R6 = 1526.834 | D6 = 2.80 | | |
| R7 = −228.046 | D7 = 3.40 | N3 = 1.8340 | ν3 = 37.2 |
| R8 = 129.968 | D8 = 0.73 | | |
| R9 = 72.569 | D9 = 8.93 | N4 = 1.4875 | ν4 = 70.2 |
| R10 = 5162.619 | D10 = 13.48 | | |
| R11 = 43.936 | D11 = 3.50 | N5 = 1.8052 | ν5 = 25.4 |
| R12 = 37.942 | D12 = 10.71 | | |
| R13 = ∞ (Aperture Stop) | D13 = 4.00 | | |
| R14 = 139.290 | D14 = 4.00 | N6 = 1.7215 | ν6 = 29.2 |
| R15 = −133.808 | D15 = 2.00 | N7 = 1.8830 | ν7 = 40.8 |
| R16 = 81.708 | D16 = 29.31 | | |
| R17 = 133.715 | D17 = 1.80 | N8 = 1.8467 | ν8 = 23.8 |
| R18 = 27.935 | D18 = 8.13 | N9 = 1.6668 | ν9 = 33.1 |
| R19 = −60.022 | D19 = 0.15 | | |
| R20 = 90.843 | D20 = 6.00 | N10 = 1.8340 | ν10 = 37.2 |
| R21 = −39.347 | D21 = 2.30 | N11 = 1.7725 | ν11 = 49.6 |
| R22 = 26.618 | D22 = 5.82 | | |
| R23 = −26.518 | D23 = 1.50 | N12 = 1.4875 | ν12 = 70.2 |
| R24 = −107.094 | D24 = 2.58 | | |
| R25 = 50.997 | D25 = 9.00 | N13 = 1.5481 | ν13 = 45.8 |
| R26 = −31.115 | D26 = 3.00 | N14 = 1.8830 | ν14 = 40.8 |
| R27 = −64.669 | | | |

(Seventh Numerical Embodiment)
f = 24.5 Fno = 2.9 2ω = 82.9°

| | | | |
|---|---|---|---|
| R1 = 68.243 | D1 = 3.88 | N1 = 1.6200 | ν1 = 60.3 |
| R2 = 252.730 | D2 = 0.15 | | |
| R3 = 41.127 | D3 = 1.00 | N2 = 1.8850 | ν2 = 41.0 |
| R4 = 15.870 | D4 = 7.54 | | |
| R5 = 17.325 | D5 = 2.68 | N3 = 1.8500 | ν3 = 23.0 |
| R6 = 23.812 | D6 = 4.21 | | |
| R7 = 24.185 | D7 = 0.90 | N4 = 1.8567 | ν4 = 25.2 |
| R8 = 11.353 | D8 = 2.28 | | |
| R9 = 40.705 | D9 = 2.50 | N5 = 1.8524 | ν5 = 23.7 |
| R10 = −104.354 | D10 = 0.15 | | |
| R11 = −198.801 | D11 = 4.50 | N6 = 1.5153 | ν6 = 67.5 |
| R12 = 30.450 | D12 = 4.68 | | |
| R13 = ∞ (Aperture Stop) | D13 = 0.15 | | |
| R14 = 33.576 | D14 = 5.36 | N7 = 1.7891 | ν7 = 40.1 |
| R15 = −19.804 | D15 = 2.82 | | |
| R16 = −19.673 | D16 = 4.00 | N8 = 1.8500 | ν8 = 23.0 |
| R17 = 31.003 | D17 = 0.60 | NGNL1 = 1.6356 | νGNL1 = 22.7 |
| R18 = 134.602 | D18 = 0.05 | NGL1 = 1.5425 | νGL1 = 29.1 |
| R19 = 42.978 | D19 = 1.11 | | |
| R20 = −69.862 | D20 = 2.46 | N9 = 1.4870 | ν9 = 70.4 |
| R21 = −16.976 | D21 = 0.15 | | |
| R22 = 2113.644 | D22 = 2.82 | N10 = 1.6701 | ν10 = 56.1 |
| R23 = −25.957 | | | |

TABLE 1

| Conditional Expression | | First Embodiment | | Second Embodiment | | Third Embodiment | | Fourth Embodiment | |
|---|---|---|---|---|---|---|---|---|---|
| | | First Optical Element GNL1 14.2% UV-curable resin 1 | Second Optical Element GL1 14.2% ITO - UV-curable resin 2 | First Optical Element GNL1 14.2% UV-curable resin 1 | Second Optical Element GL1 14.2% ITO - UV-curable resin 2 | First Optical Element GNL1 20% TiO2 - UV-curable resin 2 | Second Optical Element GL1 20% ITO - UV-curable resin 2 | First Optical Element GNL1 N-polyvinyl carbazole | Second Optical Element GL1 5% ITO - UV-curable resin 2 |
| | Nd | 1.6356 | 1.5648 | 1.6356 | 1.5648 | 1.7088 | 1.5963 | 1.6959 | 1.5425 |
| | Ng | 1.6753 | 1.5941 | 1.6753 | 1.5941 | 1.7599 | 1.6383 | 1.7516 | 1.5630 |
| | NC | 1.6281 | 1.5544 | 1.6281 | 1.5544 | 1.7003 | 1.5804 | 1.6853 | 1.5362 |
| | NF | 1.6560 | 1.5826 | 1.6560 | 1.5826 | 1.7331 | 1.6234 | 1.7246 | 1.5549 |
| 5, 6 | νd | 22.73 | 20.03 | 22.73 | 20.03 | 21.63 | 13.86 | 17.68 | 29.05 |
| | θgd | 1.4220 | 1.0362 | 1.4220 | 1.0362 | 1.5594 | 0.9761 | 1.4155 | 1.0963 |
| | θgF | 0.6895 | 0.4069 | 0.6895 | 0.4069 | 0.8170 | 0.3459 | 0.6856 | 0.4346 |
| 3, 4 | Δθgd | 0.0826 | −0.3151 | 0.0826 | −0.3151 | 0.2152 | −0.4049 | 0.0533 | −0.2178 |
| 1, 2 | ΔθgF | 0.0652 | −0.2272 | 0.0652 | −0.2272 | 0.1888 | −0.3130 | 0.0424 | −0.1688 |
| Conditional Expression | | Fifth Embodiment | | Sixth Embodiment | | Seventh Embodiment | | | |
| | | First Optical Element GNL1 3% TiO2 - UV-curable resin 2 | Second Optical Element GL1 10% ITO - N-polyvinyl carbazole | First Optical Element GNL1 UV-curable resin 1 | Second Optical Element GL1 5% ITO - UV-curable resin 2 | First Optical Element GNL1 UV-curable resin 1 | Second Optical Element GL1 5% ITO - UV-curable resin 2 | | |
| | Nd | 1.5532 | 1.7127 | 1.6356 | 1.5425 | 1.6356 | 1.5425 | | |
| | Ng | 1.5725 | 1.7772 | 1.6753 | 1.5630 | 1.6753 | 1.5630 | | |
| | NC | 1.5494 | 1.6969 | 1.6281 | 1.5362 | 1.6281 | 1.5362 | | |
| | NF | 1.5633 | 1.7483 | 1.6560 | 1.5549 | 1.6560 | 1.5549 | | |
| 5, 6 | νd | 39.81 | 13.85 | 22.73 | 29.05 | 22.73 | 29.05 | | |
| | θgd | 1.3852 | 1.2527 | 1.4220 | 1.0963 | 1.4220 | 1.0963 | | |
| | θgF | 0.6645 | 0.5604 | 0.6895 | 0.4346 | 0.6895 | 0.4346 | | |
| 3, 4 | Δθgd | 0.1063 | −0.1283 | 0.0826 | −0.2178 | 0.0826 | −0.2178 | | |
| 1, 2 | ΔθgF | 0.0898 | −0.0986 | 0.0652 | −0.1688 | 0.0652 | −0.1688 | | |

TABLE 2

| | UV Curable Resin 2 | ITO | TiO$_2$ |
|---|---|---|---|
| Nd | 1.52415 | 1.85712 | 2.30377 |
| Ng | 1.53706 | 1.99244 | 2.45676 |
| NC | 1.52116 | 1.79794 | 2.28032 |
| NF | 1.53133 | 1.94870 | 2.37452 |
| νd | 51.55 | 5.69 | 13.84 |
| θgd | 1.269 | 0.898 | 1.624 |
| θg, F | 0.563 | 0.290 | 0.873 |

TABLE 3

| | fGNL 1 | fGL 1 | fGNL 1 × fGL 1 |
|---|---|---|---|
| First Embodiment | 212.26 | −1080.03 | −2.292E+05 |
| Second Embodiment | 854.15 | −1291.92 | −1.103E+06 |
| Third Embodiment | 2589.31 | −2118.06 | −5.484E+06 |
| Fourth Embodiment | 641.66 | −1269.85 | −8.148E+05 |
| Fifth Embodiment | 694.53 | −796.27 | −5.530E+05 |
| Sixth Embodiment | 1512.77 | −834.61 | −1.263E+06 |
| Seventh Embodiment | 63.24 | −116.40 | −7.361E+03 |

An optical system according to an exemplary embodiment of the present invention is described below. The intersecting point of a light axis La and a paraxial chief ray R is defined as "P". This optical system is a telephoto optical system that is configured so that the maximum height of the paraxial marginal ray from the light axis when the paraxial marginal ray passes through the lens surface on the enlargement side of the point P is greater than that on the reduction side relative to the point P.

In the telephoto optical systems (optical systems having the total lens length shorter than the focal length), a refractive optical element (hereinafter simply referred to as an "optical element") composed of a solid material that has a positive or negative refractive power and that satisfies the following conditions is employed.

As used herein, the term "solid material" of the refractive optical element refers to a material that is solid in a use environment of the optical system. Accordingly, the material may be in any state before the optical system is in use (e.g., during a fabrication period). For example, even when the material is liquid during the fabrication period, the material is referred to as a "solid material" if the liquid material is cured into a solid material.

Figure 27:
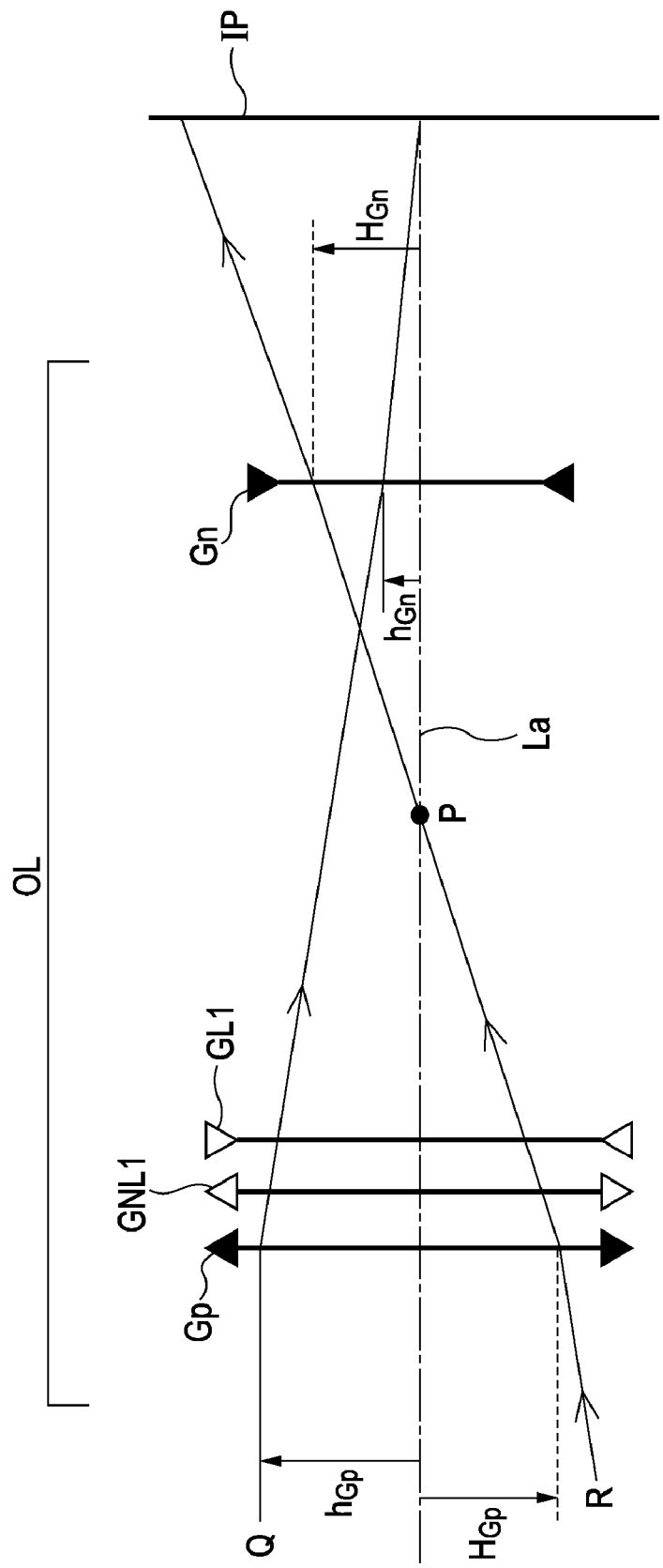
FIG. 27 is a schematic illustration of a paraxial refractive power arrangement of the optical system according to an embodiment of the present invention.

FIG. 27 is a schematic illustration of a paraxial refractive power arrangement for illustrating the optical function of the optical system according to the present embodiment. As shown in FIG. 27, an optical system OL is of a telephoto type having the total lens length (the distance between the first lens surface and the image plane) that is shorter than the focal length. The telephoto optical system OL includes a front lens group Gp having a positive refractive power and a rear lens group Gn having a negative refractive power. The front lens group Gp includes a first refractive optical element (a first optical element) GNL1 and a second refractive optical element (a second optical element) GL1 composed of a solid material that satisfies the following conditional expressions (9) to (16). Hereinafter, the solid material is simply referred to as a "material". For simplicity, all of the lenses included in the front lens group Gp and the rear lens group Gn are thin single lenses. These lenses are disposed along a light axis La in the front lens group Gp and the rear lens group Gn so that the distances therebetween are zero. In addition, each of the first refractive optical element GNL1 and the second refractive optical element GL is a thin single lens. The refractive optical system portion GNL and the second refractive optical element GL are disposed along the light axis La in the front lens group Gp so that the distance therebetween is zero. A paraxial marginal ray Q is a paraxial ray that, when the focal length of the entire optical system is normalized to "1", travels parallel to the light axis of the optical system at a height of "1" from the light axis and is made incident on the optical system. It is assumed that an object is disposed on the left side of the optical system, and a light ray made incident on the optical system from the object side travels from the left to the right. A paraxial chief ray R is a paraxial ray that, when the focal length of the entire optical system is normalized to "1", passes through an intersection between the entrance pupil and the light axis of the optical system among light rays made incident on the optical system at an angle of −45° with respect to the light axis. The incident angle of a ray is positive if the ray is measured from the light axis in a clockwise direction, while the incident angle is negative if the ray is measured from the light axis in a counterclockwise direction. The intersecting point of the light axis La and a paraxial chief ray R is defined as "P". The image plane is denoted as "IP".

As shown in FIG. 27, in the optical system OL, a maximum height $h_{Gp}$ of the paraxial marginal ray Q from the light axis La when the paraxial marginal ray Q passes through the lens surface on the enlargement side (the object side) is greater than a maximum height $h_{Gn}$ of the paraxial marginal ray Q from the light axis La when the paraxial marginal ray Q passes through the lens surface on the reduction side (the image side) relative to the point P. That is, $H_{Gp}$ and $H_{Gn}$ represent the heights of the paraxial chief ray R from the light axis La when the paraxial chief ray R is made incident on the front lens group Gp and the rear lens group Gn, respectively.

The features of the optical system OL according to the present exemplary embodiment are described next.

Let ft denote the focal length of the entire lens system, and Lt denote the total lens length (the distance between the first lens surface and the image plane).

As described above, let P denote the intersecting point of the light axis La and the paraxial chief ray R. The optical system OL includes a first optical element GNL1 and a second optical element GL1 on at least one of the enlargement side and the reduction side of the point P. Each of the first optical element GNL1 and the second optical element GNL2 has a refractive light incident surface and a refractive light emergent surface and is made of a solid material.

Let $\Delta\theta gF1$ and $\Delta\theta gF2$ denote the anomalous partial dispersion values of the first optical element GNL1 and the second optical element GL1 for the Fraunhofer g-line and F-line, respectively.

Let $\phi 1$ and $\phi 2$ denote the refractive powers of the first optical element GNL1 and the second optical element GL1 when the incident and emergent surfaces of the first optical element GNL1 and the second optical element GL1 are in contact with air.

Let $\Delta\theta gF1$ and $\Delta\theta gF2$ denote the anomalous partial dispersion values of the materials of the first optical element GNL1 and the second optical element GL1 for the Fraunhofer g-line and d-line, respectively.

Let vd1 and vd2 denote the Abbe numbers of the materials of the first optical element GNL1 and the second optical element GL1, respectively.

Then, at least one of the following conditional expressions is satisfied:

$$Lt/ft<1.0 \tag{8}$$

$$\Delta\theta gF1>0.0272 \tag{9}$$

$$\Delta\theta gF2<-0.0278 \tag{10}$$

$$\Delta\theta gd1>0.038 \tag{11}$$

$$\Delta\theta gd2<-0.037 \tag{12}$$

$$vd1<60 \tag{13}$$

$$vd2<60 \tag{14}$$

$$\phi 1\times\phi 2<0 \tag{15}$$

$$(\phi 1\times\Delta\theta gF1/vd1)/(\phi 2\times\Delta\theta gF2/vd2)<1.5 \tag{16}$$

For the optical element used in the optical system according to the present exemplary embodiment, the Abbe number vd, the relative partial dispersion $\theta gd$ of the solid material for the Fraunhofer g-line and d-line, and the relative partial dispersion $\theta gF$ of the solid material for the Fraunhofer g-line and F-line are defined as follows:

$$vd=(Nd-1)/(NF-NC)$$

$$\theta gd=(Ng-Nd)/(NF-NC)$$

$$\theta gF=(Ng-NF)/(NF-NC)$$

where Ng, NF, Nd, and NC denote the indices of refraction of the solid material for the Fraunhofer g-line (435.8 nm), the Fraunhofer F-line (486.1 nm), the Fraunhofer d-line (587.6 nm), and the Fraunhofer C-line (656.3 nm), respectively.

In general, the relative partial dispersions $\theta gd$ and $\theta gF$ of the solid material used for a lens system are approximated as follows:

$$\theta gd=-1.687\times 10^{-7}vd^3+5.702\times 10^{-5}vd^2-6.603\times 10^{-3}vd+1.462$$

$$\theta gF=-1.665\times 10^{-7}vd^3+5.213\times 10^{-5}vd^2-5.656\times 10^{-3}vd+0.7278$$

Here, the anomalous partial dispersion values $\Delta\theta gd$ and $\Delta\theta gF$ are expressed as follows:

$$\Delta\theta gd=\theta gd-(-1.687\times 10^{-7}vd^3+5.702\times 10^{-5}vd^2-6.603\times 10^{-3}vd+1.462)$$

$$\Delta\theta gF=\theta gF-(-1.665\times 10^{-7}vd^3+5.213\times 10^{-5}vd^2-5.656\times 10^{-3}vd+0.7278)$$

According to the present exemplary embodiment, the optical system OL includes at least one first refractive optical element GNL1 that is composed of a solid material having high dispersion and high relative partial dispersion and at least one second refractive optical element GL1 that is composed of a solid material having high dispersion and low relative partial dispersion.

As used herein, the term "refractive optical element" refers to an optical element, such as a refractive lens, that produces refractive power using a refracting effect. Thus, a diffractive optical element that produces refractive power using a diffracting effect is not included in the category of the term "refractive optical element".

The optical systems of the exemplary embodiments are telephoto optical systems that satisfy conditional expression (8).

According to the exemplary embodiments, by employing at least one first refractive optical element GNL1 composed of a solid material that satisfies conditional expression (9) and at least one second refractive optical element GL1 composed of a solid material that satisfies conditional expression (10), chromatic aberration of the optical system in the entire wavelength range of visible light can be sufficiently corrected.

By employing solid materials having anomalous partial dispersion values that satisfy conditional expressions (11) and (12), chromatic aberration of the optical system in the range of a short wavelength (400 nm) to a medium wavelength (550 nm) can be sufficiently corrected. In addition, chromatic aberration of the optical system in a wide range of a short wavelength to a long wavelength (700 nm) can be further sufficiently corrected.

By employing solid materials having the Abbe numbers that satisfy conditional expressions (13) and (14), chromatic aberration of the optical system can be easily corrected.

By configuring the first optical element GNL1 and the second optical element GL1 so that the first optical element GNL1 and the second optical element GL1 have refractive powers that satisfy conditional expression (15), chromatic aberration of the optical system in a wide wavelength range can be sufficiently corrected.

In addition, by configuring the first optical element GNL1 and the second optical element GL1 so that conditional expression (16) is satisfied, the optical system can sufficiently correct chromatic aberration mostly occurring in telephoto optical systems.

In the exemplary embodiments, when the first optical element GNL1 and the second optical element GL1 are provided in the optical system, it is desirable that both the first optical element GNL1 and the second optical element GL1 are disposed on the enlargement side relative to the point P at which the light axis La intersects the paraxial chief ray R.

Examples of the solid material (optical material) that satisfies conditional expression (9) include a variety of resins. Among the variety of resins, a UV-curable resin (Nd=1.635, vd=22.7, and θgF=0.69) and N-polyvinyl carbazole (Nd=1.696, vd=17.7, and θgF=0.69) are optical materials that satisfy conditional expression (9). However, in addition to these materials, any solid material that satisfies conditional expression (9) can be employed.

In addition, an optical material having a characteristic that is different from that of a widely used glass material can be used. Examples of such an optical material include a mixture of a synthetic resin and inorganic oxide nanoparticles dispersed therein. Examples of the inorganic oxide nanoparticles include $TiO_2$ particles (Nd=2.304 and vd=13.8), $Nb_2O_5$ particles (Nd=2.367 and vd=14.0), ITO particles (Nd=1.8571 and vd=5.69), $CrO_3$ particles (Nd=2.2178 and vd=13.4), and $BaTiO_3$ particles (Nd=2.4362 and vd=11.3).

Among these types of inorganic oxide, by dispersing $TiO_2$ particles (Nd=2.304, vd=13.8, and θgF=0.87) in a synthetic resin in an appropriate volume ratio, an optical material that satisfies conditional expression (9) can be obtained.

In addition, by dispersing ITO fine particles (Nd=1.8571, vd=5.69, and θgF=0.873) in a synthetic resin in an appropriate volume ratio, an optical material that satisfies conditional expression (10) can be obtained. However, in addition to the above-described materials, any solid material that satisfies conditional expression (10) can be employed.

In the exemplary embodiments, by using an optical material having a relative partial dispersion higher than that of a widely used optical material and an optical material having a relative partial dispersion lower than that of a widely used optical material, chromatic aberration is sufficiently corrected.

In the wavelength-dependent characteristic of the index of refraction (dispersion characteristic) of an optical material, the Abbe number represents the slope of the dispersion characteristic curve, and the relative partial dispersion represents the curvature of the dispersion characteristic curve.

In general, the index of refraction of an optical material in a short-wavelength range is higher than that in a long-wavelength range. At that time, the Abbe number and the relative partial dispersion are positive.

Accordingly, the dispersion characteristic curve is downwardly convex. A change in the index of refraction relative to a change in the wavelength increases towards a short-wavelength range. For example, refractive index characteristics with respect to a wavelength for S-BSL7 (Nd=1.516 and vd=64.1) and S-TIH53 (Nd=1.847 and vd=23.8) available from OHARA corporation are shown in FIG. 41.

In addition, a high-dispersion optical material having a smaller Abbe number tends to have a higher relative partial dispersion for the g-line and F-line and a higher relative partial dispersion for the g-line and d-line.

In widely used optical materials, the relative partial dispersion substantially linearly changes with respect to the Abbe number. However, an optical material having an anomalous partial dispersion changes differently from the linear change. A typical example of such an anomalous partial dispersion material is fluorite.

The wavelength-dependent characteristic curve of a chromatic aberration coefficient of an optical material having a high relative partial dispersion has a large curvature in a short-wavelength range, compared with that of a widely used optical material.

When the refractive power of the lens surface of an optical material having a high relative partial dispersion is changed in order to control the chromatic aberration, the slope of the entire wavelength-dependent characteristic curve of a chromatic aberration coefficient changes such that the entire wavelength-dependent characteristic curve rotates about a point of a reference design wavelength. In particular, the change is significant in a short-wavelength range for an optical material having a high relative partial dispersion. As a result, the slope of the entire wavelength-dependent characteristic curve is changed while significantly changing the curvature in the short-wavelength range.

By using this property, the curvature of the wavelength-dependent characteristic curve of a chromatic aberration coefficient in the short-wavelength range can be canceled. However, it is difficult to correct the remaining slope of the wavelength-dependent characteristic curve of a chromatic aberration coefficient at the same time. In addition, the correction of the curvature in the short-wavelength range relatively increases chromatic aberration in a long-wavelength range. To prevent the increase in chromatic aberration in a long-wavelength range, the refractive power of an appropriate one of the glass surfaces of the optical system needs to be changed. However, this is not suitable for correcting a variety of aberrations other than chromatic aberration.

In contrast, the wavelength-dependent characteristic curve of a chromatic aberration coefficient of an optical material having a low relative partial dispersion has a small curvature in a short-wavelength range. Accordingly, the chromatic aberration coefficient linearly changes with a change in wavelength, compared with that of a widely used optical material. When the refractive power of the lens surface of an optical material having a low relative partial dispersion is changed in order to control the chromatic aberration, the slope of the entire wavelength-dependent characteristic curve of a chromatic aberration coefficient changes such that the entire wavelength-dependent characteristic curve rotates about a point of a reference design wavelength while relatively retaining linearity with respect to the wavelength. In this way, the slope of the wavelength-dependent characteristic curve of a chromatic aberration coefficient can be corrected.

Accordingly, by employing an optical material having a low relative partial dispersion in addition to an optical material having a high relative partial dispersion, the curvature of the wavelength-dependent characteristic curve of a chromatic aberration coefficient in a short-wavelength range and the slope of the entire wavelength-dependent characteristic curve can be corrected at the same time. That is, the chromatic aberration of the optical system can be sufficiently corrected in a wide wavelength range of the g-line to C-line.

Such correction of chromatic aberration of a telephoto lens is described next with reference to a telephoto lens including a refractive optical system portion GNL using an optical material having a high relative partial dispersion, a refractive optical system portion GL using an optical material having a low relative partial dispersion, and a refractive optical system portion G using a widely used optical material having a normal relative partial dispersion.

Chromatic aberration of the refractive optical system portion G is corrected to some extent first. Then, a relatively high-dispersion optical material is selected for a negative lens included in the refractive optical system portion G. In this case, the slope of the entire wavelength-dependent characteristic curve of a chromatic aberration coefficient of the refractive optical system portion G is changed while the portion in a short-wavelength range is significantly curved from the original shape.

At that time, an appropriate refractive power is provided to the refractive optical system portion GNL, and a relatively high-dispersion optical material is selected for a positive lens included in the refractive optical system portion G. However, in the case where the refractive optical system portion GNL is composed of a widely used optical material having a uniform relative partial dispersion with respect to an Abbe number, the refractive optical system portion GNL is partially responsible equally for a curvature component and a slope component of the wavelength-dependent characteristic curve of a chromatic aberration coefficient of the refractive optical system portion G. Therefore, the curvature component and the slope component cannot be canceled at the same time.

In contrast, in the case where the refractive optical system portion GNL is composed of an optical material having a relative partial dispersion higher than that of a widely used optical material, the refractive optical system portion GNL is relatively largely responsible for the slope component of the entire wavelength-dependent characteristic curve of a chromatic aberration coefficient of the main refractive optical system portion G. Therefore, the curvature component can be mainly canceled. As a result, the slope of the entire wavelength-dependent characteristic curve of a chromatic aberration coefficient can be changed while increasing linearity from the original shape.

At that time, by further providing the refractive optical system portion GL with an appropriate refractive power with a plus/minus sign opposite to that of the refractive optical system portion GNL, the slope of the entire wavelength-dependent characteristic curve of a chromatic aberration coefficient of the refractive optical system portion G can be corrected.

However, if the refractive optical system portion GL is composed of a widely used optical material, the refractive optical system portion GL has a characteristic in which the wavelength-dependent characteristic curve of a chromatic aberration coefficient is relatively largely convex in a direction opposite to that corresponding to the wavelength-dependent characteristic curve of the refractive optical system portion G. Accordingly, although the slope component of the entire wavelength-dependent characteristic curve of a chromatic aberration coefficient can be canceled, a curvature component that increases the chromatic aberration occurs.

At that time, to correct the curvature component of the entire wavelength-dependent characteristic curve of a chromatic aberration coefficient, the refractive power of the refractive optical system portion GNL composed of a material having a high relative partial dispersion needs to be further changed. However, if the refractive power is further changed, the thickness of the lens in the light axis direction disadvantageously increases.

In contrast, in the case where the refractive optical system portion GL is composed of an optical material having a low relative partial dispersion, linearity of the wavelength-dependent characteristic curve of a chromatic aberration coefficient of the refractive optical system portion GL is relatively increased. That is, by changing the refractive power of the refractive optical system portion GL in order to correct the chromatic aberration, the slope of the wavelength-dependent characteristic curve of a chromatic aberration coefficient can be changed so that the wavelength-dependent characteristic curve rotates about the point of the design reference wavelength while substantially maintaining linearity. Accordingly, the chromatic aberration can be sufficiently corrected.

As described above, by using the refractive optical system portion GNL and the refractive optical system portion GL for the main refractive optical system portion G, the slope component and the curvature component of the wavelength-dependent characteristic curve of a chromatic aberration coefficient can be relatively easily corrected at the same time.

To sufficiently correct chromatic aberration by using one of the refractive optical system portion GNL and the refractive optical system portion GL, the refractive power of a lens surface of one of the refractive optical system portion GNL and the refractive optical system portion GL and the refractive power of a lens surface of the refractive optical system portion G need to be increased.

That is, by employing the refractive optical system portions GNL and GL, the refractive power of each of the refractive optical system portion GNL and the refractive optical system portion GL can be relatively reduced. As a result, the thickness of the solid material in the light axis direction can be reduced. Furthermore, by employing the refractive optical system portions GNL and GL, the chromatic aberration can be reduced without significantly changing the refractive power of the refractive optical system portion G. Accordingly, a variety of aberrations other than the chromatic aberration can be maintained unchanged.

At that time, to independently correct chromatic aberration, it is desirable that the refractive optical system portion GNL and the refractive optical system portion GL are composed of an optical material having a small Abbe number, that is, a high-dispersion optical material. Furthermore, in the telephoto optical system, it is desirable that at least one refractive optical system portion GNL and at least one refractive optical system portion GL are disposed on the enlargement side relative to the point P at which the paraxial chief ray intersects the light axis.

This is described in detail next with reference to an axial chromatic aberration coefficient and a chromatic aberration coefficient of magnification of a lens surface.

Let $\Delta\Psi$ denote a change in refractive power of a surface of a refractive lens, and v denote the Abbe number. Let h and H denote the heights of the paraxial marginal ray and the paraxial chief ray from the light axis when the paraxial marginal ray and the paraxial chief ray pass through the surface of the refractive lens. Then, a change $\Delta L$ in the axial chromatic aberration coefficient and a change $\Delta T$ in a chromatic aberration coefficient of magnification can be expressed as follows:

$$\Delta L = h^2 \cdot \Delta\Psi / v \quad (a)$$

$$\Delta T = h \cdot H \cdot \Delta\Psi / v \quad (b)$$

As can be seen from equations (a) and (b), the changes in these aberration coefficients with respect to a change in the refractive power of the lens surface increase as the absolute number of the Abbe number decreases (i.e., as the dispersion increases). Accordingly, by using a high-dispersion material having a small absolute number of the Abbe number, the change amount of the refractive power that is required for obtaining a desired chromatic aberration can be reduced.

According to an aberration theory, this allows the chromatic aberration to be controlled without significantly affecting the spherical aberration, coma aberration, and astigmatism aberration. Thus, the chromatic aberration can be highly independently controlled.

In contrast, if a low-dispersion material is employed, the change amount of the refractive power that is required for obtaining a desired chromatic aberration is increased. With the increase in the change amount of the refractive power, a variety of aberrations, such as spherical aberration, significantly change. Thus, the chromatic aberration cannot be independently controlled. Therefore, in order to correct aberrations, it is important that, among the lenses of the optical system, at least one of the surfaces of the lenses is a surface of a refractive lens made of a high-dispersion material.

In addition, equations (a) and (b) indicate that the changes in the axial chromatic aberration coefficient $\Delta L$ and the chromatic aberration coefficient of magnification $\Delta T$ are determined by the values of the heights h and H. Using this result, the optimal arrangement of the refractive optical system portion GNL and the refractive optical system portion GL in the optical system is described next.

To sufficiently correct chromatic aberration, the slope component and the curvature components of the wavelength-dependent characteristic curve of a chromatic aberration coefficient need to be corrected at the same time. However, if the refractive power change $\Delta\Psi$ is decreased, sufficient correction of the chromatic aberration cannot be achieved. In contrast, if the refractive power change $\Delta\Psi$ is increased, the thickness of an optical element (i.e., a lens) is increased.

In general, since the transmittance of the optical material of the refractive optical system portion GNL and the refractive optical system portion GL having an anomalous partial dispersion characteristic is low, the thickness of a lens composed of the optical material needs to be relatively reduced when the refractive optical system portions are used for lenses. In addition, as the thickness decreases, a change in the optical performance with a change in the surrounding environment decreases. Accordingly, the resistance to the surrounding environment increases.

That is, in order to reduce the thicknesses of the refractive optical system portion GNL and the refractive optical system portion GL and sufficiently correct the chromatic aberration, it is desirable that the correction amounts of the slope component and the curvature component of the wavelength-dependent characteristic curve of a chromatic aberration coefficient are appropriately controlled. According to equations (a) and (b), the correction amounts are determined by the heights h and H. Accordingly, the correction amounts change in accordance with the positions of the refractive optical system portions GNL and GL in the optical system. That is, in order to sufficiently correct the chromatic aberration and reduce the change amounts of the refractive powers of the refractive optical system portions GNL and GL, it is important to select the appropriate positions at which the refractive optical system portions GNL and GL are disposed.

The appropriate positions of the refractive optical system portions GNL and GL at which the chromatic aberration is sufficiently corrected and the change amounts of the refractive powers are reduced depend on the aberration structure of the optical system. In addition, the aberration structure varies in accordance with the type of optical system.

For the telephoto optical systems according to the exemplary embodiments, the refractive optical system portions GNL and GL can be disposed on the enlargement side relative to the point P. This arrangement can sufficiently correct axial chromatic aberration and chromatic aberration of magnification. Furthermore, by letting the optical characteristics of the refractive optical system portions GNL and GL satisfy conditional expression (16), axial chromatic aberration and chromatic aberration of magnification can be corrected at the same time, and the curvature component and the slope component of the wavelength-dependent characteristic curve of a chromatic aberration coefficient can be further sufficiently corrected.

At that time, in order to cancel the curvature component and the slope component of the wavelength-dependent characteristic curve of a chromatic aberration coefficient, the product ($\phi 1 \times \phi 2$) of the refractive power of the refractive optical system portion GNL ($\phi 1$) and the refractive power of the refractive optical system portion GL ($\phi 2$) can be negative, as indicated by conditional expression (15). This is due to the wavelength-dependent characteristic of chromatic aberration of the telephoto optical system.

It is more desirable that the following conditions are satisfied: $\phi 1 > 0$ and $\phi 2 < 0$.

In general, when a lens group is moved in order to perform zooming and focusing and control the position of the image, the states of a ray made incident on the lens groups change, and therefore, aberrations occurring in the lens groups change. Accordingly, in order to sufficiently correct the aberrations of the entire optical system in all the use cases, aberration coefficients that simultaneously change in all the use cases need to be determined for each of the lens groups. By disposing the refractive optical system portions GNL and GL in the same lens group, desired aberration values can be easily obtained.

In addition, if the thicknesses of the refractive optical system portions GNL and GL are reduced, a change in the characteristic due to the surrounding environment is reduced. Furthermore, by satisfying conditional expression (15), the changes in the characteristics of the refractive optical system portions GNL and GL cancel each other out. Therefore, the resistance to the surrounding environment can be increased.

A variety of aberrations including chromatic aberration are corrected by the refractive optical system portions GNL and GL in cooperation with a widely used optical material.

Accordingly, the characteristics of the relative partial dispersions of the refractive optical system portions GNL and GL need to be different from that of the widely used optical material in order to correct the aberrations. However, a strong anomalous partial dispersion should be avoided.

When a lens made of an optical material having a characteristic significantly different from that of a widely used optical material is employed, the curvature of the wavelength-dependent characteristic curve of a chromatic aberration coefficient of the lens surface is particularly large. To correct the large curvature component, the refractive powers of other lenses need to be increased. This gives significant impact on the spherical aberration, the coma aberration, and the astigmatism aberration. Thus, it is difficult to correct these aberrations.

That is, the material of the refractive optical system portion GNL needs to be an optical material having a relative partial dispersion higher than that of a widely used optical material, but not having a relative partial dispersion significantly different from that of a widely used optical material.

To obtain further sufficient correction of chromatic aberration, the range of the anomalous partial dispersion value $\Delta\theta gF1$ defined by conditional expression (9) can be redefined as follows:

$$0.0272 < \Delta\theta gF1 < 0.2832 \tag{9a}$$

To obtain still further sufficient correction of chromatic aberration, the range of the anomalous partial dispersion value $\Delta\theta gF1$ defined by conditional expression (9a) can be redefined as follows:

$$0.0342 < \Delta\theta gF1 < 0.2832 \tag{9b}$$

To obtain further sufficient correction of chromatic aberration, the range of the anomalous partial dispersion value $\Delta\theta gF2$ defined by conditional expression (10) can be redefined as follows:

$$-0.4278 < \Delta\theta gF2 < -0.0528 \tag{10a}$$

To obtain still further sufficient correction of chromatic aberration, the range of the anomalous partial dispersion value $\Delta\theta gF2$ defined by conditional expression (10a) can be redefined as follows:

$$-0.4278 < \Delta\theta gF2 < -0.0778 \tag{10b}$$

To obtain further sufficient correction of chromatic aberration, the range of the anomalous partial dispersion value $\Delta\theta gd1$ defined by conditional expression (11) can be redefined as follows:

$$0.038 < \Delta\theta gd1 < 0.347 \tag{11a}$$

To obtain still further sufficient correction of chromatic aberration, the range of the anomalous partial dispersion value $\Delta\theta gd1$ defined by conditional expression (11a) can be redefined as follows:

$$0.051 < \Delta\theta gd1 < 0.347 \tag{11b}$$

To obtain further sufficient correction of chromatic aberration, the range of the anomalous partial dispersion value $\Delta\theta gd2$ defined by conditional expression (12) can be redefined as follows:

$$-0.5620 < \Delta\theta gd2 < -0.062 \tag{12a}$$

To obtain still further sufficient correction of chromatic aberration, the range of the anomalous partial dispersion value $\Delta\theta gd1$ defined by conditional expression (12a) can be redefined as follows:

$$-0.5620 < \Delta\theta gd2 < -0.112 \tag{12b}$$

To obtain further sufficient correction of chromatic aberration, the ranges of the Abbe numbers vd1 and vd2 defined by conditional expressions (13) and (14) can be redefined as follows:

$$vd1 < 50 \tag{13a}$$

$$vd2 < 50 \tag{14a}$$

To obtain still further sufficient correction of chromatic aberration, the ranges of the Abbe numbers vd1 and vd2 defined by conditional expressions (13a) and (14a) can be redefined as follows:

$$vd1 < 45 \tag{13b}$$

$$vd2 < 45 \tag{14b}$$

To obtain yet still further sufficient correction of chromatic aberration, the ranges of the Abbe numbers vd1 and vd2 defined by conditional expressions (13b) and (14b) can be redefined as follows:

$$vd1 < 40 \tag{13c}$$

$$vd2 < 40 \tag{14c}$$

In the exemplary embodiments, the optical elements GNL1 and GL1 made of optical materials that satisfy conditional expressions (9) and (10) are employed for a lens and a refractive layer provided on a lens of the optical system. In addition, if the refractive surface composed of such an optical material is aspherical, chromatic aberration flare, such as spherical aberration of a color, can be corrected. Furthermore, if an interface is formed between the optical element and air atmosphere or between the optical element and an optical material having a relatively low index of refraction, the chromatic aberration can be relatively significantly changed by slightly changing the radius of curvature of the interface.

Exemplary embodiments in which an optical element composed of the optical material that satisfies at least one of conditional expressions (9) to (16) is employed for an optical system that satisfies conditional expression (8) are described in detail next. In these exemplary embodiments, a UV-curable resin 1, N-polyvinyl carbazole, or a mixture of a UV-curable resin 2 and TiO$_2$ fine particles dispersed therein is used for an optical material that satisfies conditional expressions (9), (11), and (13). A mixture of the UV-curable resin 2 and ITO fine particles dispersed therein or a mixture of N-polyvinyl carbazole and ITO fine particles dispersed therein is used for an optical material that satisfies conditional expressions (10), (12), and (14).

An optical system for use in each of the exemplary embodiments is a telephoto lens system used in an image pickup apparatus, such as a video camera, a digital camera, or a silver-halide film camera. In the cross-sectional views of lenses, an object is located on the left side (the front side), and an image plane is located on the right side (the rear side).

In the case where the optical systems of the exemplary embodiments are used for projection lenses of, for example, projectors, a screen is located on the left side, and an image to be projected is located on the right side.

In the cross-sectional views of lenses, "i" represents the order of a lens group numbered from the object. "Li" represents an ith lens group.

In addition, "SP" represents an aperture stop. "IP" represents an image plane. When the optical system is used for a photo-taking lens of a video camera or a digital still camera, an imaging surface of a solid-state image pickup element (a photoelectric conversion element), such as a CCD sensor or a CMOS sensor, is disposed in the image plane IP. When the optical system is used for a photo-taking lens of a silver-halide film camera, a light-sensitive surface corresponding to the film surface is disposed in the image plane IP.

In aberration diagrams, "d" and "g" represent the d-line and g-line, respectively. "ΔM" and "ΔS" represent the meridional image plane and the sagittal image plane, respectively. The chromatic aberration of magnification is represented using the g-line. "ω" denotes the half angle of field. "Fno" denotes the F number.

Figure 15:
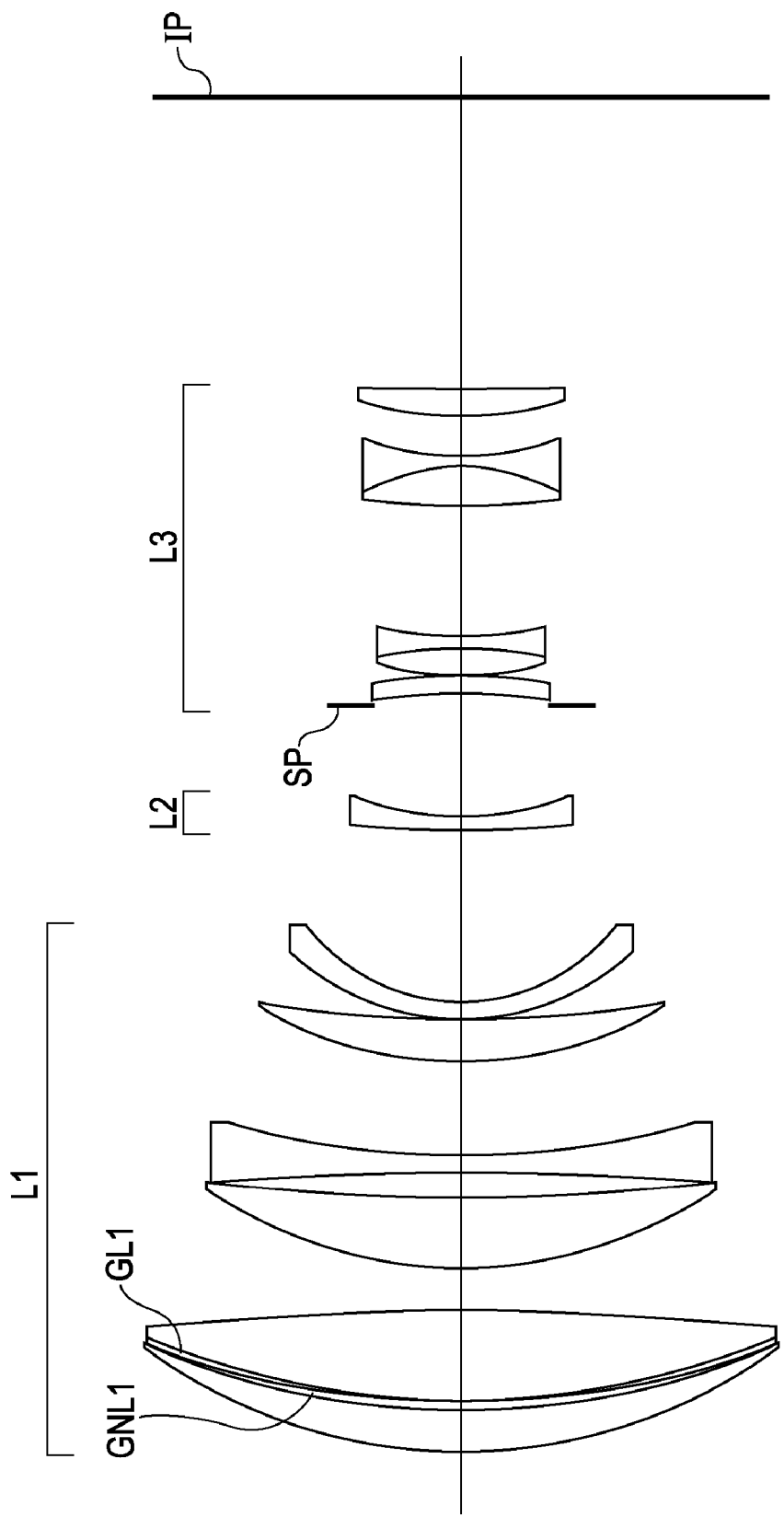
FIG. 15 is a cross-sectional view of an optical system according to an eighth numerical embodiment of the present invention.
Figure 16:
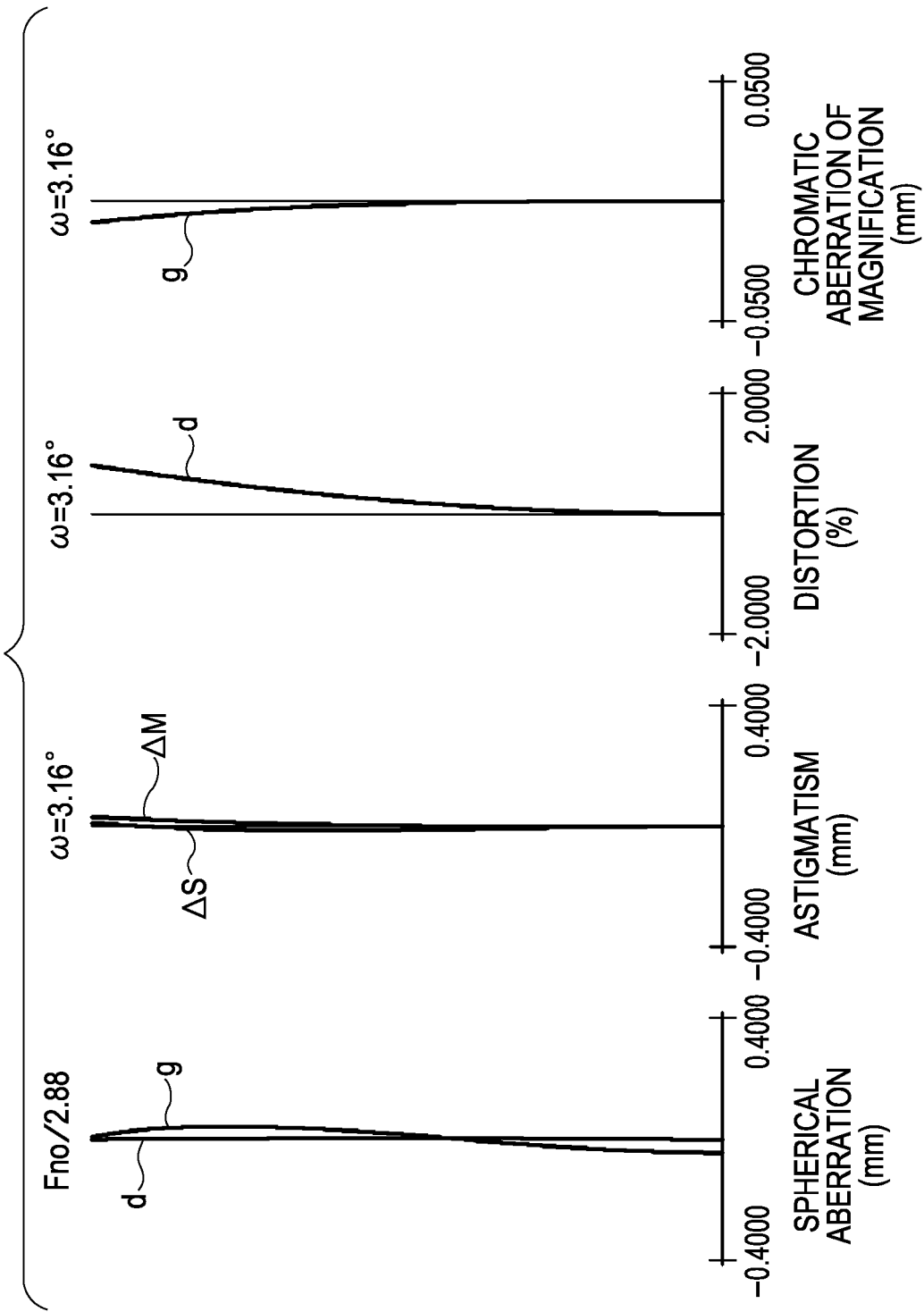
FIG. 16 is an aberration diagram according to the eighth numerical embodiment.

According to an eighth exemplary embodiment, as shown in FIG. 15, an optical system is a telephoto lens having a focal length of 400 mm. The optical system includes a first lens group L1 having a positive refractive power, a second lens group L2 having a negative refractive power, and a third lens group L3 having a positive refractive power. When focusing is carried out, the first lens group L1 is stationary, the second lens group L2 is moved along the light axis, and the third lens group L3 is stationary.

In this optical system, the first lens group L1 includes the first and second optical elements.

According to the present embodiment, the optical system includes a lens (a first optical element) GNL1 composed of the UV-curable resin 1 and a lens (a second optical element) GL1 composed of a mixture of the UV-curable resin 2 and 14.2% by volume ITO fine particles dispersed therein.

As shown in FIG. 15, the first optical element GNL1 is a lens (layer) composed of the UV-curable resin 1 and having a positive refractive power. The second optical element GL1 is a lens (layer) composed of a mixture including ITO fine particles and having a negative refractive power.

According to the eighth embodiment, the first lens group L1 includes the lens (layer) GNL1 and the lens (layer) GL1 on the object side where, when the paraxial marginal ray passes through the first lens group L1, the height of the paraxial marginal ray from the light axis is relatively large. In addition, the lens GNL1 and the lens GL1 are in tight contact with each other. The contact surface is aspherical. The lens GNL1 and the lens GL1 are cemented between the other lenses. In this way, axial chromatic aberration and chromatic aberration of magnification are sufficiently corrected. Thus, a compact telephoto lens having a telephoto ratio of 0.764 can be achieved.

Figure 17:
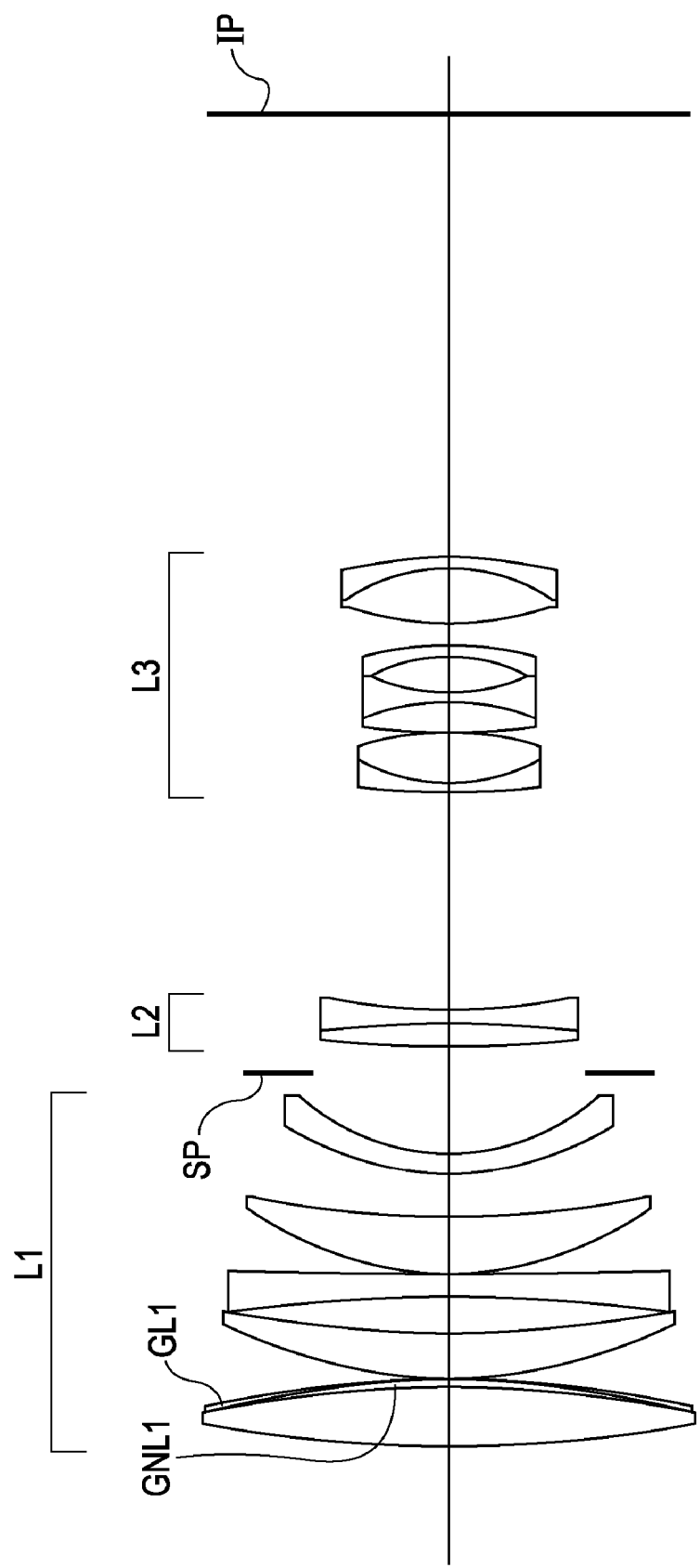
FIG. 17 is a cross-sectional view of an optical system according to a ninth numerical embodiment of the present invention.
Figure 18:
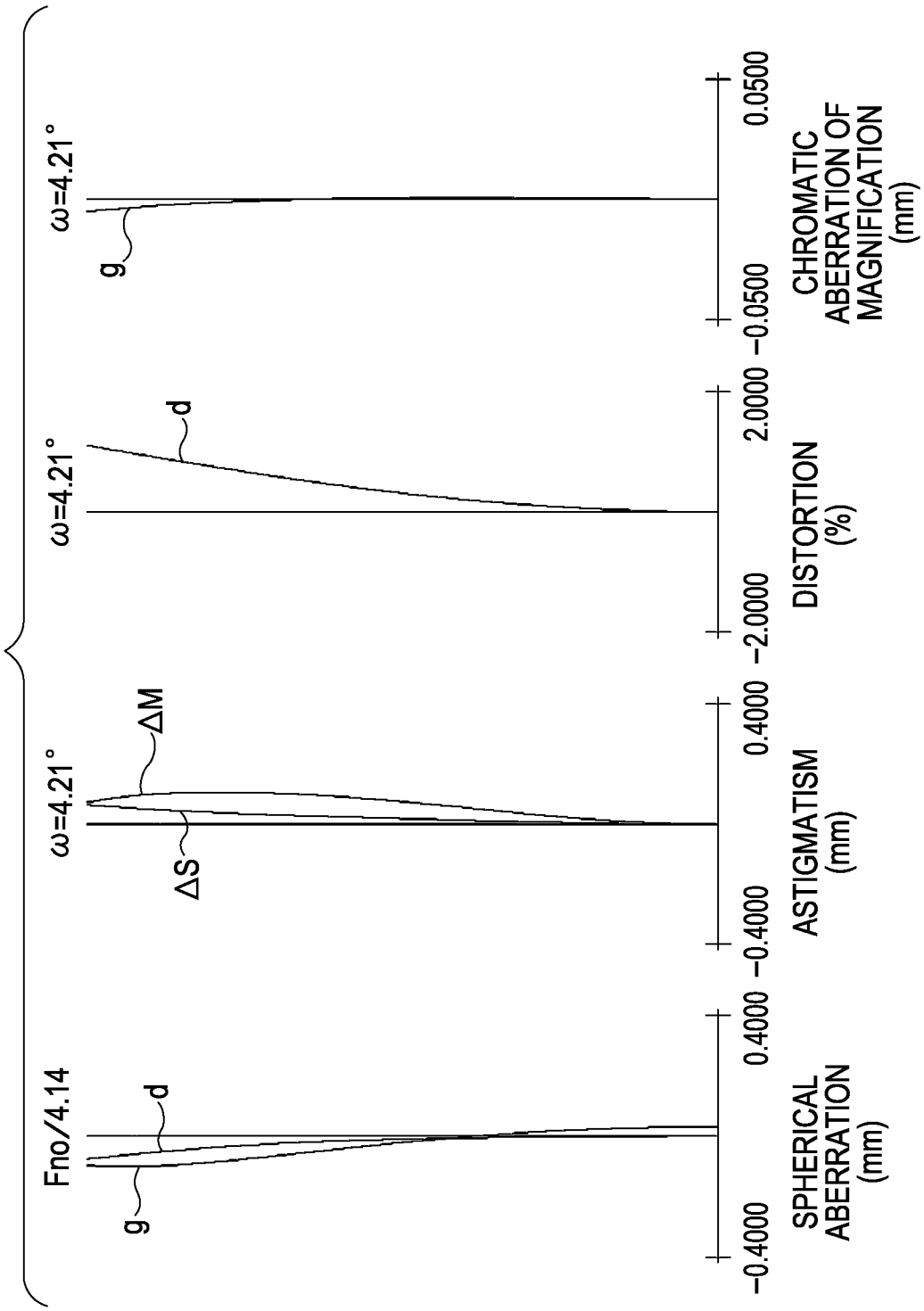
FIG. 18 is an aberration diagram according to the ninth numerical embodiment.

According to a ninth exemplary embodiment, as shown in FIG. 17, the optical system is a telephoto lens having a focal length of 300 mm. The optical system includes a first lens group L1 having a positive refractive power, a second lens group L2 having a negative refractive power, and a third lens group L3 having a positive refractive power. When focusing is carried out, the first lens group L1 is stationary, the second lens group L2 is moved along the light axis, and the third lens group L3 is stationary.

According to the present exemplary embodiment, the optical system includes a lens (a first optical element) GNL1 composed of the UV-curable resin 1 and a lens (a second optical element) GL1 composed of a mixture of the UV-curable resin 2 and 14.2% by volume ITO fine particles dispersed therein. The lens (layer) GNL1 composed of the UV-curable resin 1 is a lens (layer) having a positive refractive power. The lens (layer) GL1 composed of the mixture including ITO fine particles is a lens (layer) having a negative refractive power.

According to the ninth embodiment, the first lens group L1 includes the lens (layer) GNL1 and the lens (layer) GL1 on the object side where, when the paraxial marginal ray passes through the first lens group L1, the height of the paraxial marginal ray from the light axis is relatively large. In addition, the lens GNL1 is in tight contact with the lens GL1. The contact surface is aspherical. In this way, axial chromatic aberration and chromatic aberration of magnification are sufficiently corrected. Thus, a compact telephoto lens having a telephoto ratio of 0.669 can be achieved.

Figure 19:
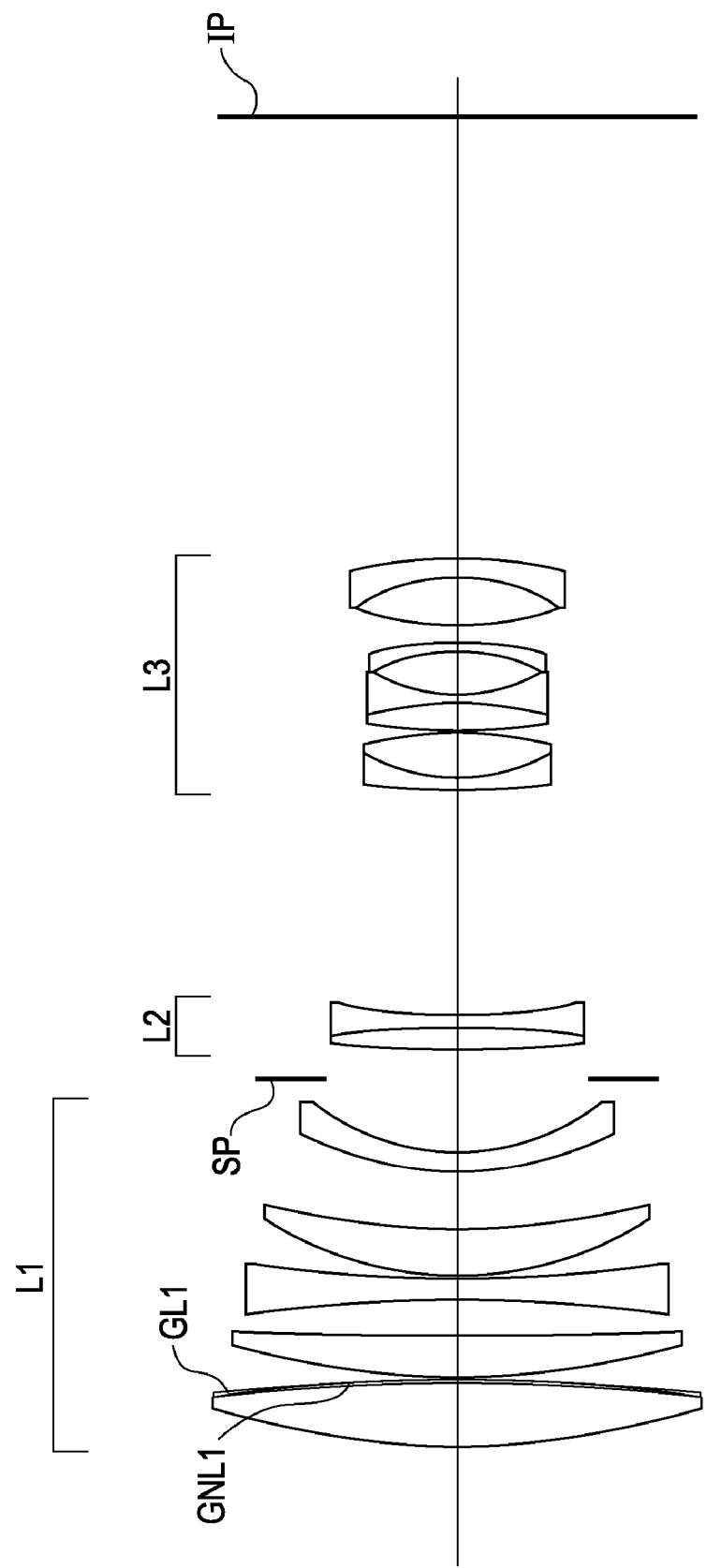
FIG. 19 is a cross-sectional view of an optical system according to a tenth numerical embodiment of the present invention.
Figure 20:
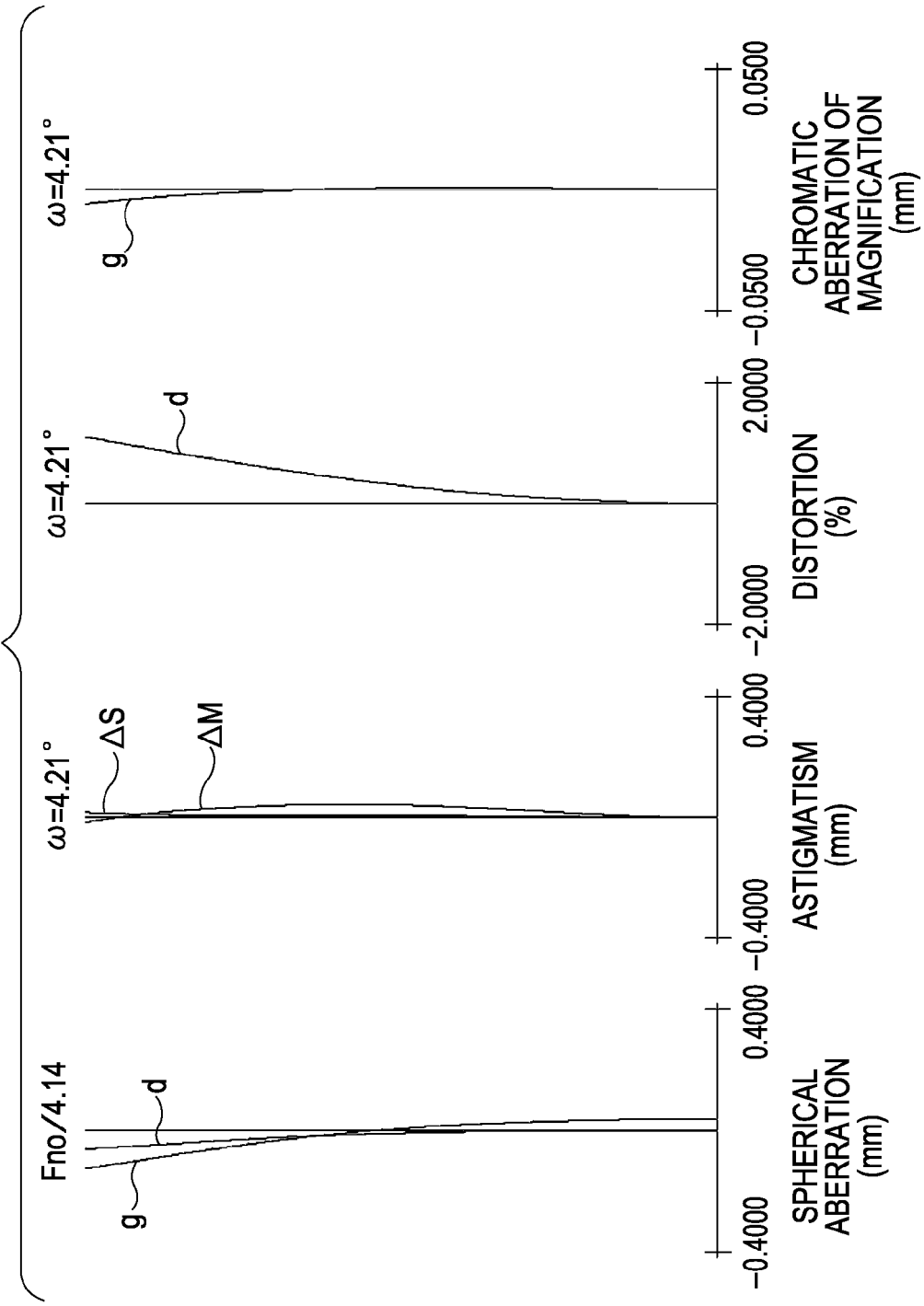
FIG. 20 is an aberration diagram according to the tenth numerical embodiment.

According to a tenth exemplary embodiment, as shown in FIG. 19, the optical system is a telephoto lens having a focal length of 300 mm. The optical system includes a first lens group L1 having a positive refractive power, a second lens group L2 having a negative refractive power, and a third lens group L3 having a positive refractive power. When focusing is carried out, the first lens group L1 is stationary, the second lens group L2 is moved along the light axis, and the third lens group L3 is stationary.

According to the present exemplary embodiment, the optical system includes a lens (a first optical element) GNL1 composed of a mixture of the UV-curable resin 2 and 20% by volume $TiO_2$ fine particles dispersed therein. The optical system further includes a lens (a second optical element) GL1 composed of a mixture of the UV-curable resin 2 and 20% by volume ITO fine particles dispersed therein. The lens (layer) GNL1 composed of the mixture including $TiO_2$ fine particles is a lens (layer) having a positive refractive power. The lens (layer) GL1 composed of the mixture including ITO fine particles is a lens (layer) having a negative refractive power.

According to the tenth embodiment, the first lens group L1 includes the lens (layer) GNL1 and the lens (layer) GL1 on the object side where, when the paraxial marginal ray passes through the first lens group L1, the height of the paraxial marginal ray from the light axis is relatively large. In this way, axial chromatic aberration and chromatic aberration of magnification are sufficiently corrected. Thus, a compact telephoto lens having a telephoto ratio of 0.669 can be achieved.

Figure 21:
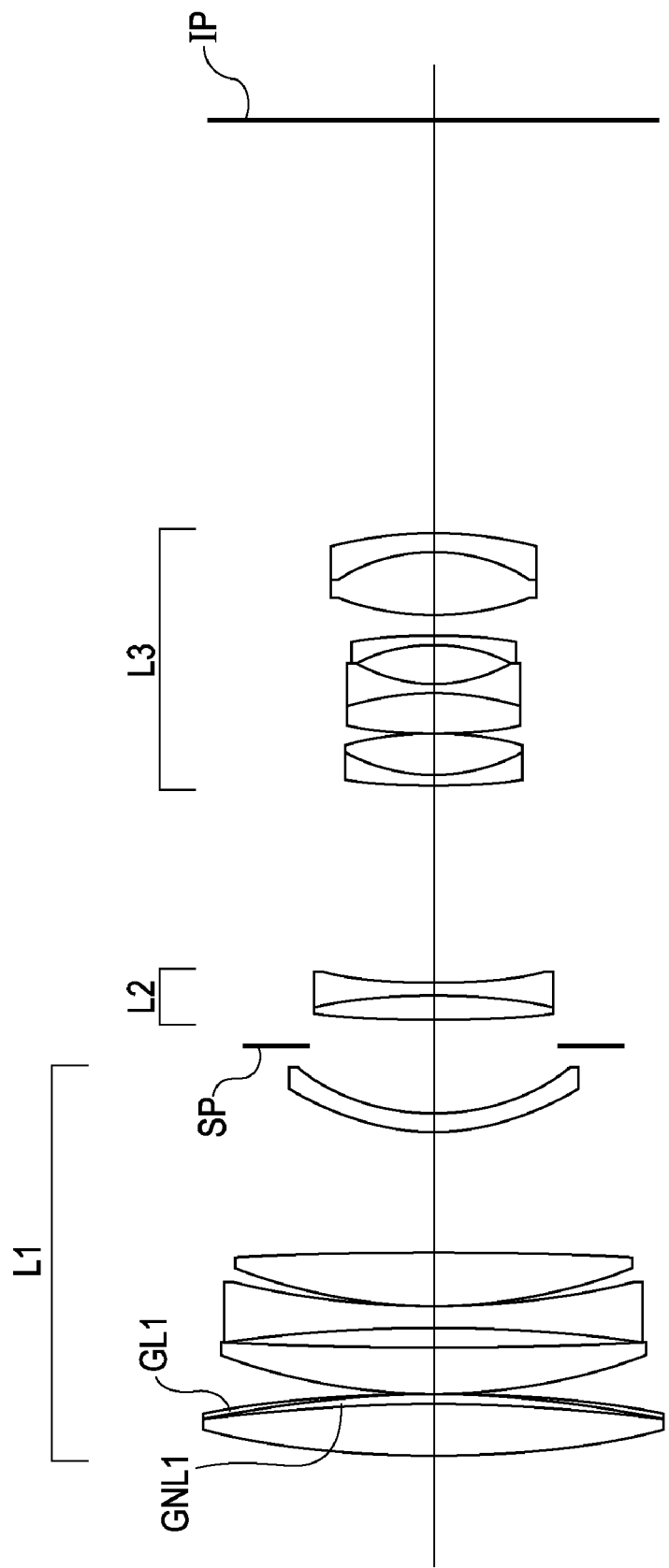
FIG. 21 is a cross-sectional view of an optical system according to an eleventh numerical embodiment of the present invention.
Figure 22:
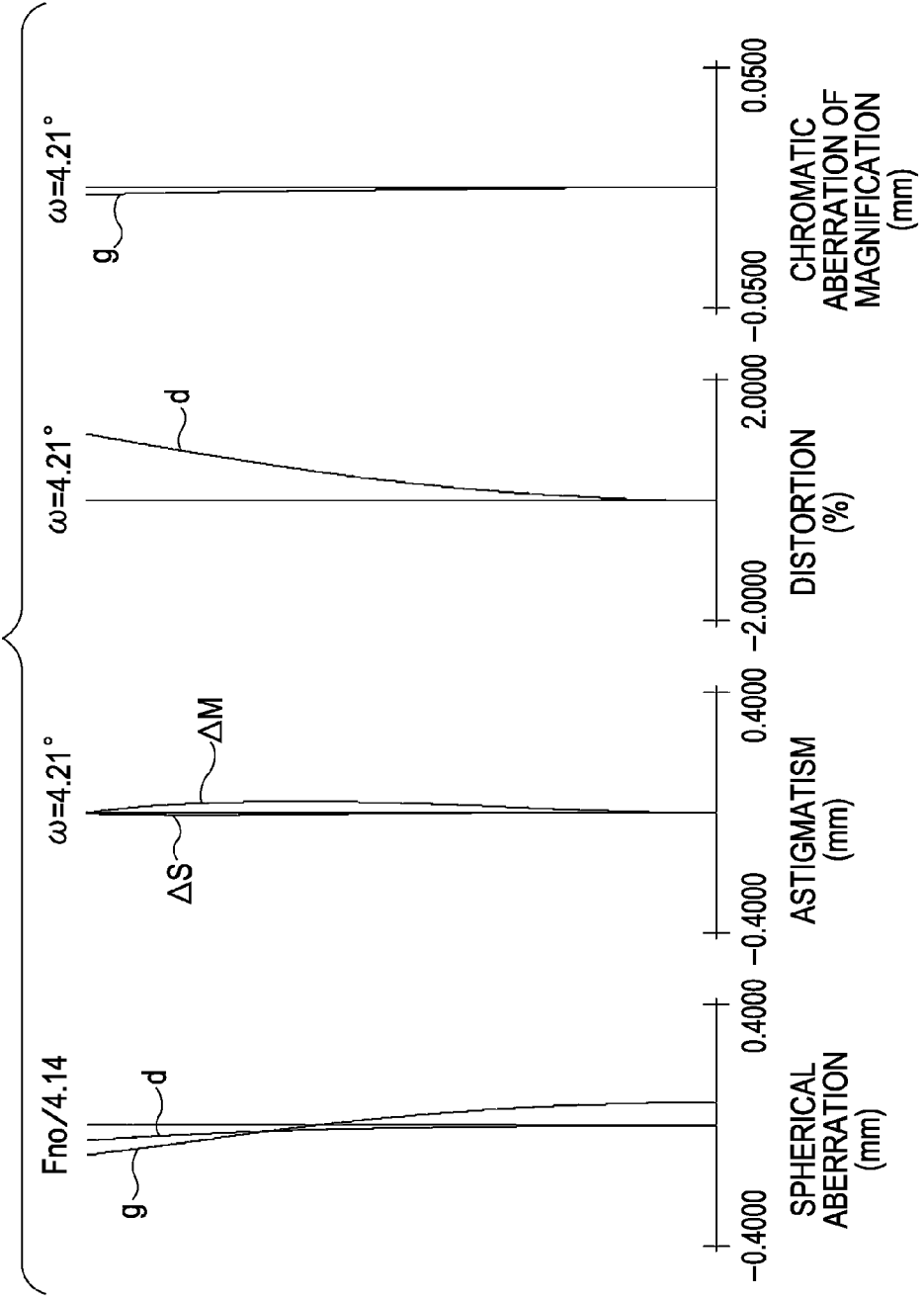
FIG. 22 is an aberration diagram according to the eleventh numerical embodiment.

According to an eleventh exemplary embodiment, as shown in FIG. 21, the optical system is a telephoto lens having a focal length of 300 mm. The optical system includes a first lens group L1 having a positive refractive power, a second lens group L2 having a negative refractive power, and a third lens group L3 having a positive refractive power. When focusing is carried out, the first lens group L1 is stationary, the second lens group L2 is moved along the light axis, and the third lens group L3 is stationary.

According to the present exemplary embodiment, the optical system includes a lens (a first optical element) GNL1 composed of N-polyvinyl carbazole and a lens (a second optical element) GL1 composed of a mixture of the UV-curable resin 2 and 5% by volume ITO fine particles dispersed therein. The lens (layer) GNL1 composed of N-polyvinyl carbazole is a lens (layer) having a positive refractive power. The lens (layer) GL1 composed of the mixture including ITO fine particles is a lens (layer) having a negative refractive power.

According to the eleventh embodiment, the first lens group L1 includes the lens (layer) GNL1 and the lens (layer) GL1 on the object side where, when the paraxial marginal ray passes through the first lens group L1, the height of the paraxial marginal ray from the light axis is relatively large. In this way, axial chromatic aberration and chromatic aberration of magnification are sufficiently corrected. Thus, a compact telephoto lens having a telephoto ratio of 0.720 can be achieved.

Figure 23:
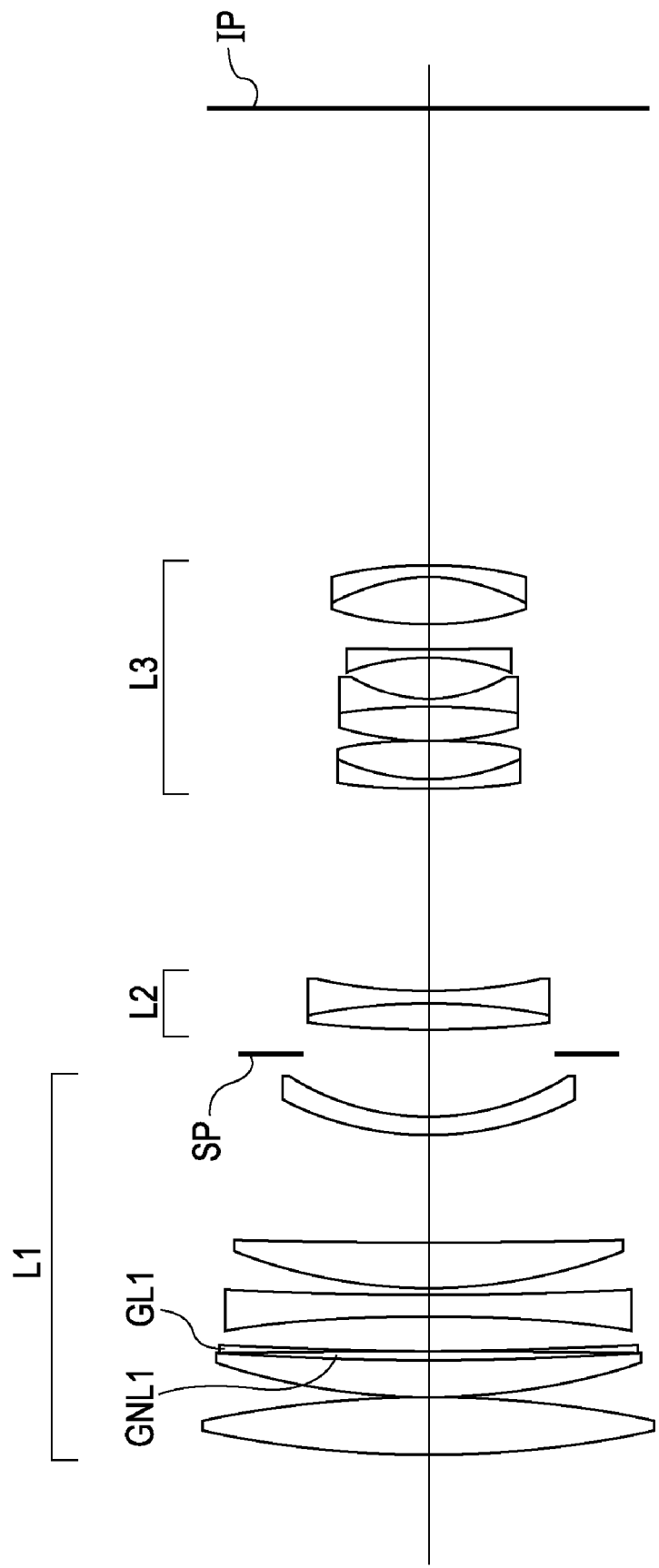
FIG. 23 is a cross-sectional view of an optical system according to a twelfth numerical embodiment of the present invention.
Figure 24:
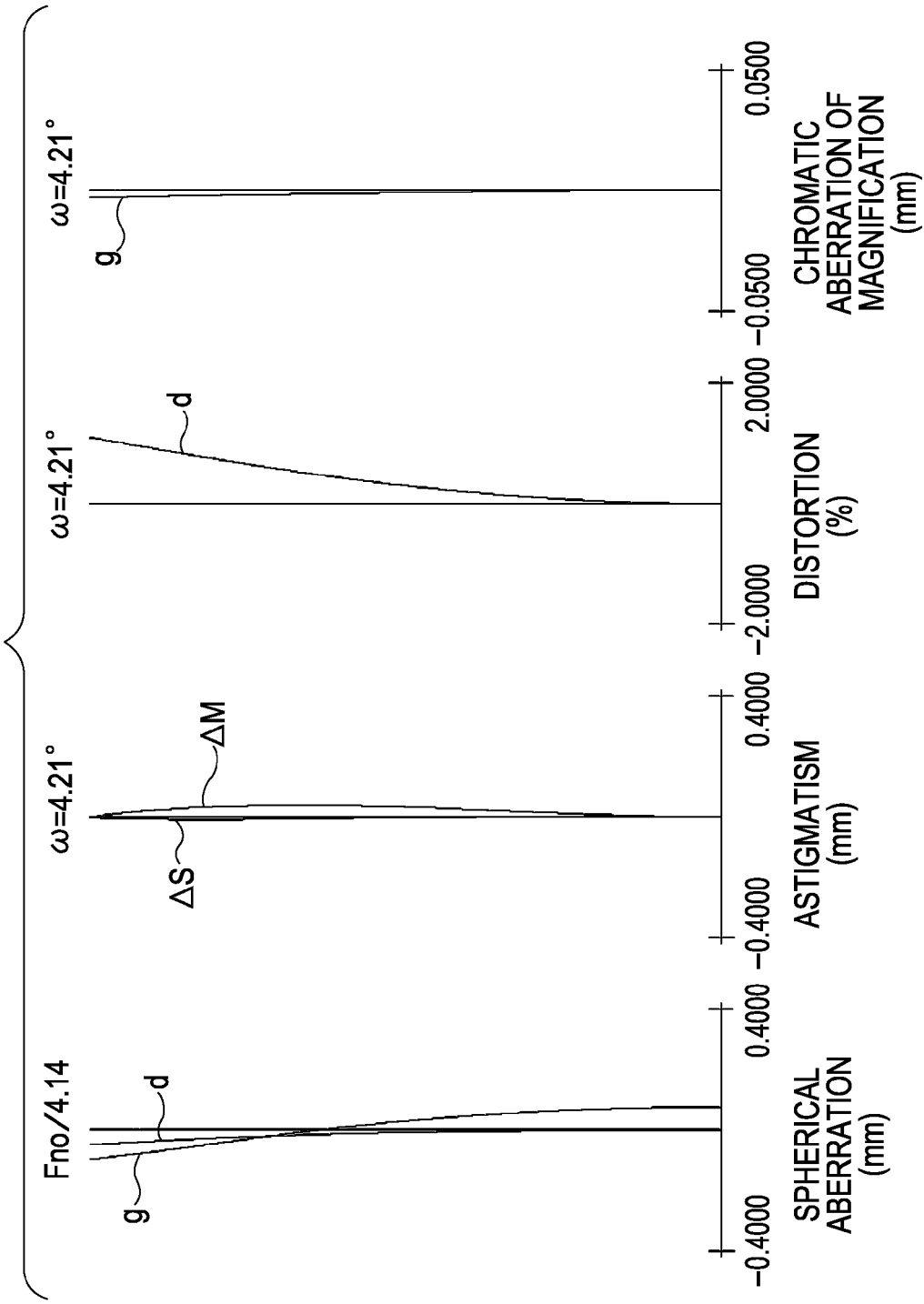
FIG. 24 is an aberration diagram according to the twelfth numerical embodiment.

According to a twelfth exemplary embodiment, as shown in FIG. 23, the optical system is a telephoto lens having a focal length of 300 mm. The optical system includes a first lens group L1 having a positive refractive power, a second lens group L2 having a negative refractive power, and a third lens group L3 having a positive refractive power. When focusing is carried out, the first lens group L1 is stationary, the second lens group L2 is moved along the light axis, and the third lens group L3 is stationary.

According to the present exemplary embodiment, the optical system includes a lens (a first optical element) GNL1 composed of a mixture of the UV-curable resin 2 and 3% by volume $TiO_2$ fine particles dispersed therein. The optical system further includes a lens (a second optical element) GL1 composed of a mixture of N-polyvinyl carbazole and 10% by volume ITO fine particles dispersed therein. The lens (layer) GNL1 composed of the mixture including $TiO_2$ fine particles is a lens (layer) having a positive refractive power. The lens (layer) GL1 composed of the mixture including ITO fine particles is a lens (layer) having a negative refractive power.

According to the twelfth embodiment, the first lens group L1 includes the lens (layer) GNL1 and the lens (layer) GL1 on the object side where, when the paraxial marginal ray passes through the first lens group L1, the height of the paraxial marginal ray from the light axis is relatively large. In this way, axial chromatic aberration and chromatic aberration of magnification are sufficiently corrected. Thus, a compact telephoto lens having a telephoto ratio of 0.748 can be achieved.

Figure 25:
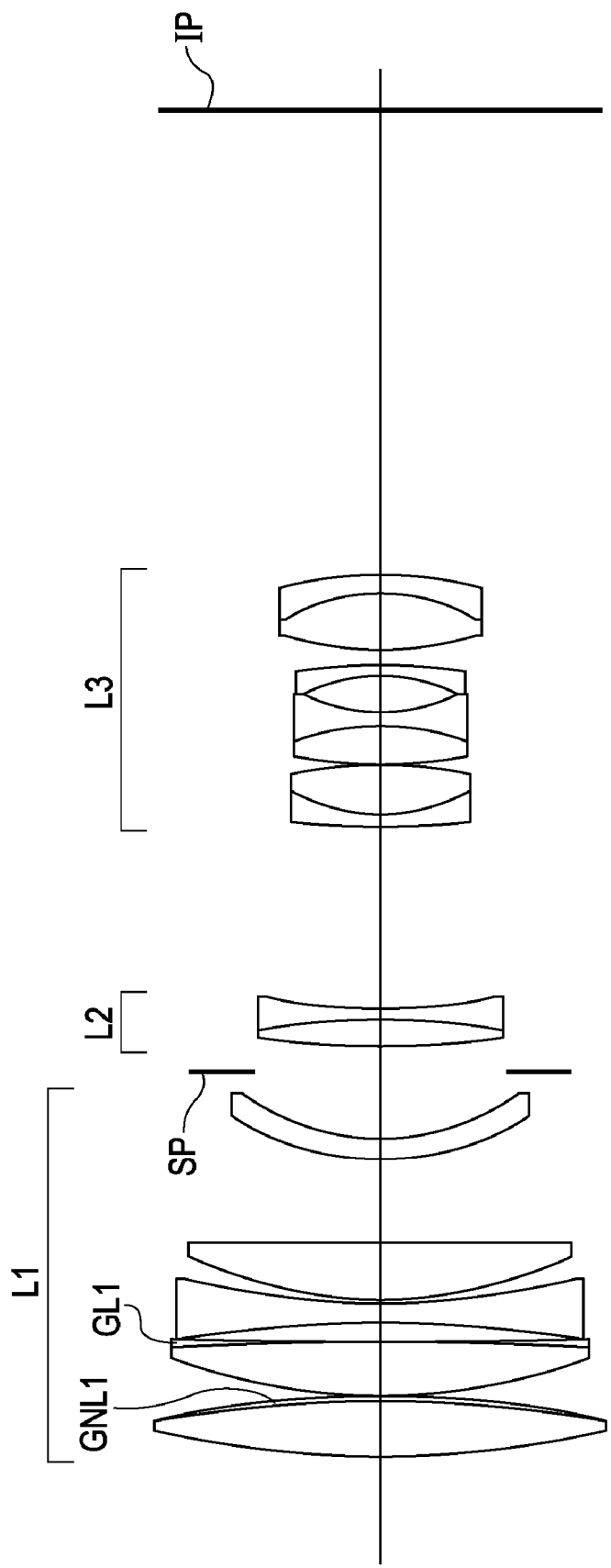
FIG. 25 is a cross-sectional view of an optical system according to a thirteenth numerical embodiment of the present invention.
Figure 26:
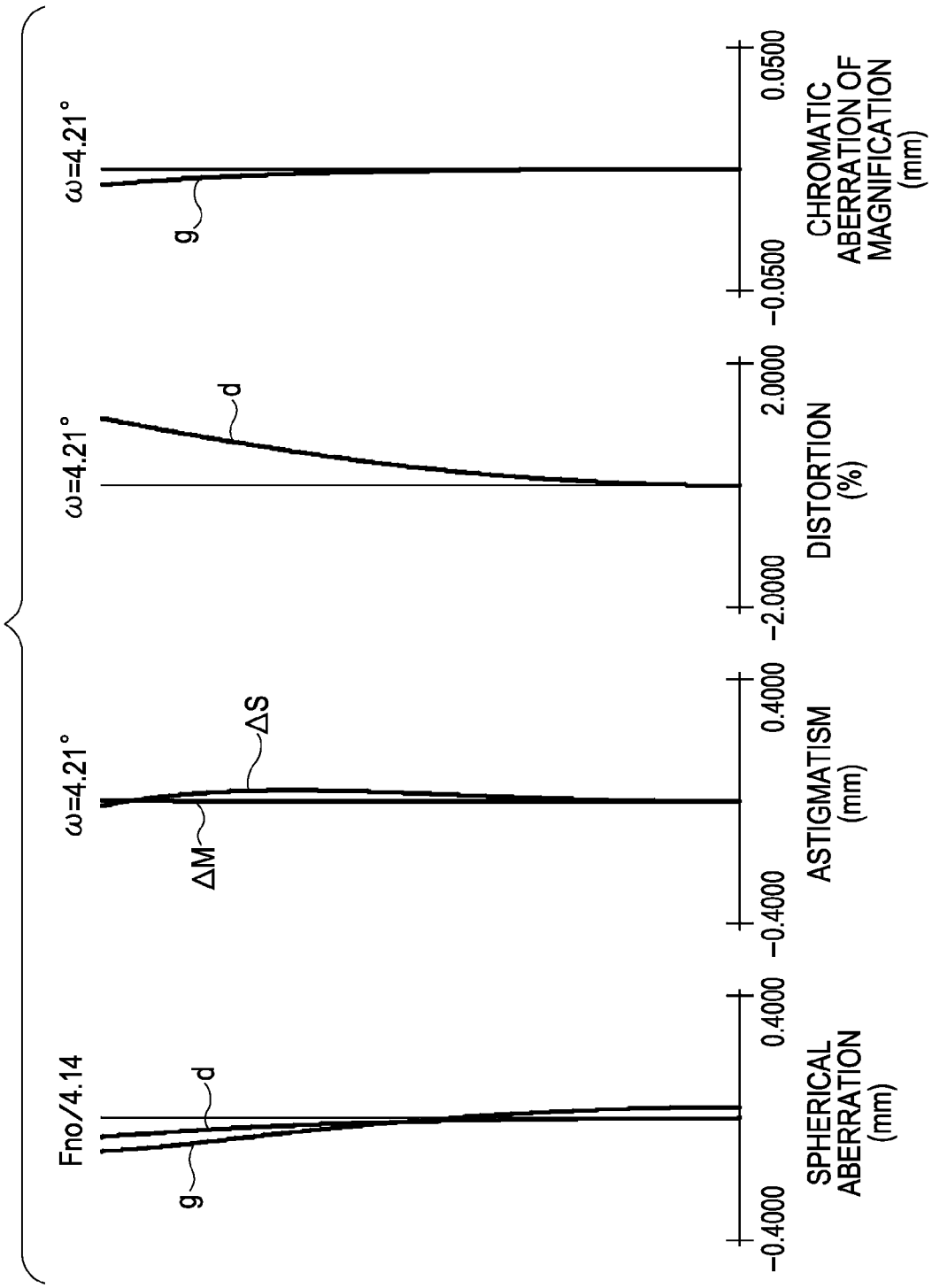
FIG. 26 is an aberration diagram according to the thirteenth numerical embodiment.

According to a thirteenth exemplary embodiment, as shown in FIG. 25, the optical system is a telephoto lens having a focal length of 300 mm. The optical system includes a first lens group L1 having a positive refractive power, a second lens group L2 having a negative refractive power, and a third lens group L3 having a positive refractive power. When focusing is carried out, the first lens group L1 is stationary, the second lens group L2 is moved along the light axis, and the third lens group L3 is stationary.

According to the present exemplary embodiment, the optical system includes a lens (a first optical element) GNL1 composed of the UV-curable resin 1 and a lens (a second optical element) GL1 composed of a mixture of the UV-curable resin 2 and 5% by volume ITO fine particles dispersed therein. The lens (layer) GNL1 composed of the UV-curable resin 1 is a lens (layer) having a positive refractive power. The lens (layer) GL1 composed of the mixture including ITO fine particles is a lens (layer) having a negative refractive power.

According to the thirteenth embodiment, the first lens group L1 includes the lens (layer) GNL1 and the lens (layer) GL1 on the object side where, when the paraxial marginal ray passes through the first lens group L1, the height of the paraxial marginal ray from the light axis is relatively large. In this way, axial chromatic aberration and chromatic aberration of magnification are sufficiently corrected. Thus, a compact telephoto lens having a telephoto ratio of 0.737 can be achieved.

Particular values used in eighth to thirteenth numerical embodiments, which correspond to the eighth to thirteenth exemplary embodiments, are described below. In the following numerical embodiments, i denotes the order of a surface numbered from the object. Ri denotes the radius of curvature of the ith optical surface, and Di denotes a distance between the ith surface and the (i+1)th surface along the light axis. Ni and vi denote the index of refraction and the Abbe number of a material of the ith optical element (excluding a lens (layer) composed of a resin, a material including $TiO_2$ fine particles dispersed therein, or a material including ITO fine particles dispersed therein) for the d-line, respectively. NGNLj and vGNLj denote the index of refraction and the Abbe number of a material of a lens GNLj composed of a resin, a material including $TiO_2$ fine particles dispersed therein, or a material including ITO fine particles dispersed therein for the d-line, respectively. Here, j=1, 2, . . . "f" denotes the focal length of an optical system. "Fno" denotes the F number. "ω" denotes the half angle of field.

The shape of an aspherical surface is expressed by the following equation:

$$x(h) = \frac{(1/r)h^2}{1 + \sqrt{\{1 - (1+k)(h/r^2)\}}} + Bh^4 + Ch^6 + Dh^8 + Eh^{10} + \dots$$

where
- X is an amount of displacement from the surface vertex in the light axis direction,
- h is a height from the light axis in a direction perpendicular to the light axis,
- r is the paraxial radius of curvature,
- k is the conic constant, and
- B, C, D, E, . . . are aspherical coefficients at respective orders.

In Table 6 and in each aspherical coefficient, "E±XX" means "$\times 10^{\pm XX}$".

Table 4 shows the indices of refraction, the Abbe numbers, the relative partial dispersions, and the refractive powers of the refractive optical system portions GNL1 and GL1 for the d-line, g-line, C-line, and F-line, and values for conditional expression (8) in each numerical embodiment. Table 5 shows the indices of refraction, the Abbe numbers, and the relative partial dispersions of the UV-curable resin 2, ITO, and $TiO_2$ for the d-line, g-line, C-line, and F-line. Table 6 shows the values of the refractive optical elements GNLj and GLj for conditional expression (16) in each numerical embodiment.

| (Eighth Numerical Embodiment) f = 392.36 Fno = 2.88 2ω = 6.31° | | | | |
|---|---|---|---|---|
| R1 = 117.835 | | D1 = 9.16 | N1 = 1.4875 | v1 = 70.2 |
| R2 = 171.288 | | D2 = 2.00 | NGNL1 = 1.6356 | vGNL1 = 22.7 |
| R3 = 198.370 | (Aspherical | D3 = 0.05 | NGL1 = 1.5648 | vGL1 = 20.0 |
| R4 = 174.689 | Surface) | D4 = 0.00 | | |
| R5 = 174.689 | | D5 = 20.00 | N2 = 1.4875 | v2 = 70.2 |
| R6 = −629.325 | | D6 = 9.39 | | |
| R7 = 99.381 | | D7 = 15.59 | N3 = 1.4875 | v3 = 70.2 |
| R8 = 441.881 | | D8 = 5.48 | | |
| R9 = −727.900 | | D9 = 4.00 | N4 = 1.8340 | v4 = 37.2 |
| R10 = 184.723 | | D10 = 20.80 | | |
| R11 = 87.849 | | D11 = 9.00 | N5 = 1.4875 | v5 = 70.2 |
| R12 = 251.334 | | D12 = 0.15 | | |
| R13 = 54.908 | | D13 = 4.00 | N6 = 1.8052 | v6 = 25.4 |
| R14 = 43.350 | | D14 = 37.71 | | |

-continued (Eighth Numerical Embodiment)
f = 392.36 Fno = 2.88 2ω = 6.31°

| | | | | |
|---|---|---|---|---|
| R15 = 244.772 | | D15 = 2.80 | N7 = 1.6583 | ν7 = 57.3 |
| R16 = 63.310 | | D16 = 25.00 | | |
| R17 = ∞ | (Aperture Stop) | D17 = 2.27 | | |
| R18 = −141.572 | | D18 = 4.00 | N8 = 1.8467 | ν8 = 23.8 |
| R19 = −117.763 | | D19 = 0.15 | | |
| R20 = 65.966 | | D20 = 5.52 | N9 = 1.5400 | ν9 = 59.5 |
| R21 = −105.637 | | D21 = 3.00 | N10 = 1.8340 | ν10 = 37.2 |
| R22 = 76.891 | | D22 = 28.89 | | |
| R23 = 183.461 | | D23 = 8.46 | N11 = 1.6700 | ν11 = 39.3 |
| R24 = −44.576 | | D24 = 2.50 | N12 = 1.5400 | ν12 = 59.5 |
| R25 = 62.415 | | D25 = 8.57 | | |
| R26 = 71.860 | | D26 = 6.00 | N13 = 1.5927 | ν13 = 35.3 |
| R27 = 710.477 | | | | |

Aspherical Coefficient

| | k | B | C | D | E |
|---|---|---|---|---|---|
| 3rd Surface | 1.8877E−01 | 6.4274E−09 | −1.1579E−12 | 4.9144E−17 | 1.1708E−20 |

(Ninth Numerical Embodiment)
f = 294.0 Fno = 4.14 2ω = 8.42°

| | | | | |
|---|---|---|---|---|
| R1 = 193.388 | | D1 = 8.76 | N1 = 1.5212 | ν1 = 67.0 |
| R2 = −173.765 | | D2 = 1.20 | NGNL1 = 1.6356 | νGNL1 = 22.7 |
| R3 = −131.984 | (Aspherical | D3 = 0.05 | NGL1 = 1.5648 | νGL1 = 20.0 |
| R4 = −161.149 | Surface) | D4 = 0.15 | | |
| R5 = 74.247 | | D5 = 6.64 | N2 = 1.4870 | ν2 = 70.4 |
| R6 = 176.418 | | D6 = 5.16 | | |
| R7 = −257.193 | | D7 = 3.40 | N3 = 1.7641 | ν3 = 27.9 |
| R8 = 845.002 | | D8 = 0.15 | | |
| R9 = 50.201 | | D9 = 8.33 | N4 = 1.4870 | ν4 = 40.4 |
| R10 = 138.171 | | D10 = 6.50 | | |
| R11 = 45.368 | | D11 = 3.00 | N5 = 1.8490 | ν5 = 26.7 |
| R12 = 33.543 | | D12 = 11.75 | | |
| R13 = ∞ | (Aperture Stop) | D13 = 0.00 | | |
| R14 = ∞ | | D14 = 4.00 | | |
| R15 = 159.894 | | D15 = 3.17 | N6 = 1.7294 | ν6 = 27.0 |
| R16 = −216.482 | | D16 = 2.00 | N7 = 1.8850 | ν7 = 41.0 |
| R17 = 81.708 | | D17 = 32.13 | | |
| R18 = 99.214 | | D18 = 1.60 | N8 = 1.8500 | ν8 = 23.0 |
| R19 = 26.424 | | D19 = 7.15 | N9 = 1.5812 | ν9 = 39.5 |
| R20 = −50.918 | | D20 = 0.16 | | |
| R21 = 95.554 | | D22 = 4.32 | N10 = 1.8600 | ν10 = 26.4 |
| R22 = −37.008 | | D23 = 1.50 | N11 = 1.7800 | ν11 = 50.0 |
| R23 = 26.014 | | D24 = 5.75 | | |
| R24 = −24.230 | | D25 = 1.50 | N12 = 1.6200 | ν12 = 60.3 |
| R25 = −56.688 | | D26 = 2.93 | | |
| R26 = 47.995 | | D27 = 7.97 | N13 = 1.5450 | ν13 = 46.5 |
| R27 = −28.966 | | D28 = 1.80 | N14 = 1.8850 | ν14 = 41.0 |
| R28 = −63.496 | | | | |

Aspherical Coefficient

| | k | B | C | D | E |
|---|---|---|---|---|---|
| 5th Surface | −4.36842E−01 | 2.38651E−08 | 3.19153E−13 | 5.47944E−15 | 4.24280E−19 |

(Tenth Numerical Embodiment)
f = 294.0 Fno = 4.14 2ω = 8.42°

| | | | |
|---|---|---|---|
| R1 = 117.454 | D1 = 9.46 | N1 = 1.7576 | ν1 = 51.0 |
| R2 = −286.088 | D2 = 0.39 | NGNL1 = 1.7088 | νGNL1 = 21.6 |
| R3 = −247.645 | D3 = 0.05 | NGL1 = 1.5963 | νGL1 = 13.9 |
| R4 = −308.068 | D4 = 0.15 | | |
| R5 = 112.842 | D5 = 6.22 | N2 = 1.4870 | ν2 = 70.4 |
| R6 = 834.964 | D6 = 5.13 | | |

-continued

(Tenth Numerical Embodiment)
f = 294.0 Fno = 4.14 2ω = 8.42°

| | | | |
|---|---|---|---|
| R7 = −256.907 | D7 = 3.40 | N3 = 1.8564 | ν3 = 25.1 |
| R8 = 203.308 | D8 = 0.15 | | |
| R9 = 50.401 | D9 = 7.14 | N4 = 1.4870 | ν4 = 70.4 |
| R10 = 114.624 | D10 = 8.24 | | |
| R11 = 48.365 | D11 = 3.00 | N5 = 1.6192 | ν5 = 60.3 |
| R12 = 33.797 | D12 = 11.11 | | |
| R13 = ∞ (Aperture Stop) | D13 = 0.00 | | |
| R14 = ∞ | D14 = 4.00 | | |
| R15 = 165.324 | D15 = 3.20 | N6 = 1.7329 | ν6 = 26.9 |
| R16 = −177.058 | D16 = 2.00 | N7 = 1.8850 | ν7 = 41.0 |
| R17 = 81.708 | D17 = 33.37 | | |
| R18 = 101.698 | D18 = 1.60 | N8 = 1.8500 | ν8 = 23.0 |
| R19 = 27.778 | D19 = 6.64 | N9 = 1.6195 | ν9 = 36.2 |
| R20 = −55.388 | D20 = 0.40 | | |
| R21 = 74.332 | D22 = 4.06 | N10 = 1.8615 | ν10 = 27.0 |
| R22 = −51.973 | D23 = 1.50 | N11 = 1.7800 | ν11 = 50.0 |
| R23 = 25.549 | D24 = 5.92 | | |
| R24 = −27.265 | D25 = 1.50 | N12 = 1.7800 | ν12 = 50.0 |
| R25 = −57.332 | D26 = 2.68 | | |
| R26 = 46.891 | D27 = 7.00 | N13 = 1.5388 | ν13 = 48.1 |
| R27 = −30.034 | D28 = 2.73 | N14 = 1.8850 | ν14 = 41.0 |
| R28 = −70.163 | | | |

(Eleventh Numerical Embodiment)
f = 294.0 Fno = 4.14 2ω = 8.42°

| | | | |
|---|---|---|---|
| R1 = 155.141 | D1 = 8.31 | N1 = 1.5797 | ν1 = 62.6 |
| R2 = −266.200 | D2 = 1.50 | NGNL1 = 1.6959 | νGNL1 = 17.7 |
| R3 = −167.163 | D3 = 0.05 | NGL1 = 1.5425 | νGL1 = 29.0 |
| R4 = −220.744 | D4 = 0.15 | | |
| R5 = 92.229 | D5 = 7.11 | N2 = 1.5387 | ν2 = 65.5 |
| R6 = 532.897 | D6 = 3.14 | | |
| R7 = −269.965 | D7 = 3.40 | N3 = 1.8654 | ν3 = 28.7 |
| R8 = 130.581 | D8 = 0.15 | | |
| R9 = 84.739 | D9 = 8.54 | N4 = 1.4873 | ν4 = 70.4 |
| R10 = −562.348 | D10 = 19.08 | | |
| R11 = 41.082 | D11 = 3.00 | N5 = 1.4870 | ν5 = 70.4 |
| R12 = 36.019 | D12 = 10.63 | | |
| R13 = ∞ (Aperture Stop) | D13 = 0.00 | | |
| R14 = ∞ | D14 = 4.00 | | |
| R15 = 169.956 | D15 = 3.76 | N6 = 1.7498 | ν6 = 26.2 |
| R16 = −111.526 | D16 = 2.00 | N7 = 1.8819 | ν7 = 38.5 |
| R17 = 81.708 | D17 = 31.37 | | |
| R18 = 93.664 | D18 = 1.60 | N8 = 1.8500 | ν8 = 23.0 |
| R19 = 28.356 | D19 = 6.58 | N9 = 1.6279 | ν9 = 42.0 |
| R20 = −61.505 | D20 = 0.15 | | |
| R21 = 78.718 | D22 = 6.43 | N10 = 1.8610 | ν10 = 26.8 |
| R22 = −42.700 | D23 = 1.50 | N11 = 1.7568 | ν11 = 51.0 |
| R23 = 24.842 | D24 = 5.87 | | |
| R24 = −27.135 | D25 = 1.50 | N12 = 1.5906 | ν12 = 61.9 |
| R25 = −86.343 | D26 = 3.52 | | |
| R26 = 45.811 | D27 = 9.72 | N13 = 1.5202 | ν13 = 53.8 |
| R27 = −29.816 | D28 = 3.00 | N14 = 1.8850 | ν14 = 41.0 |
| R28 = −67.113 | | | |

(Twelfth Numerical Embodiment)
f = 294.0 Fno = 4.14 2ω = 8.42°

| | | | |
|---|---|---|---|
| R1 = 165.948 | D1 = 9.02 | N1 = 1.4870 | ν1 = 70.4 |
| R2 = −189.026 | D2 = 0.15 | | |
| R3 = 107.153 | D3 = 6.00 | N2 = 1.4870 | ν2 = 70.4 |
| R4 = 379.005 | D4 = 1.50 | NGNL1 = 1.5532 | νGNL1 = 39.8 |
| R5 = 27779.873 (Aspherical Surface) | D5 = 0.05 | NGL1 = 1.7127 | νGL1 = 13.8 |
| R6 = 556.147 | D6 = 5.47 | | |
| R7 = −242.960 | D7 = 3.40 | N3 = 1.8838 | ν3 = 39.94 |
| R8 = 503.260 | D8 = 1.11 | | |
| R9 = 83.132 | D9 = 7.39 | N4 = 1.4870 | ν4 = 70.4 |

-continued (Twelfth Numerical Embodiment)
f = 294.0 Fno = 4.14 2ω = 8.42°

| | | | |
|---|---|---|---|
| R10 = 1008.384 | D10 = 17.33 | | |
| R11 = 51.173 | D11 = 3.00 | N5 = 1.5115 | ν5 = 64.0 |
| R12 = 40.513 | D12 = 10.12 | | |
| R13 = ∞ (Aperture Stop) | D13 = 0.00 | | |
| R14 = ∞ | D14 = 4.00 | | |
| R15 = 177.678 | D15 = 4.00 | N6 = 1.7652 | ν6 = 25.6 |
| R16 = −105.297 | D16 = 2.00 | N7 = 1.8823 | ν7 = 38.8 |
| R17 = 81.708 | D17 = 32.54 | | |
| R18 = 103.789 | D18 = 1.60 | N8 = 1.8564 | ν8 = 25.1 |
| R19 = 34.769 | D19 = 6.04 | N9 = 1.6702 | ν9 = 53.7 |
| R20 = −79.264 | D20 = 0.15 | | |
| R21 = 49.645 | D21 = 5.28 | N10 = 1.8585 | ν10 = 26.3 |
| R22 = −132.812 | D22 = 1.50 | N11 = 1.7276 | ν11 = 52.5 |
| R23 = 23.745 | D23 = 6.39 | | |
| R24 = −41.576 | D24 = 1.50 | N12 = 1.6958 | ν12 = 54.4 |
| R25 = 342.785 | D25 = 4.04 | | |
| R26 = 47.170 | D26 = 7.53 | N13 = 1.5269 | ν13 = 51.6 |
| R27 = −30.301 | D27 = 1.80 | N14 = 1.8850 | ν14 = 41.0 |
| R28 = −67.490 | | | |

Aspherical Coefficient

| | k | B | C | D | E |
|---|---|---|---|---|---|
| 7th Surface | 1.46158E+05 | 1.69205E−09 | −3.32770E−12 | 1.16835E−15 | −5.92857E−19 |

(Thirteenth Numerical Embodiment)
f = 294.0 Fno = 4.14 2ω = 8.42°

| | | | |
|---|---|---|---|
| R1 = 157.370 | D1 = 8.97 | N1 = 1.5163 | ν1 = 64.1 |
| R2 = −204.567 | D2 = 0.76 | NGNL1 = 1.6356 | νGNL1 = 22.7 |
| R3 = −168.921 | D3 = 0.15 | | |
| R4 = 96.414 | D4 = 8.62 | N2 = 1.5638 | ν2 = 60.7 |
| R5 = −643.669 | D5 = 0.05 | NGL1 = 1.5425 | νGL1 = 29.1 |
| R6 = 1526.834 | D6 = 2.80 | | |
| R7 = −228.046 | D7 = 3.40 | N3 = 1.8340 | ν3 = 37.2 |
| R8 = 129.968 | D8 = 0.73 | | |
| R9 = 72.569 | D9 = 8.93 | N4 = 1.4875 | ν4 = 70.2 |
| R10 = 5162.619 | D10 = 13.48 | | |
| R11 = 43.936 | D11 = 3.50 | N5 = 1.8052 | ν5 = 25.4 |
| R12 = 37.942 | D12 = 10.71 | | |
| R13 = ∞ (Aperture Stop) | D13 = 4.00 | | |
| R14 = 139.290 | D14 = 4.00 | N6 = 1.7215 | ν6 = 29.2 |
| R15 = −133.808 | D15 = 2.00 | N7 = 1.8830 | ν7 = 40.8 |
| R16 = 81.708 | D16 = 29.31 | | |
| R17 = 133.715 | D17 = 1.80 | N8 = 1.8467 | ν8 = 23.8 |
| R18 = 27.935 | D18 = 8.13 | N9 = 1.6668 | ν9 = 33.1 |
| R19 = −60.022 | D19 = 0.15 | | |
| R20 = 90.843 | D20 = 6.00 | N10 = 1.8340 | ν10 = 37.2 |
| R21 = −39.347 | D21 = 2.30 | N11 = 1.7725 | ν11 = 49.6 |
| R22 = 26.618 | D22 = 5.82 | | |
| R23 = −26.518 | D23 = 1.50 | N12 = 1.4875 | ν12 = 70.2 |
| R24 = −107.094 | D24 = 2.58 | | |
| R25 = 50.997 | D25 = 9.00 | N13 = 1.5481 | ν13 = 45.8 |
| R26 = −31.115 | D26 = 3.00 | N14 = 1.8830 | ν14 = 40.8 |
| R27 = −64.669 | | | |

TABLE 4

| | Eighth Embodiment | | Ninth Embodiment | | Tenth Embodiment | |
|---|---|---|---|---|---|---|
| | First Optical Element GNL1 UV-curable resin 1 | Second Optical Element GL1 14.2% ITO - UV-curable resin 2 | First Optical Element GNL1 UV-curable resin 1 | Second Optical Element GL1 14.2% ITO - UV-curable resin 2 | First Optical Element GNL1 20% TiO2 - UV-curable resin 2 | Second Optical Element GL1 20% ITO - UV-curable resin 2 |
| Conditional Expression | | | | | | |
| Nd | 1.6356 | 1.5648 | 1.6356 | 1.5648 | 1.7088 | 1.5963 |
| Ng | 1.6753 | 1.5941 | 1.6753 | 1.5941 | 1.7599 | 1.6383 |

TABLE 4-continued

|  |  |  |  |  |  |  |  |
|---|---|---|---|---|---|---|---|
|  | NC | 1.6281 | 1.5544 | 1.6281 | 1.5544 | 1.7003 | 1.5804 |
|  | NF | 1.6560 | 1.5826 | 1.6560 | 1.5826 | 1.7331 | 1.6234 |
| 13, 14 | vd | 22.73 | 20.03 | 22.73 | 20.03 | 21.63 | 13.86 |
|  | θgd | 1.4220 | 1.0517 | 1.4220 | 1.0517 | 1.5594 | 0.9761 |
|  | θgF | 0.6895 | 0.4197 | 0.6895 | 0.4194 | 0.8170 | 0.3459 |
| 11, 12 | Δθgd | 0.0826 | −0.2996 | 0.0826 | −0.2996 | 0.2152 | −0.4049 |
| 9, 10 | ΔθgF | 0.0652 | −0.2147 | 0.0652 | −0.2147 | 0.1888 | −0.3130 |
| 15 | φ | 0.000521 | −0.000386 | 0.001171 | −0.000774 | 0.000386 | −0.000472 |
| 8 | Lt/ft | 0.764 | | 0.669 | | 0.669 | |

| Conditional Expression | | Eleven Embodiment | | Twelfth Embodiment | | Thirteenth Embodiment | |
|---|---|---|---|---|---|---|---|
|  |  | First Optical Element GNL1 N-polyvinyl carbazole | Second Optical Element GL1 5% ITO - UV-curable resin 2 | First Optical Element GNL1 3% TiO2 - UV-curable resin 2 | Second Optical Element GL1 10% ITO - N-polyvinyl carbazole | First Optical Element GNL1 UV-curable resin 1 | Second Optical Element GL1 5% ITO - UV-curable resin 2 |
|  | Nd | 1.6959 | 1.5425 | 1.5532 | 1.7127 | 1.6356 | 1.5425 |
|  | Ng | 1.7516 | 1.5630 | 1.5725 | 1.7772 | 1.6753 | 1.5630 |
|  | NC | 1.6853 | 1.5362 | 1.5494 | 1.6969 | 1.6281 | 1.5362 |
|  | NF | 1.7246 | 1.5549 | 1.5633 | 1.7483 | 1.6560 | 1.5549 |
| 13, 14 | vd | 17.68 | 29.05 | 39.81 | 13.85 | 22.73 | 29.05 |
|  | θgd | 1.4155 | 1.0963 | 1.3852 | 1.2527 | 1.4220 | 1.0963 |
|  | θgF | 0.6856 | 0.4346 | 0.6645 | 0.5604 | 0.6895 | 0.4346 |
| 11, 12 | Δθgd | 0.0533 | −0.2178 | 0.1063 | −0.1283 | 0.0826 | −0.2178 |
| 9, 10 | ΔθgF | 0.0424 | −0.1688 | 0.0898 | −0.0986 | 0.0652 | −0.1688 |
| 15 | φ | 0.001558 | −0.000787 | 0.001440 | −0.001256 | 0.000661 | −0.001198 |
| 8 | Lt/ft | 0.720 | | 0.748 | | 0.737 | |

TABLE 5

|  | UV Curable Resin 2 | ITO | TiO2 |
|---|---|---|---|
| Nd | 1.5241 | 1.8571 | 2.3038 |
| Ng | 1.5371 | 1.9924 | 2.4568 |
| NC | 1.5212 | 1.7979 | 2.2803 |
| NF | 1.5313 | 1.9487 | 2.3745 |
| vd | 51.55 | 5.69 | 13.84 |
| θgd | 1.2695 | 0.8976 | 1.6241 |
| θgF | 0.5631 | 0.2901 | 0.8731 |

TABLE 6

| Conditional Expression | | Eighth Embodiment | Ninth Embodiment | Tenth Embodiment |
|---|---|---|---|---|
|  | ΔθgF1 × φ1/vd1 | 1.4955E−06 | 3.3613E−06 | 3.3697E−06 |
|  | ΔθgF2 × φ2/vd2 | 4.1376E−06 | 8.2967E−06 | 1.0657E−05 |
| 16 | (ΔθgF1 × φ1/vd1)/(ΔθgF2 × φ2/vd2) | 3.6144E−01 | 4.0513E−01 | 3.1618E−01 |
| Conditional Expression | | Eleven Embodiment | Twelfth Embodiment | Thirteenth Embodiment |
|  | ΔθgF1 × φ1/vd1 | 3.7344E−06 | 3.2472E−06 | 1.8974E−06 |
|  | ΔθgF2 × φ2/vd2 | 4.5726E−06 | 8.9444E−06 | 6.9605E−06 |
| 16 | (ΔθgF1 × φ1/vd1)/(ΔθgF2 × φ2/vd2) | 8.1669E−01 | 3.6304E−01 | 2.7259E−01 |

An optical system according to an exemplary embodiment of the present invention is described below. The intersecting point of a light axis La and a paraxial chief ray R is defined as "P". This optical system is a retrofocus optical system that is configured so that the maximum height of the paraxial marginal ray from the light axis when the paraxial marginal ray passes through the lens surface on the enlargement side of the point P is less than that on the reduction side relative to the point P. That is, the optical system has a focal length shorter than the total lens length thereof (the distance between the first lens surface and the image plane).

According to the present exemplary embodiment, the optical system OL includes a first optical element and a second optical element on at least one of the enlargement side and the reduction side relative to the point P. Each of the first optical element and the second optical element has a refractive light incident surface and a refractive light emergent surface and is made of a solid material.

Each of the first and second optical elements is a refractive optical element (hereinafter simply referred to as an "optical element") having a refractive power that satisfies the following conditions.

As used herein, the term "solid material" of the refractive optical element refers to a material that is solid in a use environment of the optical system. Accordingly, the material may be in any state before the optical system is in use (e.g., during a fabrication period). For example, even when the material is liquid during the fabrication period, the material is referred to as a "solid material" if the liquid material is cured into a solid material.

Figure 38:
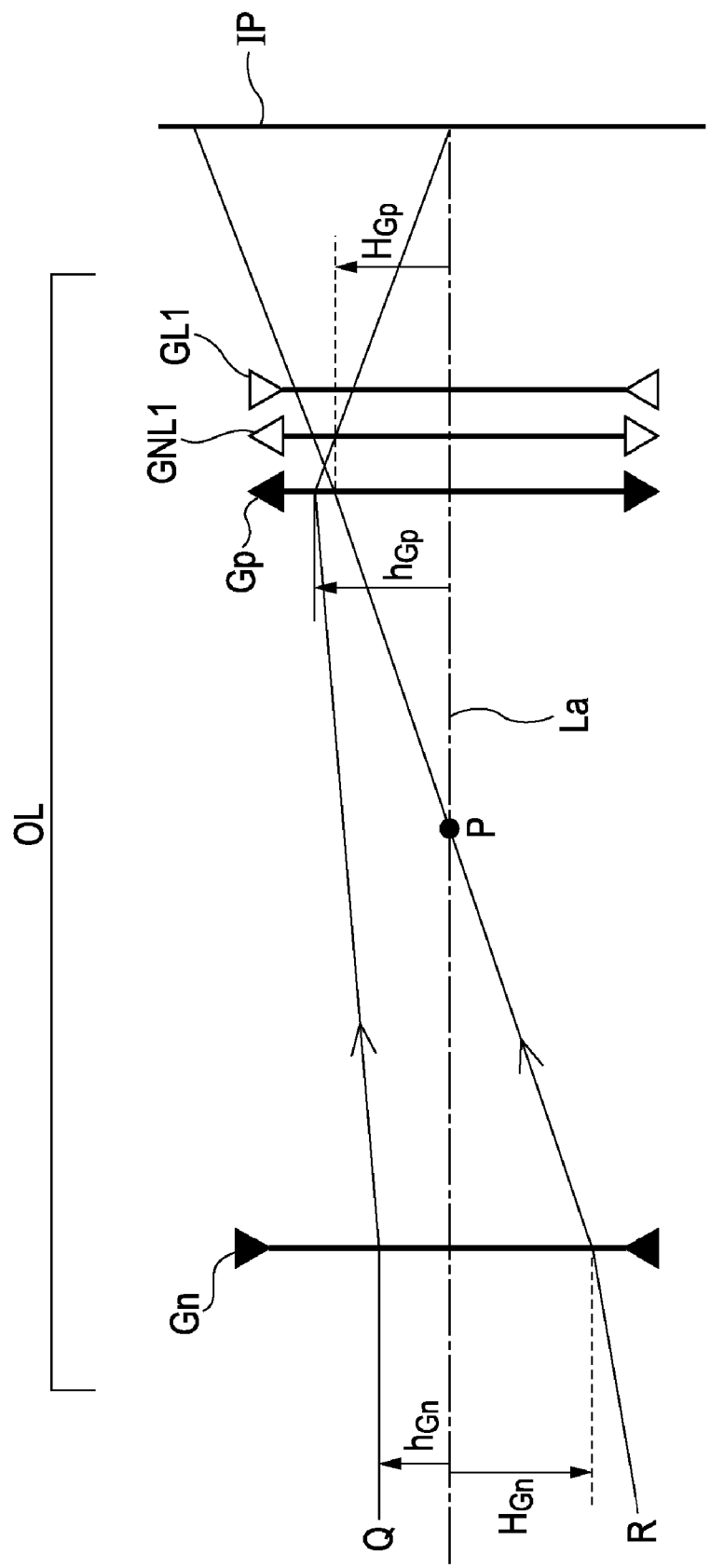
FIG. 38 is a schematic illustration of a paraxial refractive power arrangement of the optical system according to an embodiment of the present invention.

FIG. 38 is a schematic illustration of a paraxial refractive power arrangement for illustrating the optical function of the optical system according to the present embodiment. In FIG. 38, an object is located on the left side (the enlargement side), and an image plane is located on the right side (the reduction side).

As shown in FIG. 38, an optical system OL is of a retrofocus type having the total lens length (the distance between the first lens surface and the image plane) that is greater than the focal length. The telephoto optical system OL includes a front lens group Gn having a negative refractive power and a rear lens group Gp having a positive refractive power. The rear lens group Gp includes a first refractive optical element (a first optical element) GNL1 and a second refractive optical element (a second optical element) GL1 composed of a material that satisfies the following conditional expressions (18) to (27).

For simplicity, all of the lenses included in the front lens group Gn and the rear lens group Gp are thin single lenses. These lenses are disposed along a light axis La in the front lens group Gn and the rear lens group Gp so that the distances therebetween are zero. In addition, each of the first optical element GNL1 and the second optical element GL is a thin single lens. The first optical element GNL1 and the second optical element GL1 are disposed along the light axis La in the rear lens group Gp so that the distance therebetween is zero.

Although, in FIG. 38, the first and second optical element GNL1 and GL1 are disposed in the rear lens group Gp, the first and second optical elements GNL1 and GL1 may be disposed in the front lens group Gn if conditional expressions (18) to (27) are satisfied.

A paraxial marginal ray Q is a paraxial ray that, when the focal length of the entire optical system is normalized to "1", travels parallel to the light axis of the optical system at a height of "1" from the light axis and is made incident on the optical system.

It is assumed that an object is disposed on the left side of the optical system, and a light ray made incident on the optical system from the object side travels from the left to the right. A paraxial chief ray R is a paraxial ray that, when the focal length of the entire optical system is normalized to "1", passes through an intersection between the entrance pupil and the light axis of the optical system among light rays made incident on the optical system at an angle of −45° with respect to the light axis. The incident angle of a ray is positive if the ray is measured from the light axis in a clockwise direction, while the incident angle is negative if the ray is measured from the light axis in a counterclockwise direction. The intersecting point of the light axis La and a paraxial chief ray R is defined as "P". The image plane is denoted as "IP".

As shown in FIG. 38, in the optical system OL, a maximum height $h_{Gn}$ of the paraxial marginal ray Q from the light axis La when the paraxial marginal ray Q passes through the lens surface on the enlargement side is smaller than a maximum height $h_{Gp}$ of the paraxial marginal ray Q from the light axis La when the paraxial marginal ray Q passes through the lens surface on the reduction side. That is, $H_{Gn}$ and $H_{Gp}$ represent the heights of the paraxial chief ray R from the light axis La when the paraxial chief ray R is made incident on the front lens group Gn and the rear lens group Gp, respectively.

The features of the optical system OL according to the present exemplary embodiment are described next.

Let ft denote the focal length of the entire optical system, and Lt denote the total lens length of the optical system.

The optical system OL includes a first optical element GNL1 and a second optical element GL1 on at least one of the enlargement side and the reduction side relative to the point P. Each of the first optical element GNL1 and the second optical element GNL2 has a refractive light incident surface and a refractive light emergent surface and is made of a solid material.

Let $\Delta\theta gF1$ and $\Delta\theta gF2$ denote the anomalous partial dispersion values of the first optical element GNL1 and the second optical element GL1 for the Fraunhofer g-line and F-line, respectively.

Let $\phi1$ and $\phi2$ denote the refractive powers of the first optical element GNL1 and the second optical element GL1 when the incident and emergent surfaces of the first optical element GNL1 and the second optical element GL1 are in contact with air.

Let $\Delta\theta gd1$ and $\Delta\theta gd2$ denote the anomalous partial dispersion values of the materials of the first optical element GNL1 and the second optical element GL1 for the Fraunhofer g-line and d-line, respectively.

Let vd1 and vd2 denote the Abbe numbers of the solid materials of the first optical element GNL1 and the second optical element GL1, respectively.

Then, at least one of the following conditions is satisfied:

$$2 < Lt/ft < 15 \quad (17)$$

$$\Delta\theta gF1 > 0.0272 \quad (18)$$

$$\Delta\theta gF2 < -0.0278 \quad (19)$$

$$\Delta\theta gd1 > 0.038 \quad (20)$$

$$\Delta\theta gd2 < -0.037 \quad (21)$$

$$vd1 < 60 \quad (22)$$

$$vd2 < 60 \quad (23)$$

$$\phi1 \times \phi2 < 0 \quad (24)$$

Let $\phi1a$ and $\phi2a$ denote the refractive powers of the first optical element and the second optical element disposed on the reduction side relative to the point P, respectively. Let vd1a and vd2a denote the Abbe numbers of the materials of the first optical element and the second optical element, respectively. Let $\Delta\theta gF1a$ and $\Delta\theta gF2a$ denote the anomalous partial dispersion values of the first optical element and the second optical element for the g-line and F-line, respectively.

Then, at least one of the following two conditional expressions is satisfied:

$$(\phi1a \times \Delta\theta gF1a/vd1a)/(\phi2a \times \Delta\theta gF2a/vd2a) > 0.8 \quad (25)$$

$$\phi1a > 0 \text{ and } \phi2a < 0 \quad (26)$$

Let $\phi1b$ and $\phi2b$ denote the refractive powers of the first optical element and the second optical element disposed on the enlargement side relative to the point P, respectively. Then, the following conditional expression is satisfied:

$$\phi1b < 0 \text{ and } \phi2b > 0 \quad (27)$$

For the optical element used in the optical system according to the present exemplary embodiment, the Abbe number vd, the relative partial dispersion θgd of the solid material for the Fraunhofer g-line and d-line, and the relative partial dispersion θgF of the solid material for the Fraunhofer g-line and F-line are defined as follows:

$$vd=(Nd-1)/(NF-NC)$$

$$\theta gd=(Ng-Nd)/(NF-NC)$$

$$\theta gF=(Ng-NF)/(NF-NC)$$

where Ng, NF, Nd, and NC denote the indices of refraction of the solid material for the Fraunhofer g-line (wavelength=435.8 nm), the Fraunhofer F-line (wavelength=486.1 nm), the Fraunhofer d-line (wavelength=587.6 nm), and the Fraunhofer C-line (wavelength=656.3 nm), respectively.

In general, the relative partial dispersions θgd and θgF of the solid material used for a lens system are approximated as follows:

$$\theta gd=-1.687\times10^{-7}vd^3+5.702\times10^{-5}vd^2-6.603\times10^{-3}vd+1.462$$

$$\theta gF=-1.665\times10^{-7}vd^3+5.213\times10^{-5}vd^2-5.656\times10^{-3}vd+0.7278$$

Here, the anomalous partial dispersion values ΔθgF and ΔθgF for the g-line and d-line and for the g-line and F-line, respectively, are expressed as follows:

$$\Delta\theta gd=\theta gd-(-1.687\times10^{-7}vd^3+5.702\times10^{-5}vd^2-6.603\times10^{-3}vd+1.462)$$

$$\Delta\theta gF=\theta gF-(-1.665\times10^{-7}vd^3+5.213\times10^{-5}vd^2-5.656\times10^{-3}vd+0.7278)$$

According to the present exemplary embodiment, the optical system OL includes at least one first refractive optical element GNL1 that is composed of a solid material having high dispersion and high relative partial dispersion and at least one second refractive optical element GL1 that is composed of a solid material having high dispersion and low relative partial dispersion.

As used herein, the term "refractive optical element" refers to an optical element, such as a refractive lens, that produces refractive power using a refracting effect. Thus, a diffractive optical element that produces refractive power using a diffracting effect is not included in the category of the term "refractive optical element".

The above-described conditional expressions are technically described next.

The optical system of the present exemplary embodiment is one of retrofocus optical systems that satisfy conditional expression (17). In the optical systems that satisfy conditional expression (17), by satisfying at least one of conditional expressions (18) to (27), an advantage corresponding to the conditional expression can be effectively obtained.

According to the present exemplary embodiment, by employing at least one first optical element GNL1 composed of a solid material that satisfies conditional expression (18) and at least one second optical element GL1 composed of a solid material that satisfies conditional expression (19), chromatic aberration of the optical system in the range of the wavelength of visible light can be sufficiently corrected.

By employing the first optical element GNL1 and the second optical element GL1 that satisfy conditional expressions (20) and (21), chromatic aberration of the optical system in the range of a short wavelength to a medium wavelength can be easily and sufficiently corrected. If the optical system satisfies all the conditional expressions (18) to (21), chromatic aberration of the optical system in a wide range of a short wavelength to a long wavelength can be further sufficiently corrected.

By employing solid materials that satisfy conditional expressions (22) and (23) for the first and second optical elements GNL1 and GL1, chromatic aberration of the optical system can be easily corrected.

By configuring the refractive powers of the first optical element GNL1 and the second optical element GL1 so that conditional expression (24) is satisfied, chromatic aberration of the optical system in a wide wavelength range can be sufficiently corrected.

In addition, in the case where the first optical element GNL1 and the second optical element GL1 are disposed on the reduction side relative to the point P, it is desirable that the refractive powers and the materials of the first optical element GNL1 and the second optical element GL1 satisfy at least one of conditional expressions (25) and (26).

In contrast, in the case where the first optical element GNL1 and the second optical element GL1 are disposed on the enlargement side relative to the point P, it is desirable that conditional expression (27) is further satisfied.

In this way, chromatic aberration can be easily and sufficiently corrected by the optical system of a retrofocus type according to the present exemplary embodiment.

In the present exemplary embodiment, when the first optical element GNL1 and the second optical element GL1 are provided in the optical system, it is desirable that both the first optical element GNL1 and the second optical element GL1 are disposed on each of the enlargement side and the reduction side relative to the point P at which the light axis La intersects the paraxial chief ray R. Thus, chromatic aberration of the optical system can be further sufficiently corrected.

Examples of the solid material (optical material) that satisfies conditional expression (18) include a variety of resins.

Among the variety of resins, a UV-curable resin (Nd=1.63, vd=22.7, and θgF=0.69) and N-polyvinyl carbazole (Nd=1.696, vd=17.7, and θgF=0.69) are optical materials that satisfy conditional expression (18). However, in addition to these materials, any solid material that satisfies conditional expression (18) can be employed.

In addition, an optical material having a characteristic that is different from that of a widely used glass material can be used. Examples of such an optical material include a mixture of a synthetic resin and inorganic oxide nanoparticles dispersed therein. Examples of the inorganic oxide nanoparticles include $TiO_2$ particles (Nd=2.304 and vd=13.8), $Nb_2O_5$ particles (Nd=2.367 and vd=14.0), ITO particles (Nd=1.8571 and vd=5.69), $CrO_3$ particles (Nd=2.2178 and vd=13.4), and $BaTiO_3$ particles (Nd=2.4362 and vd=11.3).

Among these types of inorganic oxide, by dispersing $TiO_2$ particles (Nd=2.304, vd=13.8, and θgF=0.87) in a synthetic resin in an appropriate volume ratio, an optical material that satisfies conditional expression (18) can be obtained.

In addition, by dispersing ITO fine particles (Nd=1.8571, vd=5.69, and θgF=0.873) in a synthetic resin in an appropriate volume ratio, an optical material that satisfies conditional expression (19) can be obtained. However, in addition to these materials, any solid materials that satisfy conditional expressions (18) and (19) can be employed.

In the exemplary embodiments, by using an optical material having a relative partial dispersion higher than that of a widely used optical material and an optical material having a relative partial dispersion lower than that of a widely used optical material, the chromatic aberration is sufficiently corrected.

In the wavelength-dependent characteristic of the index of refraction (dispersion characteristic) of an optical material, the Abbe number represents the slope of the dispersion characteristic curve, and the relative partial dispersion represents the curvature of the dispersion characteristic curve.

In general, the index of refraction of an optical material in a short-wavelength range is higher than that in a long-wavelength range. At that time, the Abbe number and the relative partial dispersion are positive.

Accordingly, the dispersion characteristic curve is downwardly convex. A change in the index of refraction relative to a change in the wavelength increases towards a short-wavelength range. For example, refractive index characteristics with respect to a wavelength for S-BSL7 (Nd=1.516 and vd=64.1) and S-TIH53 (Nd=1.847 and vd=23.8) available from OHARA corporation are shown in FIG. 41.

In addition, a high-dispersion optical material having a smaller Abbe number tends to have a higher relative partial dispersion θgF for g-line and F-line and a higher relative partial dispersion θgd for g-line and d-line.

In widely used optical materials, the relative partial dispersion substantially linearly changes with respect to the Abbe number. However, an optical material having an anomalous partial dispersion changes differently from the linear change. A typical example of such an anomalous partial dispersion material is fluorite.

The wavelength-dependent characteristic curve of a chromatic aberration coefficient of an optical material having a high relative partial dispersion has a large curvature in a short-wavelength range, compared with that of a widely used optical material.

When the refractive power of the lens surface of an optical material having a high relative partial dispersion is changed in order to control the chromatic aberration, the slope of the entire wavelength-dependent characteristic curve of a chromatic aberration coefficient changes such that the entire wavelength-dependent characteristic curve rotates about a point of a reference design wavelength. In particular, the change is significant in a short-wavelength range for an optical material having a high relative partial dispersion. As a result, the slope of the entire wavelength-dependent characteristic curve is changed while significantly changing the curvature in the short-wavelength range.

By using this property, the curvature of the wavelength-dependent characteristic curve of a chromatic aberration coefficient in the short-wavelength range can be canceled. However, it is difficult to correct the remaining slope of the wavelength-dependent characteristic curve of a chromatic aberration coefficient at the same time. In addition, the correction of the curvature in the short-wavelength range relatively increases chromatic aberration in a long-wavelength range. To prevent the increase in chromatic aberration in a long-wavelength range, the refractive power of an appropriate one of the glass surfaces of the optical system needs to be changed. However, this is not suitable for correcting a variety of aberrations other than chromatic aberration.

In contrast, the wavelength-dependent characteristic curve of a chromatic aberration coefficient of an optical material having a low relative partial dispersion has a small curvature in a short-wavelength range. Accordingly, the chromatic aberration coefficient linearly changes with a change in wavelength, compared with that of a widely used optical material. When the refractive power of the lens surface of an optical material having a low relative partial dispersion is changed in order to control the chromatic aberration, the slope of the entire wavelength-dependent characteristic curve of a chromatic aberration coefficient changes such that the entire wavelength-dependent characteristic curve rotates about a point of a reference design wavelength while relatively retaining linearity with respect to the wavelength. In this way, the slope of the wavelength-dependent characteristic curve of a chromatic aberration coefficient can be corrected.

Accordingly, by employing an optical material having a high relative partial dispersion in addition to an optical material having a low relative partial dispersion, the curvature of the wavelength-dependent characteristic curve of a chromatic aberration coefficient in a short-wavelength range and the slope of the entire wavelength-dependent characteristic curve can be corrected at the same time. That is, the chromatic aberration of the optical system can be sufficiently corrected in a wide wavelength range of the g-line to C-line.

Such correction of chromatic aberration of an optical system is described next with reference to an optical system including a refractive optical system portion GNL using an optical material having a high relative partial dispersion, a refractive optical system portion GL using an optical material having a low relative partial dispersion, and a refractive optical system portion G using a widely used optical material having a normal relative partial dispersion.

Chromatic aberration of the refractive optical system portion G is corrected to some extent first. Then, a relatively high-dispersion optical material is selected for a negative lens included in the refractive optical system portion G. The slope of the entire wavelength-dependent characteristic curve of a chromatic aberration coefficient of the refractive optical system portion G is changed while the portion in a short-wavelength range is significantly curved from the original shape.

At that time, an appropriate refractive power is provided to the refractive optical system portion GNL, and a relatively high-dispersion optical material is selected for a positive lens included in the refractive optical system portion G. However, in the case where the refractive optical system portion GNL is composed of a widely used optical material having a uniform relative partial dispersion with respect to an Abbe number, the refractive optical system portion GNL is partially responsible equally for a curvature component and a slope component of the wavelength-dependent characteristic curve of a chromatic aberration coefficient of the refractive optical system portion G. Therefore, the curvature component and the slope component cannot be canceled at the same time.

In contrast, in the case where the refractive optical system portion GNL is composed of an optical material having a relative partial dispersion higher than that of a widely used optical material, the refractive optical system portion GNL is relatively largely responsible for the slope component of the entire wavelength-dependent characteristic curve of a chromatic aberration coefficient of the main refractive optical system portion G. Therefore, the curvature component can be mainly canceled. As a result, the slope of the entire wavelength-dependent characteristic curve of a chromatic aberration coefficient can be changed while increasing linearity from the original shape.

At that time, by further providing the refractive optical system portion GL with an appropriate refractive power with a plus/minus sign opposite to that of the refractive optical system portion GNL, the slope of the entire wavelength-dependent characteristic curve of a chromatic aberration coefficient of the refractive optical system portion G can be corrected.

However, if the refractive optical system portion GL is composed of a widely used optical material, the refractive optical system portion GL has a characteristic in which the wavelength-dependent characteristic curve of a chromatic aberration coefficient is relatively largely convex in a direction opposite to that corresponding to the wavelength-dependent characteristic curve of the refractive optical system portion G.

Accordingly, although the slope component of the entire wavelength-dependent characteristic curve of a chromatic aberration coefficient can be canceled, a curvature component that increases the chromatic aberration occurs. At that time, to correct the curvature component of the entire wavelength-dependent characteristic curve of a chromatic aberration coefficient, the refractive power of the refractive optical system portion GNL composed of a material having a high relative partial dispersion needs to be further changed. However, if the refractive power is further changed, the thickness of the lens in the light axis direction disadvantageously increases.

In contrast, in the case where the refractive optical system portion GL is composed of an optical material having a low relative partial dispersion, the linearity of the wavelength-dependent characteristic curve of a chromatic aberration coefficient of the refractive optical system portion GL is relatively increased. That is, by changing the refractive power of the refractive optical system portion GL in order to correct the chromatic aberration, the slope of the wavelength-dependent characteristic curve of a chromatic aberration coefficient can be changed so that the wavelength-dependent characteristic curve rotates about the point of the design reference wavelength while substantially maintaining linearity. Accordingly, the chromatic aberration can be sufficiently corrected.

As described above, by using the refractive optical system portion GNL and the refractive optical system portion GL for the main refractive optical system portion G, the slope component and the curvature component of the wavelength-dependent characteristic curve of a chromatic aberration coefficient can be relatively easily corrected at the same time.

Figure 39:
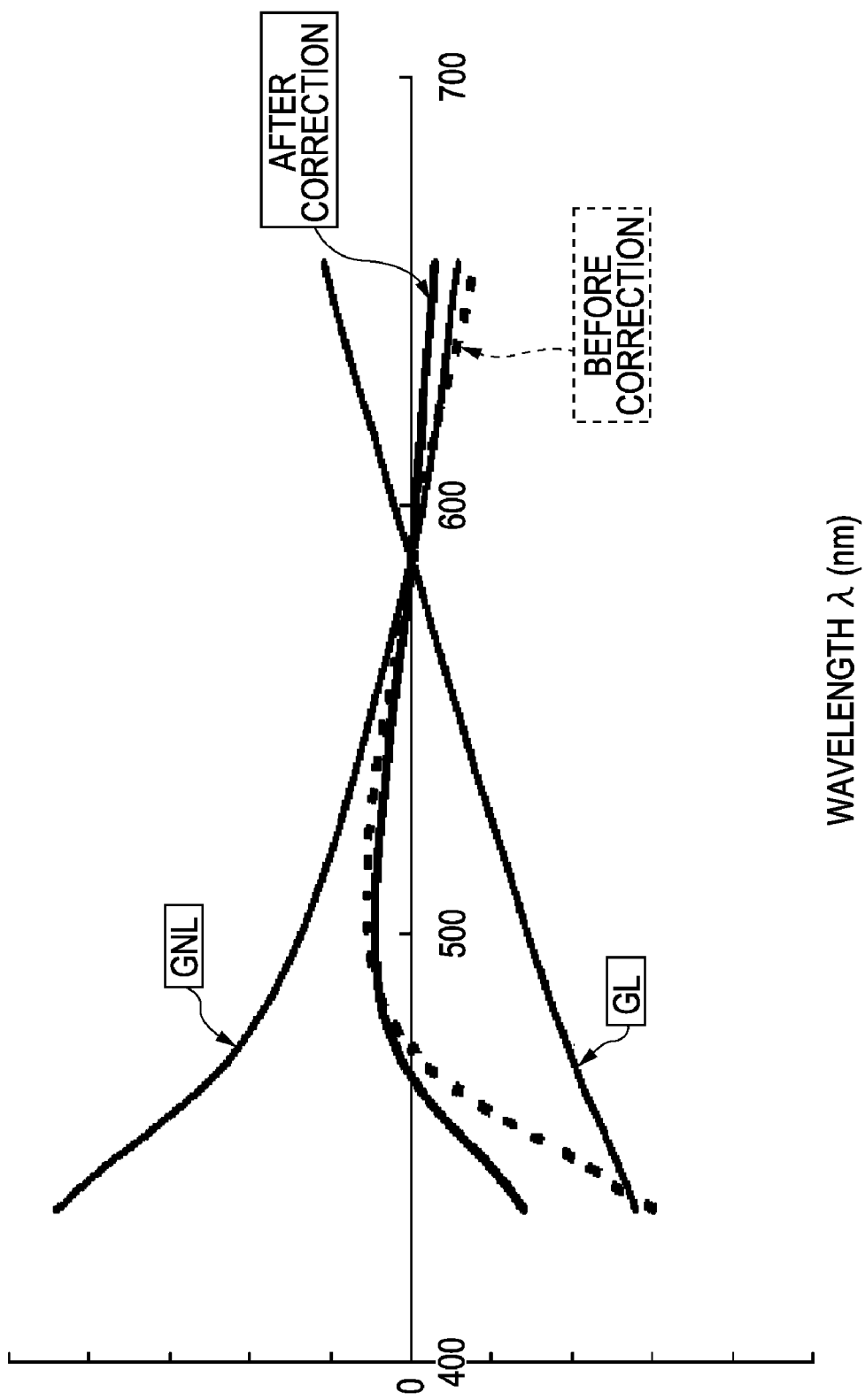
FIG. 39 is a diagram illustrating a wavelength characteristic of an aberration coefficient according to the present invention.

FIG. 39 illustrates a relationship between the axial chromatic aberration coefficient L and a wavelength in a retrofocus optical system. According to the present exemplary embodiment, chromatic aberration in the entire wavelength range of visible light can be corrected. This is described in more detail below.

In FIG. 39, the term "before correction" indicates the wavelength-dependent characteristic curve of a chromatic aberration coefficient before the refractive optical system portions GNL and GL are employed.

An appropriate refractive power is provided to the refractive optical system portion GNL of such an optical system so that the curvature of the wavelength-dependent characteristic curve of a chromatic aberration coefficient in a short-wavelength range.

Furthermore, an appropriate refractive power is provided to the refractive optical element GL of the optical system so that the slope component of the wavelength-dependent characteristic curve of a chromatic aberration coefficient of the refractive optical system portion GNL is corrected. At that time, the product of the refractive powers of the refractive optical system portion GNL and the refractive power of the refractive optical system portion GL becomes negative. As a result, according to the wavelength-dependent characteristic curve of a chromatic aberration coefficient after the correction, the curvature component in the short-wavelength range can be corrected without deteriorating the chromatic aberration characteristic in the long-wavelength range. Thus, the chromatic aberration can be corrected in the entire wavelength range of visible light.

To sufficiently correct chromatic aberration by using one of the refractive optical system portion GNL and the refractive optical system portion GL, the refractive power of a lens surface of one of the refractive optical system portion GNL and the refractive optical system portion GL and the refractive power of a lens surface of the refractive optical system portion G need to be increased.

That is, by employing the refractive optical system portions GNL and GL, the refractive power of each of the refractive optical system portion GNL and the refractive optical system portion GL can be relatively reduced. As a result, the thickness of the solid material in the light axis direction can be reduced.

Furthermore, by employing the refractive optical system portions GNL and GL, the chromatic aberration can be reduced without significantly changing the refractive power of the refractive optical system portion G. Accordingly, a variety of aberrations other than the chromatic aberration can be maintained unchanged.

At that time, in order to independently correct chromatic aberration, the refractive optical system portion GNL and the refractive optical system portion GL can have a small Abbe number, that is, can be composed of a high-dispersion optical material. Furthermore, in retrofocus optical systems, at least one refractive optical system portion GNL and at least one refractive optical system portion GL can be disposed on the reduction side relative to the point P at which the paraxial chief ray intersects the light axis. This is described in detail next with reference to an axial chromatic aberration coefficient and a chromatic aberration coefficient of magnification of a lens surface.

Let $\Delta\Psi$ denote a change in refractive power of a surface of a refractive lens, and $v$ denote the Abbe number. Let h and H denote the heights of the paraxial marginal ray and the paraxial chief ray from the light axis when the paraxial marginal ray and the paraxial chief ray pass through the surface of the refractive lens, respectively. Then, a change $\Delta L$ in the axial chromatic aberration coefficient and a change $\Delta T$ in a chromatic aberration coefficient of magnification can be expressed as follows:

$$\Delta L = h^2 \cdot \Delta\Psi / v \qquad (a)$$

$$\Delta T = h \cdot H \cdot \Delta\Psi / v \qquad (b)$$

As can be seen from equations (a) and (b), the changes in these aberration coefficients with respect to a change in the refractive power of the lens surface increase as the absolute value of the Abbe number decreases (i.e., as the dispersion increases). Accordingly, by using a high-dispersion material having a small absolute value of the Abbe number, the change amount of the refractive power that is required for obtaining a desired chromatic aberration can be reduced.

According to an aberration theory, this allows the chromatic aberration to be controlled without significantly affecting the spherical aberration, coma aberration, and astigmatism aberration. Thus, the chromatic aberration can be highly independently controlled.

In contrast, if a low-dispersion material is employed, the change amount of the refractive power that is required for obtaining a desired chromatic aberration is increased. With the increase in the change amount of the refractive power, a variety of aberrations, such as spherical aberration, significantly change. Thus, the chromatic aberration cannot be independently controlled. Therefore, in order to correct aberrations, it is important that, among the lenses of the optical system, at least one of the surfaces of the lenses is a surface of a refractive lens made of a high-dispersion material.

In addition, equations (a) and (b) indicate that the changes in the axial chromatic aberration coefficient and the chromatic aberration coefficient of magnification are determined by the values of the heights h and H. Using this result, the optimal arrangement of the refractive optical system portion GNL and the refractive optical system portion GL in the optical system is described next.

To sufficiently correct chromatic aberration, the slope component and the curvature component of the wavelength-dependent characteristic curve of a chromatic aberration coefficient need to be corrected at the same time. However, if the refractive power change $\Delta\Psi$ is decreased, sufficient correction of the chromatic aberration cannot be achieved. Conversely, if the refractive power change $\Delta\Psi$ is increased, the thickness of an optical element (i.e., a lens) is increased.

In general, since the transmittance of the optical material of the refractive optical system portion GNL and the refractive optical system portion GL having an anomalous partial dispersion characteristic is low, the thickness of a lens composed of the optical material needs to be relatively reduced. In addition, as the thickness decreases, a change in the optical performance with a change in the surrounding environment decreases. Accordingly, the resistance to the surrounding environment increases. Thus, molding of the lens is facilitated.

That is, in order to reduce the thicknesses of the refractive optical system portion GNL and the refractive optical system portion GL and sufficiently correct the chromatic aberration, the correction amounts of the slope component and the curvature component of the wavelength-dependent characteristic curve of a chromatic aberration coefficient can be appropriately controlled. According to equations (a) and (b), the correction amounts are determined by the heights h and H. Accordingly, the correction amounts change in accordance with the positions of the refractive optical system portions GNL and GL in the optical system. That is, in order to sufficiently correct the chromatic aberration and reduce the change amounts of the refractive powers of the refractive optical system portions GNL and GL, it is important to select the appropriate positions at which the refractive optical system portions GNL and GL are disposed.

The appropriate positions of the refractive optical system portions GNL and GL at which the chromatic aberration is sufficiently corrected and the change amounts of the refractive powers are reduced depend on the aberration structure of the optical system. In addition, the aberration structure varies in accordance with the type of optical system.

The sign (positive or negative) correlation between $\Delta L$ and $\Delta T$ is discussed next. The sign of $\Delta L/\Delta T$ is determined by the sign of the height h and the sign of the height H. In general, the height h is always positive. The sign of the height H is negative on the enlargement side relative to the point P, while the sign of the height H is positive on the reduction side relative to the point P.

In retrofocus optical systems, axial chromatic aberration and chromatic aberration of magnification can be easily corrected at the same time when $\Delta L/\Delta T$ is positive.

Therefore, in the retrofocus optical system according to the present embodiment, the refractive optical system portions GNL and GL can be disposed on the reduction side relative to the point P. In this way, axial chromatic aberration and chromatic aberration of magnification can be sufficiently corrected at the same time.

In addition, by letting the optical performance of the refractive optical system portions GNL and GL satisfy conditional expression (25), the curvature component and the slope component of the wavelength-dependent characteristic curve of a chromatic aberration coefficient can be sufficiently corrected, and the thicknesses of the refractive optical system portions GNL and GL can be reduced.

At that time, in order to cancel the curvature component and the slope component of the wavelength-dependent characteristic curve of a chromatic aberration coefficient, the product ($\phi 1 \times \phi 2$) of the refractive power of the refractive optical system portion GNL ($\phi 1$) and the refractive power of the refractive optical system portion GL ($\phi 2$) can be negative, as indicated by conditional expression (24). This is due to the wavelength-dependent characteristic of chromatic aberration of the retrofocus optical system.

In general, when a lens group is moved in order to perform zooming and focusing and control the position of the image, the states of a ray made incident on the lens groups change, and therefore, aberrations occurring in the lens groups change. Accordingly, in order to sufficiently correct the aberrations of the optical system in all the use cases, aberration coefficients that simultaneously change in all the use cases need to be determined for each of the lens groups. By disposing the refractive optical system portions GNL and GL in the same lens group, desired aberration values can be easily obtained.

In addition, if the thicknesses of the refractive optical system portions GNL and GL are reduced, a change in the characteristic due to the surrounding environment is reduced. Furthermore, by satisfying conditional expression (24), the changes in the characteristics of the refractive optical system portions GNL and GL cancel each other out. Therefore, the resistance to the surrounding environment can be increased.

A variety of aberrations including chromatic aberration are corrected by the refractive optical system portions GNL and GL in cooperation with a widely used optical material. Accordingly, the characteristics of the relative partial dispersions of the refractive optical system portions GNL and GL need to be different from that of the widely used optical material in order to correct the aberrations. However, a strong anomalous partial dispersion should be avoided.

When a lens made of an optical material having a characteristic significantly different from that of a widely used optical material is employed, the curvature of the wavelength-dependent characteristic curve of a chromatic aberration coefficient of the lens surface is particularly large. To correct the large curvature component, the refractive powers of other lenses need to be increased. This gives significant impact on the spherical aberration, the coma aberration, and the astigmatism aberration. Thus, it is difficult to correct these aberrations.

That is, the material of the refractive optical system portion GNL needs to be an optical material having a relative partial dispersion higher than that of a widely used optical material, but not having a relative partial dispersion significantly different from that of a widely used optical material.

In the retrofocus optical system according to the present exemplary embodiment, to obtain further sufficient correction of chromatic aberration, the range defined by conditional expression (17) can be redefined as follows:

$$3 < Lt/ft < 12 \tag{17a}$$

In addition, to obtain further sufficient correction of chromatic aberration, the range of the anomalous partial dispersion value $\Delta\theta gF1$ in conditional expression (18) relating to the first optical element GNL1 can be redefined as follows:

$$0.0272 < \Delta\theta gF1 < 0.2832 \tag{18a}$$

To obtain still further sufficient correction of chromatic aberration, the range of the anomalous partial dispersion value $\Delta\theta gF1$ defined by conditional expression (18a) can be redefined as follows:

$$0.0342 < \Delta\theta gF1 < 0.2832 \tag{18b}$$

To obtain further sufficient correction of chromatic aberration, the range of the anomalous partial dispersion value ΔθgF2 defined by conditional expression (19) relating to the second optical element GL1 can be redefined as follows:

$$-0.4278 < \Delta\theta gF2 < -0.0528 \quad (19a)$$

To obtain still further sufficient correction of chromatic aberration, the range of the anomalous partial dispersion value ΔθgF2 defined by conditional expression (19a) can be redefined as follows:

$$-0.4278 < \Delta\theta gF2 < -0.0778 \quad (19b)$$

To obtain further sufficient correction of chromatic aberration, the range of the anomalous partial dispersion value Δθgd1 defined by conditional expression (11) relating to the first optical element GNL1 can be redefined as follows:

$$0.038 < \Delta\theta gd1 < 0.347 \quad (20a)$$

To obtain still further sufficient correction of chromatic aberration, the range of the anomalous partial dispersion value Δθgd1 defined by conditional expression (20a) can be redefined as follows:

$$0.051 < \Delta\theta gd1 < 0.347 \quad (20b)$$

To obtain further sufficient correction of chromatic aberration, the range of the anomalous partial dispersion value Δθgd2 defined by conditional expression (21) relating to the second optical element GL1 can be redefined as follows:

$$-0.5620 < \Delta\theta gd2 < -0.062 \quad (21a)$$

To obtain still further sufficient correction of chromatic aberration, the range of the anomalous partial dispersion value Δθgd1 defined by conditional expression (21a) can be redefined as follows:

$$-0.5620 < \Delta\theta gd2 < -0.112 \quad (21b)$$

To obtain further sufficient correction of chromatic aberration, the ranges of the Abbe numbers vd1 and vd2 defined by conditional expressions (22) and (23) can be redefined as follows:

$$vd1 < 50 \quad (22a)$$

$$vd2 < 50 \quad (23a)$$

To obtain still further sufficient correction of chromatic aberration, the ranges of the Abbe numbers vd1 and vd2 defined by conditional expressions (22a) and (23a) can be redefined as follows:

$$vd1 < 45 \quad (22b)$$

$$vd2 < 45 \quad (23b)$$

To obtain yet still further sufficient correction of chromatic aberration, the ranges of the Abbe numbers vd1 and vd2 defined by conditional expressions (22b) and (23b) can be redefined as follows:

$$vd1 < 40 \quad (22c)$$

$$vd2 < 40 \quad (23c)$$

In the exemplary embodiments, the optical elements GNL1 and GL1 made of an optical material that satisfies conditional expressions (18) and (19) is employed for a lens and a refractive layer provided on a lens of the optical system. In addition, if the refractive surface composed of such an optical material is aspherical, chromatic aberration flare, such as spherical aberration of color, can be corrected. Furthermore, if an interface is formed between the optical element and air atmosphere or between the optical element and an optical material having a relatively low index of refraction, the chromatic aberration can be relatively significantly changed by slightly changing the radius of curvature of the interface.

In addition, to obtain further sufficient correction of chromatic aberration, the range defined by conditional expression (25) can be redefined as follows:

$$(\phi 1a \times \Delta\theta gF1a/vd1a)/(\phi 2a \times \Delta\theta gF2a/vd2a) > 0.9 \quad (25a)$$

Exemplary embodiments in which an optical element composed of the optical materials that satisfy conditional expressions (18) to (27) is employed for an optical system that satisfies conditional expression (17) are described in detail next.

In these exemplary embodiments, a UV-curable resin 1, N-polyvinyl carbazole, or a mixture of a UV-curable resin 2 and $TiO_2$ fine particles dispersed therein is used for an optical material that satisfies conditional expressions (18), (20), and (22). A mixture of the UV-curable resin 2 and ITO fine particles dispersed therein or a mixture of N-polyvinyl carbazole and ITO fine particles dispersed therein is used for an optical material that satisfies conditional expressions (19), (21), and (23) relating to the second optical element GL1.

An optical system for use in each of the exemplary embodiments is a photo-taking lens system used in an image pickup apparatus, such as a video camera, a digital camera, or a silver-halide film camera. In the cross-sectional views of lenses, an object is located on the left side (the front side), and an image plane is located on the right side (the rear side).

In the case where the optical systems of the exemplary embodiments are used for projection lenses of, for example, projectors, a screen is located on the left side, and an image to be projected is located on the right side.

In the cross-sectional views of lenses, "i" represents the order of a lens group numbered from the object. "Li" represents an ith lens group.

In addition, "SP" represents an aperture stop. The aperture stop S is disposed between the second lens group L2 and the third lens group L3. "IP" represents an image plane. When the optical system is used for a photo-taking lens of a video camera or a digital still camera, an imaging surface of a solid-state image pickup element (a photoelectric conversion element), such as a CCD sensor or a CMOS sensor, is disposed in the image plane IP. When the optical system is used for a photo-taking lens of a silver-halide film camera, a light-sensitive surface corresponding to the film surface is disposed in the image plane IP. "GNL1" and "GL1" represent the first and second optical elements, respectively.

In aberration diagrams, "d" and "g" represent the d-line and g-line, respectively. "ΔM" and "ΔS" represent the meridional image plane and the sagittal image plane, respectively. The chromatic aberration of magnification is represented using the g-line. "ω" denotes the half angle of field. "Fno" denotes the F number.

Figure 28:
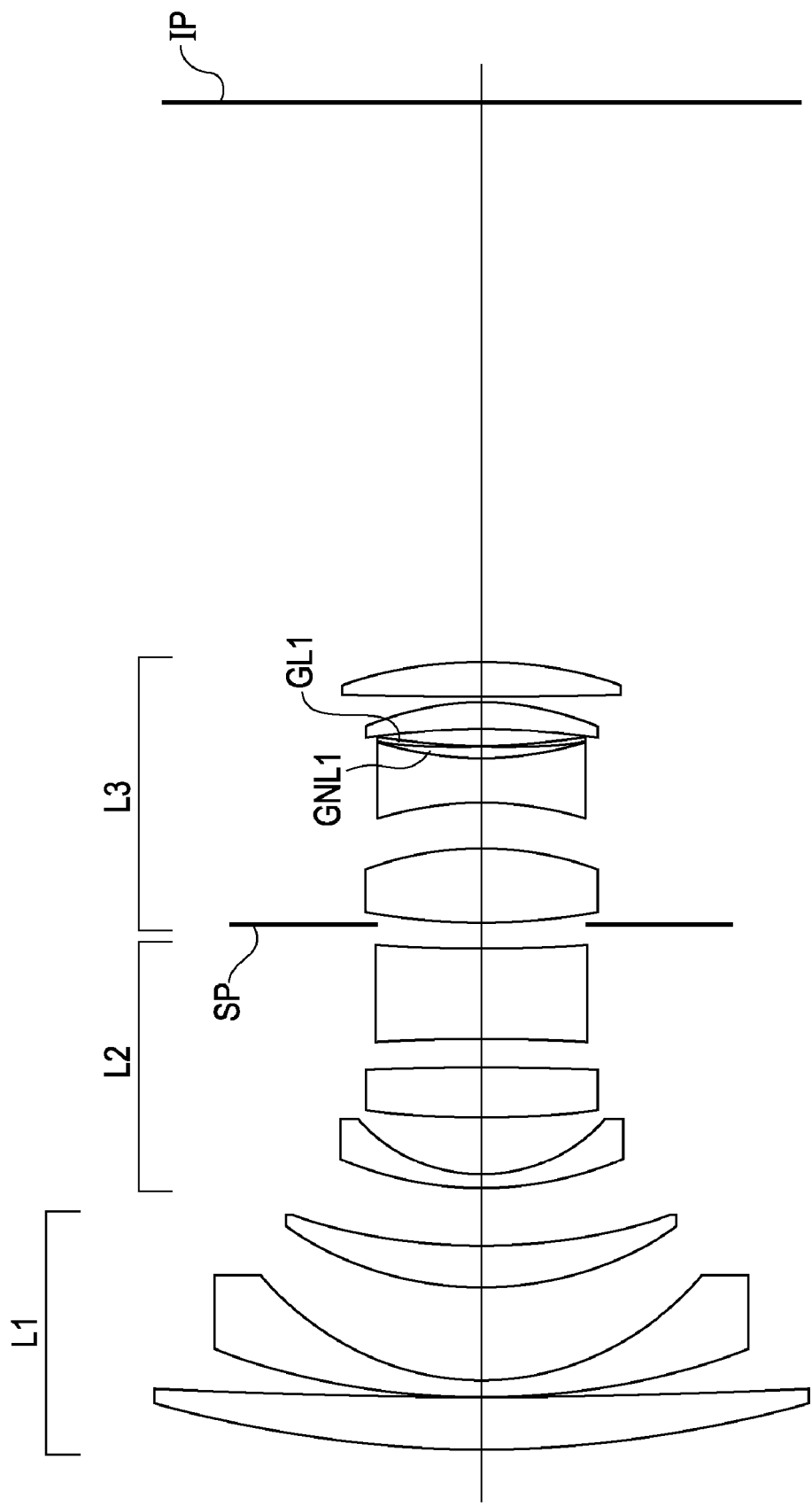
FIG. 28 is a cross-sectional view of an optical system according to a fourteenth numerical embodiment of the present invention.
Figure 29:
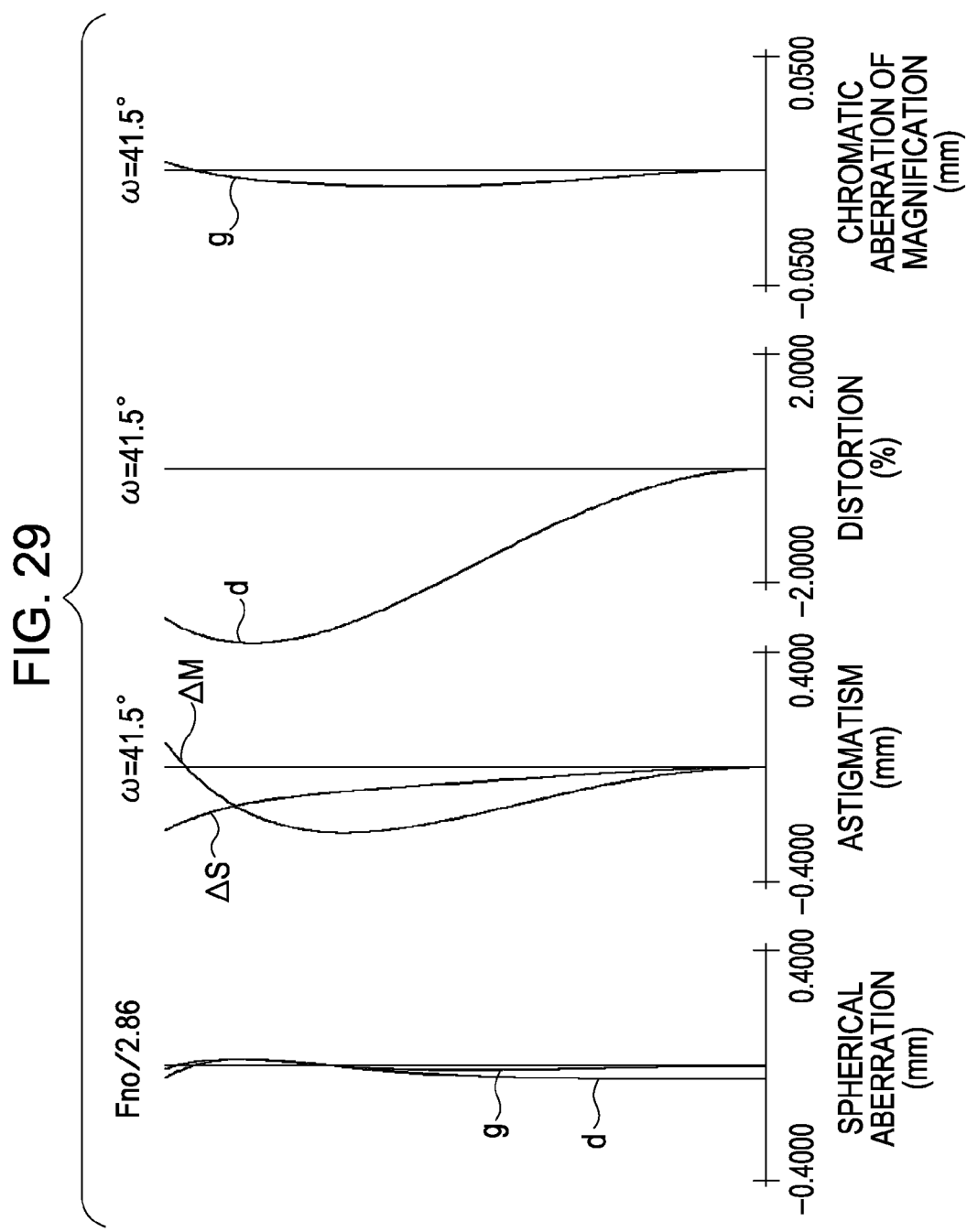
FIG. 29 is an aberration diagram according to the fourteenth numerical embodiment.

According to a fourteenth exemplary embodiment, as shown in FIG. 28, an optical system is a wide-angle lens (a retrofocus optical system) having a focal length of 24 mm. The optical system includes a first lens group L1 having a negative refractive power, a second lens group L2 having a negative refractive power, and a third lens group L3 having a positive refractive power. When focusing is carried out, the second lens group L2 and the third lens group L3 are moved along the light axis.

According to the present embodiment, the optical system includes a first optical element GNL1 composed of the UV-curable resin 1 and a second optical element GL1 composed of a mixture of the UV-curable resin 2 and 14.2% by volume ITO fine particles dispersed therein. As shown in FIG. 28, the first optical element GNL1 is a lens (layer) composed of the UV-curable resin 1. The second optical element GL1 is a lens (layer) composed of a mixture including ITO fine particles.

According to the fourteenth embodiment, the first optical element GNL1 composed of the UV-curable resin 1 and having a positive refractive power and the second optical element GL1 composed of a mixture including ITO fine particles and having a negative power are disposed on the image side relative to the aperture stop SP, where, when the paraxial marginal ray passes through the first optical element GNL1 and the second optical element GL1, the height of the paraxial marginal ray from the light axis is relatively large.

In addition, the first optical element GNL1 is in tight contact with the second optical element GL1. In this way, axial chromatic aberration and chromatic aberration of magnification are sufficiently corrected.

Figure 30:
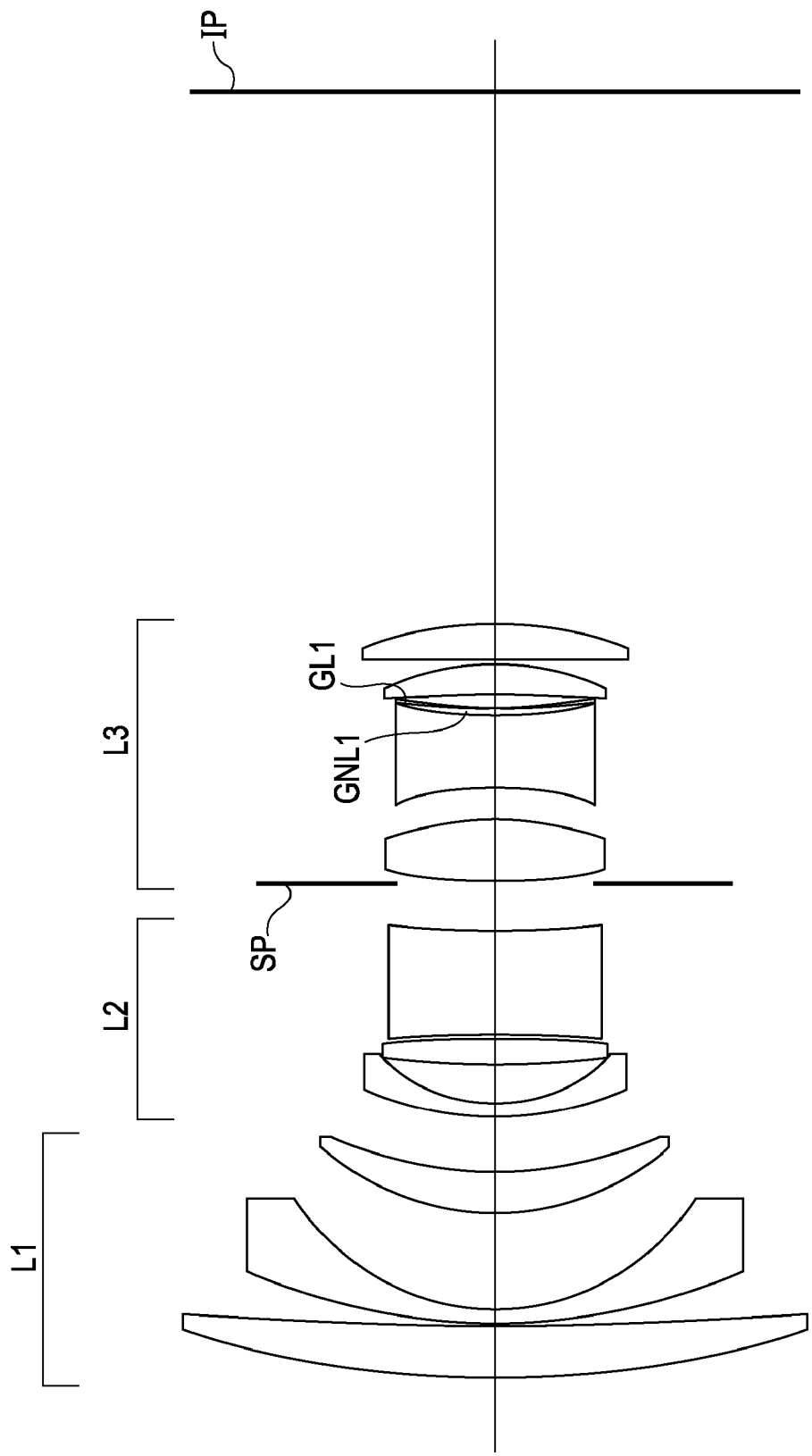
FIG. 30 is a cross-sectional view of an optical system according to a fifteenth numerical embodiment of the present invention.
Figure 31:
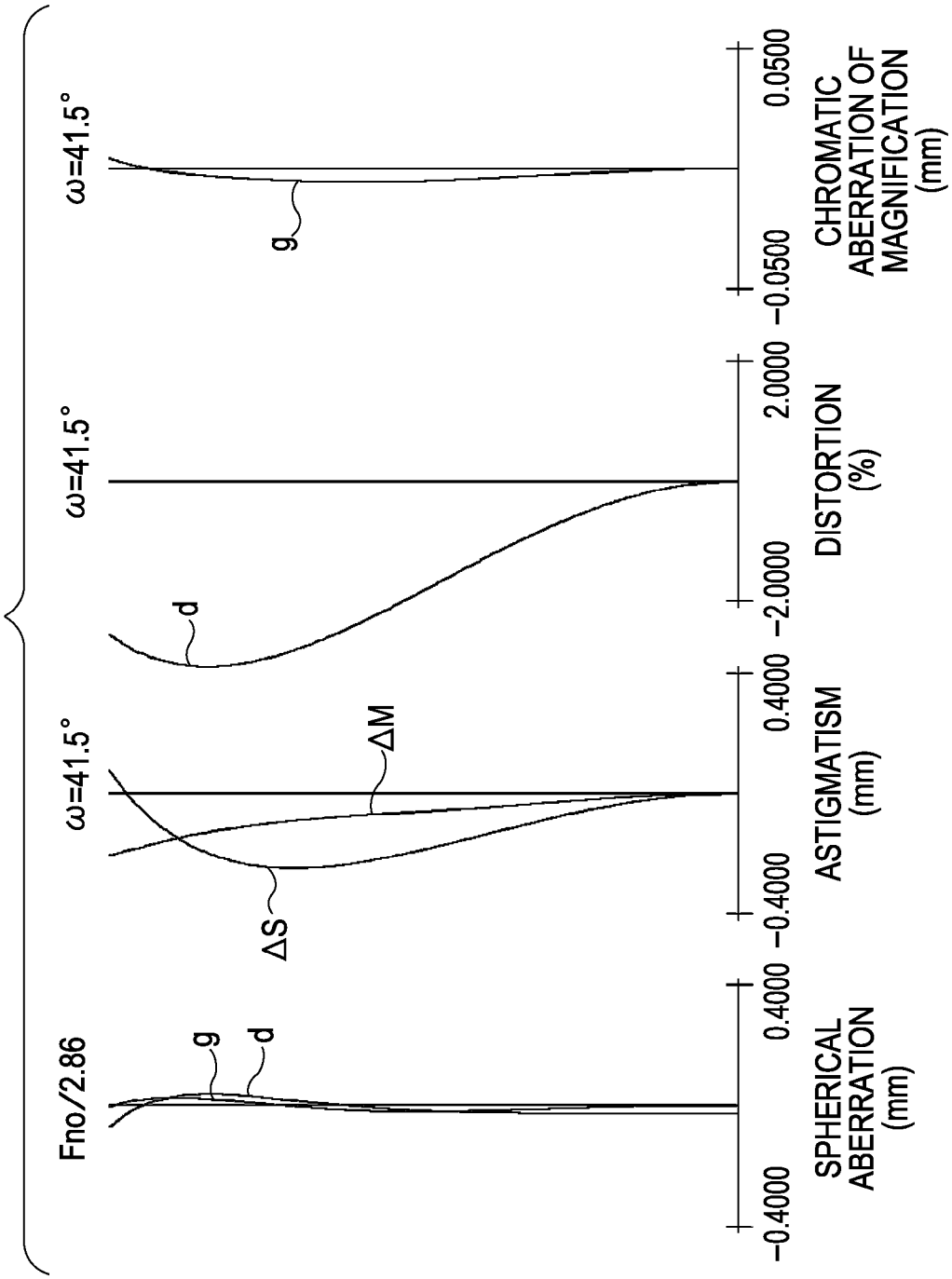
FIG. 31 is an aberration diagram according to the fifteenth numerical embodiment.

According to a fifteenth exemplary embodiment, as shown in FIG. 30, an optical system is a wide-angle lens having a focal length of 24 mm. The optical system includes a first lens group L1 having a negative refractive power, a second lens group L2 having a negative refractive power, and a third lens group L3 having a positive refractive power. When focusing is carried out, the second lens group L2 and the third lens group L3 are moved along the light axis.

According to the present embodiment, the optical system includes a first optical element GNL1 composed of a mixture of the UV-curable resin 2 and 20% by volume $TiO_2$ fine particles dispersed therein and a second optical element GL1 composed of a mixture of the UV-curable resin 2 and 20% by volume ITO fine particles dispersed therein on the reduction side relative to the point P. As shown in FIG. 30, the first optical element GNL1 is a lens (layer) composed of the mixture including $TiO_2$ fine particles. The second optical element GL1 is a lens (layer) composed of a mixture including ITO fine particles.

According to the fifteenth embodiment, the first optical element GNL1 composed of the mixture including $TiO_2$ fine particles and having a positive refractive power and the second optical element GL1 composed of a mixture including ITO fine particles and having a negative power are disposed on the image side relative to the aperture stop SP, where, when the paraxial marginal ray passes through the first optical element GNL1 and the second optical element GL1, the height of the paraxial marginal ray from the light axis is relatively large.

In addition, the first optical element GNL1 is in tight contact with the second optical element GL1. In this way, axial chromatic aberration and chromatic aberration of magnification are sufficiently corrected.

Figure 32:
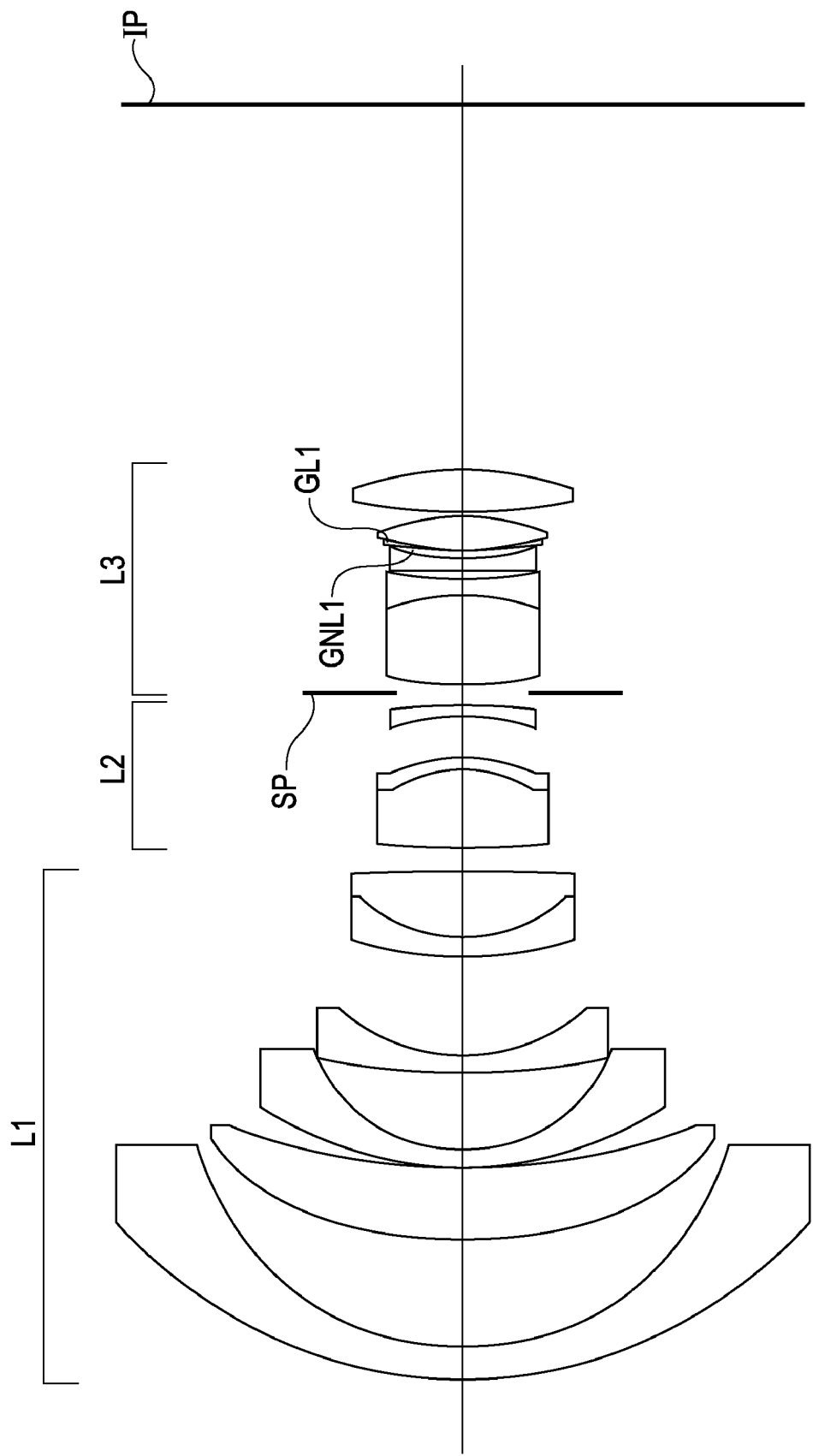
FIG. 32 is a cross-sectional view of an optical system according to a sixteenth numerical embodiment of the present invention.
Figure 33:
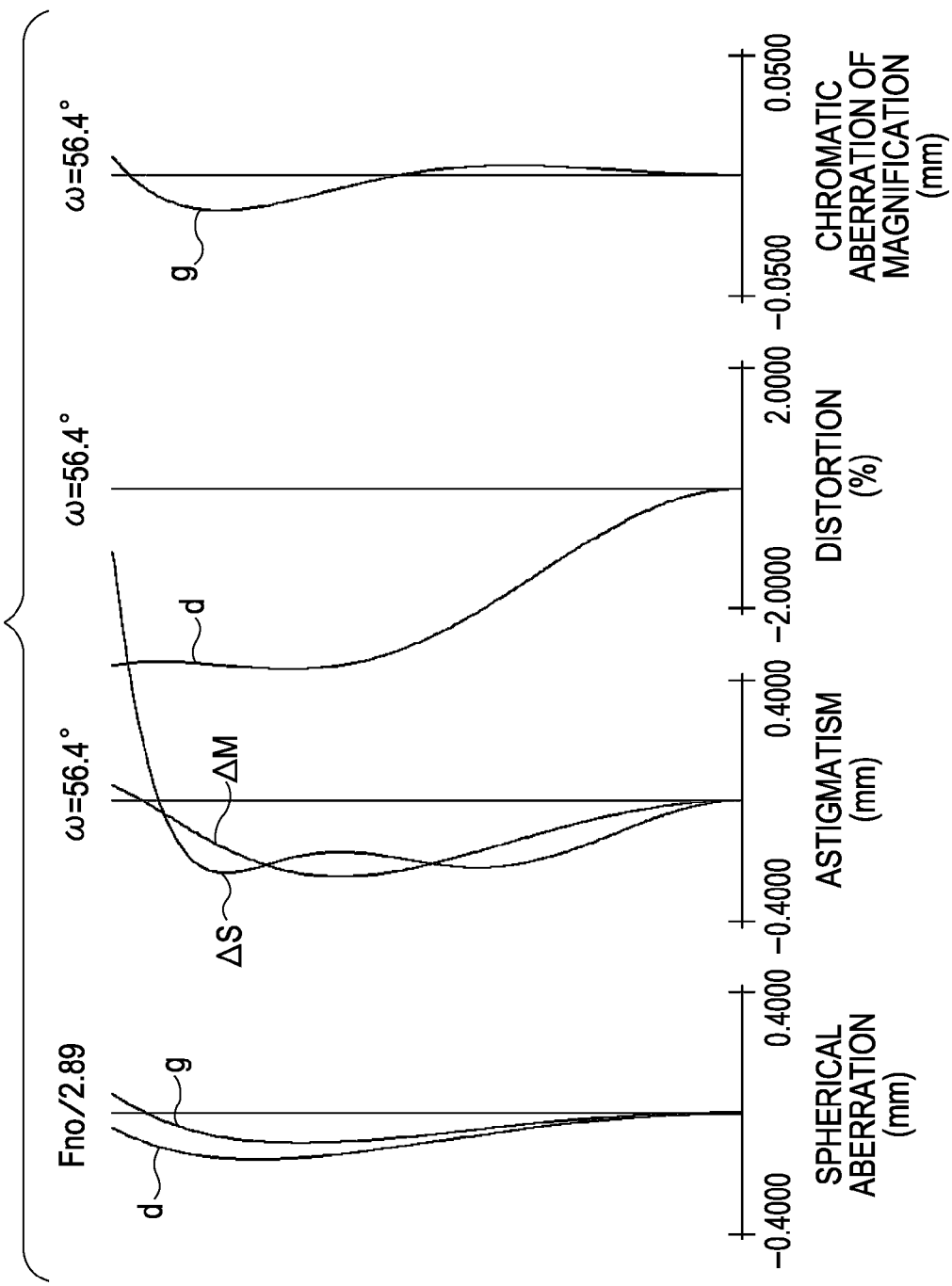
FIG. 33 is an aberration diagram according to the sixteenth numerical embodiment.

According to a sixteenth exemplary embodiment, as shown in FIG. 32, an optical system is a wide-angle lens having a focal length of 14 mm. The optical system includes a first lens group L1 having a negative refractive power, a second lens group L2 having a positive refractive power, and a third lens group L3 having a positive refractive power. When focusing is carried out, the second lens group L2 and the third lens group L3 are moved along the light axis.

According to the present embodiment, the optical system includes a first optical element GNL1 composed of the UV-curable resin 1 and a second optical element GL1 composed of a mixture of the UV-curable resin 2 and 5% by volume ITO fine particles dispersed therein on the reduction side relative to the point P. As shown in FIG. 32, the first optical element GNL1 is a lens (layer) composed of the UV-curable resin 1. The second optical element GL1 is a lens (layer) composed of a mixture including ITO fine particles.

According to the sixteenth embodiment, the first optical element GNL1 composed of the UV-curable resin 1 and having a positive refractive power and the second optical element GL1 composed of a mixture including ITO fine particles and having a negative power are disposed on the image side relative to the aperture stop SP, where, when the paraxial marginal ray passes through the first optical element GNL1 and the second optical element GL1, the height of the paraxial marginal ray from the light axis is relatively large.

In addition, the first optical element GNL1 is in tight contact with the second optical element GL1. The first optical element GNL1 and the second optical element GL1 are cemented between the lenses. In this way, axial chromatic aberration and chromatic aberration of magnification are sufficiently corrected.

Figure 34:
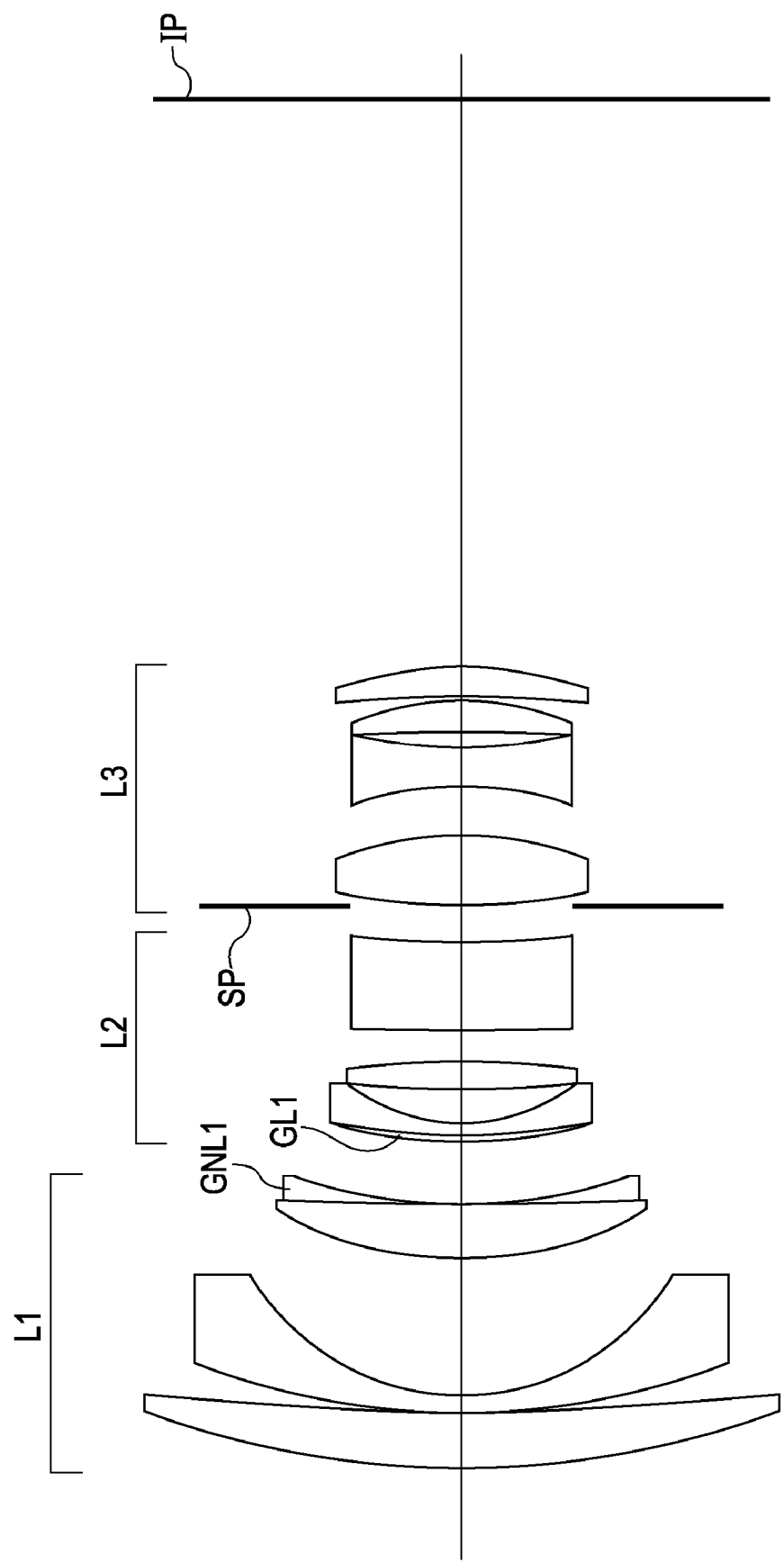
FIG. 34 is a cross-sectional view of an optical system according to a seventeenth numerical embodiment of the present invention.
Figure 35:
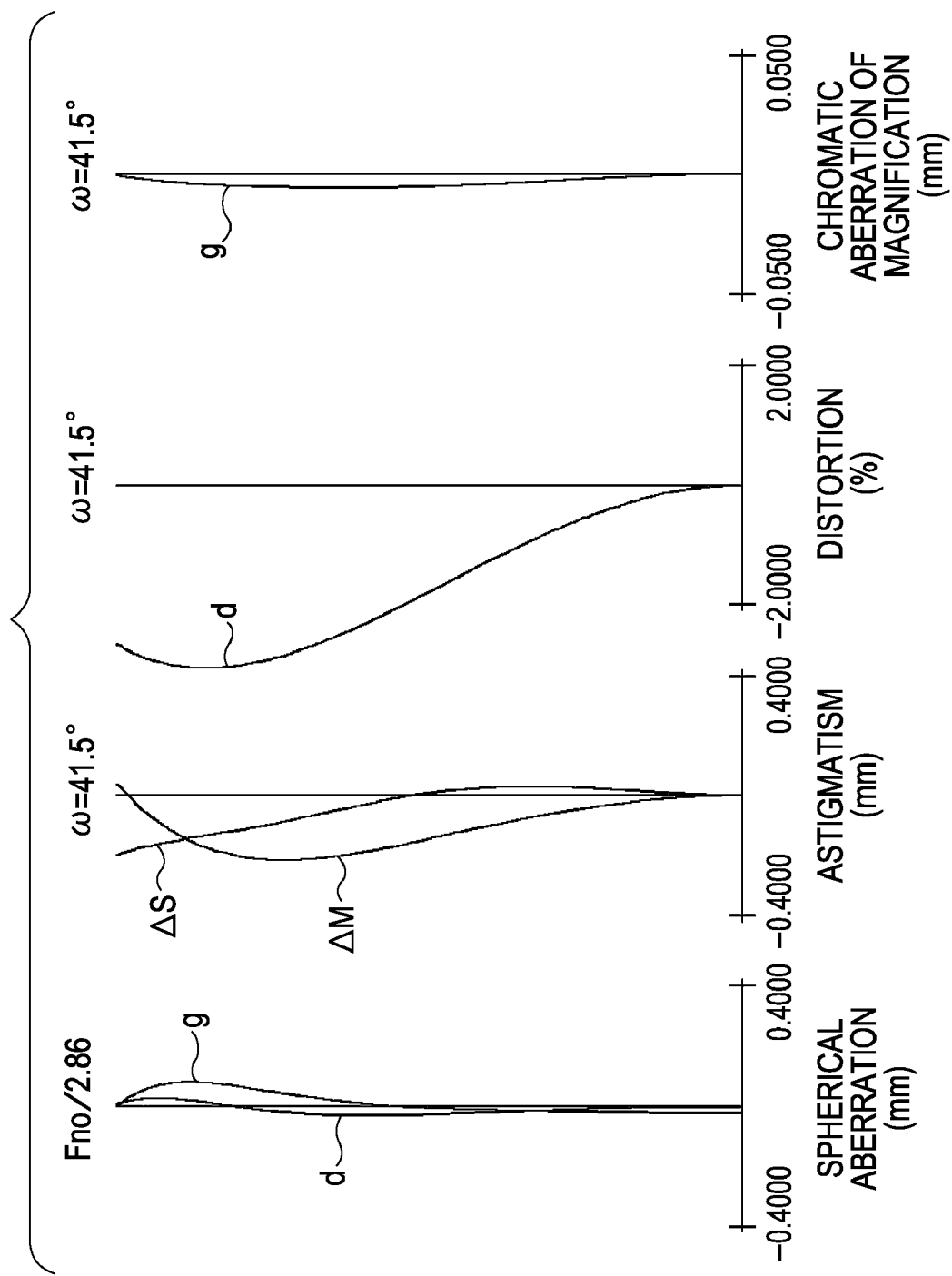
FIG. 35 is an aberration diagram according to the seventeenth numerical embodiment.

According to a seventeenth exemplary embodiment, as shown in FIG. 34, an optical system is a wide-angle lens having a focal length of 24 mm. The optical system includes a first lens group L1 having a negative refractive power, a second lens group L2 having a negative refractive power, and a third lens group L3 having a positive refractive power. When focusing is carried out, the second lens group L2 and the third lens group L3 are moved along the light axis.

According to the present embodiment, the optical system includes a first optical element GNL1 composed of the UV-curable resin 2 and 3% by volume $TiO_2$ fine particles dispersed therein and a second optical element GL1 composed of a mixture of N-polyvinyl carbazole and 10% by volume ITO fine particles dispersed therein disposed on the enlargement side relative to the point P. As shown in FIG. 34, the first optical element GNL1 is a lens (layer) composed of a mixture including $TiO_2$ fine particles. The second optical element GL1 is a lens (layer) composed of a mixture including ITO fine particles.

According to the seventeenth embodiment, the aspherical first optical element GNL1 composed of a mixture including $TiO_2$ fine particles and having a negative refractive power and the aspherical second optical element GL1 composed of a mixture including ITO fine particles and having a positive power are disposed on the enlargement side relative to the aperture stop SP. In this way, chromatic aberration of magnification is sufficiently corrected.

Figure 36:
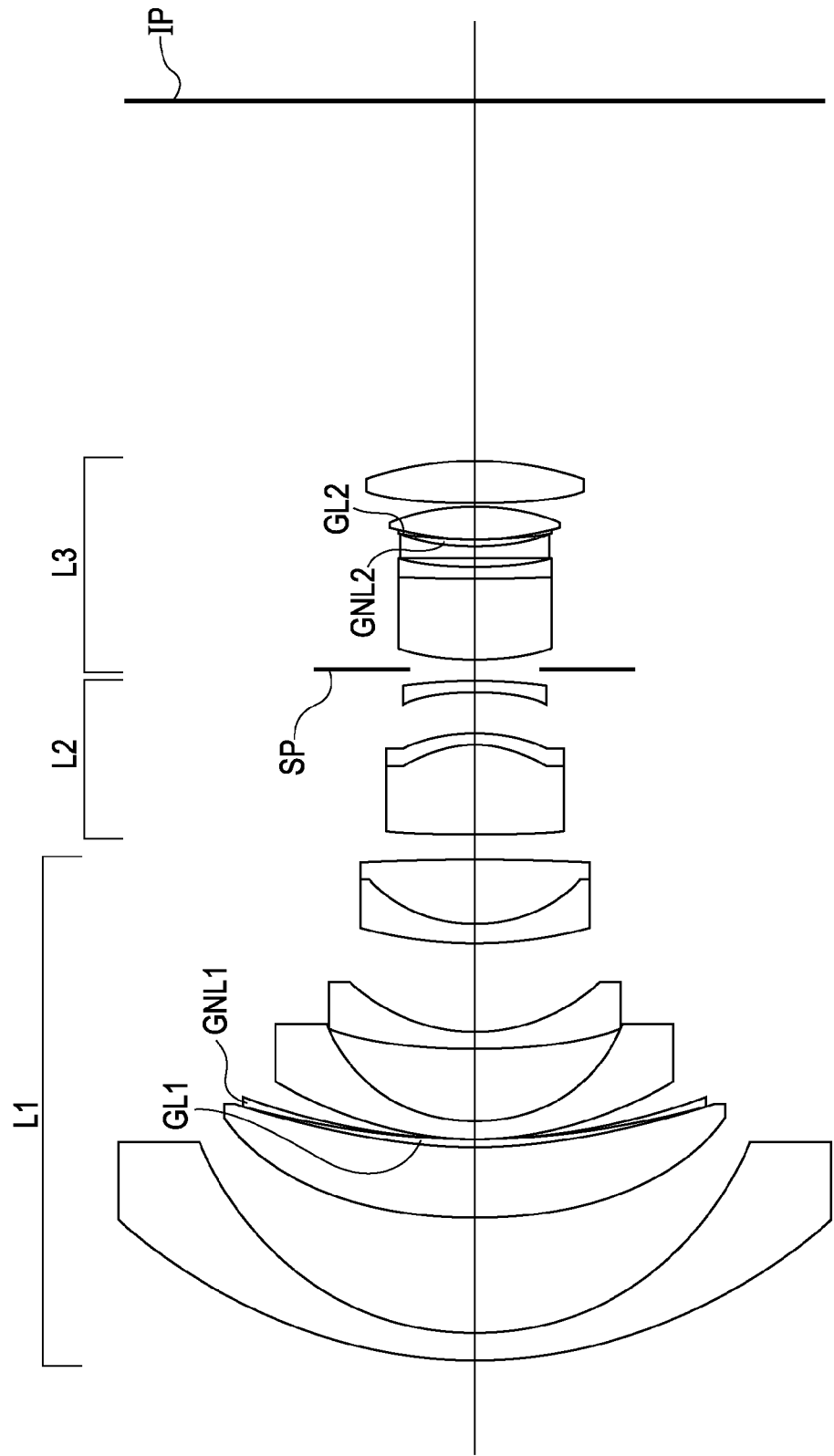
FIG. 36 is a cross-sectional view of an optical system according to an eighteenth numerical embodiment of the present invention.
Figure 37:
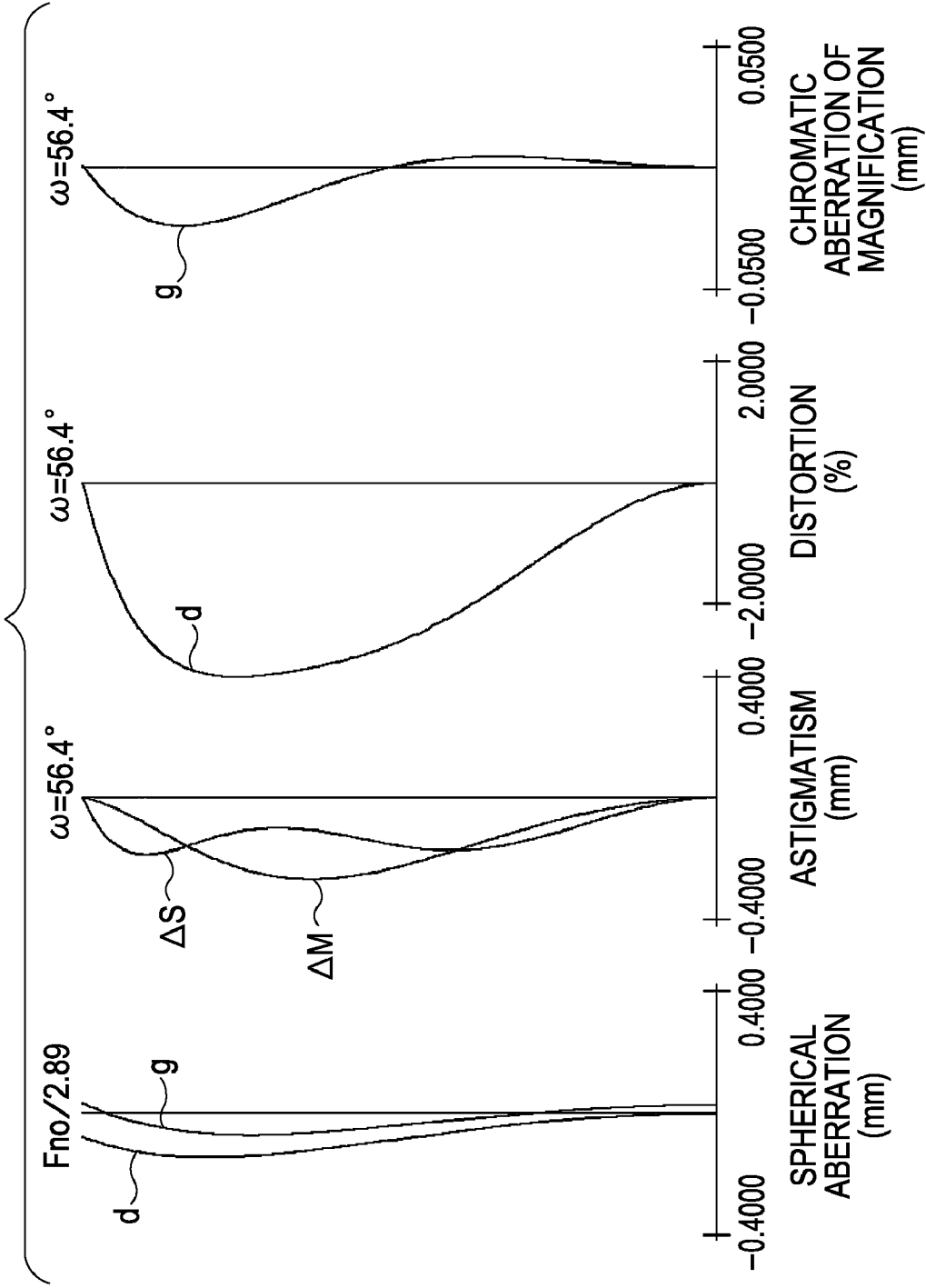
FIG. 37 is an aberration diagram according to the eighteenth numerical embodiment.

According to an eighteenth exemplary embodiment, as shown in FIG. 36, an optical system is a wide-angle lens having a focal length of 14 mm. The optical system includes a first lens group L1 having a negative refractive power, a second lens group L2 having a positive refractive power, and a third lens group L3 having a positive refractive power. When focusing is carried out, the second lens group L2 and the third lens group L3 are moved along the light axis.

According to the present embodiment, the optical system includes a second optical element GL1 composed of a mixture of N-polyvinyl carbazole and 10% by volume ITO fine particles dispersed therein and a first optical element GNL1 composed of N-polyvinyl carbazole disposed on the enlargement side relative to the point P.

In addition, the optical system includes a second first-optical element GNL2 composed of the UV-curable resin 1 and a second second-optical element GL2 composed of a mixture of the UV-curable resin 2 and 5% by volume ITO fine particles dispersed therein disposed on the reduction side relative to the point P. As shown in FIG. 36, the first optical element GNL1 is a lens (layer) composed of N-polyvinyl carbazole. The second first-optical element GNL2 is a lens (layer) composed of the UV-curable resin 1. The second optical element GL1 and the second second-optical element GL2 are layers composed of a mixture including ITO fine particles.

According to the eighteenth embodiment, the first optical element GNL1 composed of N-polyvinyl carbazole and having a negative refractive power and the second optical element GL1 composed of a mixture including ITO fine particles and having a positive power are disposed on the enlargement side relative to the aperture stop SP.

In addition, the optical system includes the second-first optical element GNL2 composed of the UV-curable resin 1 and having a positive refractive power and the second second-optical element composed of a mixture including ITO fine particles and having a negative refractive power on the reduction side relative to the aperture stop SP, where a point at which paraxial marginal ray passes the optical elements is relatively high from the light axis. The first optical element GNL2 is in tight contact with the second optical element GL2. The second-first optical element GNL2 and the second-second optical element GL2 are cemented between the lenses. In this way, axial chromatic aberration and chromatic aberration of magnification are sufficiently corrected.

Particular values used in fourteenth to eighteenth numerical embodiments, which correspond to the fourteenth to eighteenth exemplary embodiments, are described below. In the following numerical embodiments, i denotes the order of a surface numbered from the object. Ri denotes the radius of curvature of the ith optical surface (the ith surface), and Di denotes a distance between the ith surface and the (i+1)th surface along the light axis.

Ni and vi denote the index of refraction and the Abbe number of a material of the ith optical element (excluding a lens (layer) composed of a resin, a material including $TiO_2$ fine particles dispersed therein, or a material including ITO fine particles dispersed therein) for the d-line, respectively. NGNLj and vGNLj denote the index of refraction and the Abbe number of a material of a lens GNLj composed of a resin, a material including $TiO_2$ fine particles dispersed therein, or a material including ITO fine particles dispersed therein for the d-line, respectively. Here, j=1, 2, . . . "f" denotes the focal length of an optical system. "Fno" denotes the F number. "ω" denotes the half angle of field.

The shape of an aspherical surface is expressed by the following equation:

$$x(h) = \frac{(1/r)h^2}{1 + \sqrt{\{1 - (1+k)(h/r^2)\}}} + Bh^4 + Ch^6 + Dh^8 + Eh^{10} + \ldots$$

where
X is an amount of displacement from the surface vertex in the light axis direction,
h is a height from the light axis in a direction perpendicular to the light axis,
r is the paraxial radius of curvature,
k is the conic constant, and
B, C, D, E, . . . are aspherical coefficients at respective orders.

In Table 9 and in each aspherical coefficient, "E±XX" means "$\times 10^{\pm XX}$".

Table 7 shows the indices of refraction, the Abbe numbers, the relative partial dispersions, and the refractive powers of the refractive optical system portions GNL1 and GL1 for the d-line, g-line, C-line, and F-line, and values for conditional expression (17) in each numerical embodiment. Table 8 shows the indices of refraction, the Abbe numbers, and the relative partial dispersions of the UV-curable resin 2, ITO, and $TiO_2$ for the d-line, g-line, C-line, and F-line. Table 9 shows the values of the refractive optical elements GNLj and GLj for conditional expression (25) in each numerical embodiment.

(Fourteenth Numerical Embodiment)
f = 24.48 Fno = 2.86 2ω = 82.9°

| R1 = 82.826 | | D1 = 3.49 | N1 = 1.6200 | v1 = 60.3 |
|---|---|---|---|---|
| R2 = 356.140 | | D2 = 0.15 | | |
| R3 = 52.319 | | D3 = 1.00 | N2 = 1.8823 | v2 = 38.8 |
| R4 = 19.042 | | D4 = 6.35 | | |
| R5 = 23.018 | | D5 = 2.93 | N3 = 1.8549 | v3 = 24.6 |
| R6 = 39.827 | | D6 = 3.93 | | |
| R7 = 23.589 | | D7 = 0.90 | N4 = 1.8850 | v4 = 41.0 |
| R8 = 11.029 | | D8 = 4.03 | | |
| R9 = 67.716 | | D9 = 3.48 | N5 = 1.8653 | v5 = 28.6 |
| R10 = −104.585 | | D10 = 1.90 | | |
| R11 = −89.294 | | D11 = 6.00 | N6 = 1.5386 | v6 = 48.1 |
| R12 = 100.213 | | D12 = 1.63 | | |
| R13 = ∞ | (Aperture Stop) | D13 = 0.18 | | |
| R14 = 41.507 | | D14 = 5.21 | N7 = 1.8125 | v7 = 46.6 |
| R15 = −21.714 | | D15 = 3.25 | | |
| R16 = −23.260 | | D16 = 3.00 | N8 = 1.8539 | v8 = 24.2 |
| R17 = 26.429 | | D17 = 0.60 | NGNL1 = 1.6356 | vGNL1 = 22.7 |
| R18 = 76.433 | | D18 = 0.05 | NGL1 = 1.5648 | vGL1 = 20.0 |
| R19 = 48.627 | | D19 = 1.27 | | |
| R20 = −38.277 | | D20 = 1.92 | N9 = 1.6142 | v9 = 60.6 |
| R21 = −18.636 | | D21 = 0.15 | | |
| R22 = 447.518 | | D22 = 2.58 | N10 = 1.7800 | v10 = 50.0 |
| R23 = −29.043 | | | | |

(Fifteenth Numerical Embodiment)
f = 24.48 Fno = 2.86 2ω = 82.9°

| R1 = 72.998 | D1 = 3.78 | N1 = 1.5959 | v1 = 61.6 |
|---|---|---|---|
| R2 = 300.555 | D2 = 0.15 | | |
| R3 = 44.538 | D3 = 1.00 | N2 = 1.8850 | v2 = 41.0 |

-continued (Fifteenth Numerical Embodiment)
f = 24.48 Fno = 2.86 2ω = 82.9°

| | | | |
|---|---|---|---|
| R4 = 16.752 | D4 = 6.89 | | |
| R5 = 18.821 | D5 = 2.85 | N3 = 1.8500 | ν3 = 23.0 |
| R6 = 28.023 | D6 = 4.09 | | |
| R7 = 22.808 | D7 = 0.90 | N4 = 1.8628 | ν4 = 27.5 |
| R8 = 11.104 | D8 = 2.76 | | |
| R9 = 65.695 | D9 = 1.98 | N5 = 1.8551 | ν5 = 24.6 |
| R10 = −74.883 | D10 = 0.25 | | |
| R11 = −102.304 | D11 = 7.35 | N6 = 1.5283 | ν6 = 66.3 |
| R12 = 52.340 | D12 = 3.42 | | |
| R13 = ∞ (Aperture Stop) | D13 = 0.15 | | |
| R14 = 37.044 | D14 = 4.55 | N7 = 1.8313 | ν7 = 38.1 |
| R15 = −20.625 | D15 = 2.34 | | |
| R16 = −21.355 | D16 = 5.02 | N8 = 1.8500 | ν8 = 23.0 |
| R17 = 30.815 | D17 = 0.10 | NGL1 = 1.5963 | νGL1 = 13.9 |
| R18 = 27.846 | D18 = 0.30 | NGNL1 = 1.7088 | νGNL1 = 21.6 |
| R19 = 39.990 | D19 = 1.18 | | |
| R20 = −56.730 | D20 = 2.18 | N9 = 1.4870 | ν9 = 70.4 |
| R21 = −17.915 | D21 = 0.15 | | |
| R22 = 10923.846 | D22 = 2.60 | N10 = 1.7375 | ν10 = 52.0 |
| R23 = −26.864 | | | |

(Sixteenth Numerical Embodiment)
f = 14.36 Fno = 2.89 2ω = 112.8°

| | | | |
|---|---|---|---|
| R1 = 48.138 | D1 = 3.41 | N1 = 1.7800 | ν1 = 50.0 |
| R2 = 29.278 | D2 = 11.39 | | |
| R3 = 61.436 (Aspherical | D3 = 7.51 | N2 = 1.6762 | ν2 = 55.7 |
| R4 = 69.309 Surface) | D4 = 0.15 | | |
| R5 = 38.853 | D5 = 1.80 | N3 = 1.7800 | ν3 = 50.0 |
| R6 = 16.626 | D6 = 8.21 | | |
| R7 = 85.187 | D7 = 1.80 | N4 = 1.7968 | ν4 = 48.1 |
| R8 = 19.176 | D8 = 10.53 | | |
| R9 = 39.587 | D9 = 2.00 | N5 = 1.8027 | ν5 = 47.5 |
| R10 = 16.153 | D10 = 7.00 | N6 = 1.7140 | ν6 = 27.8 |
| R11 = −212.616 | D11 = 2.56 | | |
| R12 = 92.281 | D12 = 8.41 | N7 = 1.4870 | ν7 = 70.4 |
| R13 = −13.937 | D13 = 1.20 | N8 = 1.8500 | ν8 = 23.0 |
| R14 = −18.436 | D14 = 4.50 | | |
| R15 = −22.393 | D15 = 1.20 | N9 = 1.8850 | ν9 = 41.0 |
| R16 = −48.515 | D16 = 1.00 | | |
| R17 = ∞ (Aperture Stop) | D17 = 1.00 | | |
| R18 = 32.978 | D18 = 9.68 | N10 = 1.8024 | ν10 = 24.3 |
| R19 = −20.944 | D19 = 1.50 | N11 = 1.8664 | ν11 = 29.1 |
| R20 = 38.450 | D20 = 0.92 | | |
| R21 = −280.973 | D21 = 1.20 | N12 = 1.9230 | ν12 = 20.8 |
| R22 = 22.614 | D22 = 0.77 | NGNL1 = 1.6356 | νGNL1 = 22.7 |
| R23 = 48.384 | D23 = 0.05 | NGL1 = 1.5425 | νGL1 = 29.0 |
| R24 = 29.175 | D24 = 3.89 | N13 = 1.4870 | ν13 = 70.4 |
| R25 = −22.037 | D25 = 0.20 | | |
| R26 = 56.727 | D26 = 4.65 | N14 = 1.6236 | ν14 = 60.0 |
| R27 = −33.222 | | | |

Aspherical Coefficient

| | κ | B | C | D | E |
|---|---|---|---|---|---|
| 3rd Surface | 0.0000E+00 | 7.5524E−06 | 1.0025E−09 | −4.2264E−12 | 8.3574E−15 |

(Seventeenth Numerical Embodiment)
f = 24.48 Fno = 2.89 2ω = 82.9°

| | | | |
|---|---|---|---|
| R1 = 59.261 | D1 = 3.73 | N1 = 1.6162 | ν1 = 60.5 |
| R2 = 168.165 | D2 = 0.15 | | |
| R3 = 50.439 | D3 = 1.00 | N2 = 1.8850 | ν2 = 41.0 |
| R4 = 16.196 | D4 = 9.20 | | |
| R5 = 24.961 | D5 = 3.68 | N3 = 1.8702 | ν3 = 31.0 |
| R6 = 91.548 (Aspherical | D6 = 0.05 | NGNL1 = 1.5532 | νGNL1 = 39.8 |
| R7 = 36.183 Surface) | D7 = 4.18 | | |

-continued (Seventeenth Numerical Embodiment)
f = 24.48 Fno = 2.89 2ω = 82.9°

| | | | | |
|---|---|---|---|---|
| R8 = 27.255 | (Aspherical | D8 = 0.36 | NGL1 = 1.7127 | νGL1 = 13.8 |
| R9 = 40.419 | Surface) | D9 = 0.90 | N4 = 1.8771 | ν4 = 35.0 |
| R10 = 12.231 | | D10 = 2.24 | | |
| R11 = 108.606 | | D11 = 1.82 | N5 = 1.8730 | ν5 = 32.9 |
| R12 = −61.248 | | D12 = 2.15 | | |
| R13 = 274.153 | | D13 = 5.81 | N6 = 1.8623 | ν6 = 27.3 |
| R14 = 53.671 | | D14 = 2.41 | | |
| R15 = ∞ | (Aperture Stop) | D15 = 0.15 | | |
| R16 = 40.484 | | D16 = 4.75 | N7 = 1.8820 | ν7 = 41.2 |
| R17 = −21.289 | | D17 = 3.19 | | |
| R18 = −25.560 | | D18 = 2.60 | N8 = 1.8089 | ν8 = 26.1 |
| R19 = 33.165 | | D19 = 1.13 | | |
| R20 = −105.335 | | D20 = 2.15 | N9 = 1.4870 | ν9 = 70.4 |
| R21 = −18.023 | | D21 = 0.15 | | |
| R22 = −80.439 | | D22 = 2.20 | N10 = 1.6180 | ν10 = 60.4 |
| R23 = −22.171 | | | | |

(Eighteenth Numerical Embodiment)
f = 14.35 Fno = 2.89 2ω = 112.8°

| | | | | |
|---|---|---|---|---|
| R1 = 54.598 | | D1 = 3.00 | N1 = 1.7800 | ν1 = 50.0 |
| R2 = 31.238 | | D2 = 12.29 | | |
| R3 = 63.674 | (Aspherical | D3 = 7.47 | N2 = 1.6406 | ν2 = 58.4 |
| R4 = 68.032 | Surface) | D4 = 0.80 | NGL1 = 1.7127 | νGL1 = 13.8 |
| R5 = 79.476 | | D5 = 0.05 | NGNL1 = 1.6959 | νGNL1 = 17.7 |
| R6 = 68.330 | | D6 = 0.15 | | |
| R7 = 39.761 | | D7 = 1.80 | N3 = 1.7800 | ν3 = 50.0 |
| R8 = 16.943 | | D8 = 7.75 | | |
| R9 = 70.105 | | D9 = 1.80 | N4 = 1.7800 | ν4 = 50.0 |
| R10 = 18.934 | | D10 = 9.57 | | |
| R11 = 43.123 | | D11 = 2.00 | N5 = 1.8294 | ν5 = 45.0 |
| R12 = 15.497 | | D12 = 7.00 | N6 = 1.7549 | ν6 = 26.0 |
| R13 = −225.11 | | D13 = 2.65 | | |
| R14 = 105.224 | | D14 = 9.81 | N7 = 1.4892 | ν7 = 70.2 |
| R15 = −13.547 | | D15 = 1.20 | N8 = 1.8500 | ν8 = 23.0 |
| R16 = −17.952 | | D16 = 4.55 | | |
| R17 = −21.783 | (Aperture Stop) | D17 = 1.20 | N9 = 1.8850 | ν9 = 41.0 |
| R18 = −44.163 | | D18 = 1.00 | | |
| R19 = 0.000 | | D19 = 1.00 | | |
| R20 = 25.752 | | D20 = 8.64 | N10 = 1.6062 | ν10 = 40.5 |
| R21 = 423.392 | | D21 = 1.26 | N11 = 1.9230 | ν11 = 20.8 |
| R22 = 34.571 | | D22 = 0.98 | | |
| R23 = −354.070 | | D23 = 1.20 | N12 = 1.8821 | ν12 = 38.6 |
| R24 = 20.618 | | D24 = 0.64 | NGNL2 = 1.6356 | νGNL2 = 22.7 |
| R25 = 33.760 | | D25 = 0.05 | NGL2 = 1.5425 | νGL2 = 29.0 |
| R26 = 27.565 | | D26 = 3.81 | N13 = 1.4870 | ν13 = 70.4 |
| R27 = −23.397 | | D27 = 0.20 | | |
| R28 = 53.7789 | | D28 = 4.67 | N14 = 1.6532 | ν14 = 57.4 |
| R29 = −33.909 | | | | |

| Aspherical Coefficient | | | | |
|---|---|---|---|---|
| | k | B | C | D | E |
| 3rd Surface | 0.0000E+00 | 7.9984E−06 | 1.1075E−09 | −4.1259E−12 | 8.5543E−15 |

TABLE 7

| | | Fourteenth Embodiment | | Fifteenth Embodiment | | Sixteenth Embodiment | |
|---|---|---|---|---|---|---|---|
| Conditional Expression | | First Optical Element GNL1 UV-curable resin 1 | Second Optical Element GL1 14.2% ITO - UV-curable resin 2 | First Optical Element GNL1 20% TiO2 - UV-curable resin 2 | Second Optical Element GL1 20% ITO - UV-curable resin 2 | First Optical Element GNL1 UV-curable resin 1 | Second Optical Element GL1 5% ITO - UV-curable resin 2 |
| | Nd | 1.6356 | 1.5648 | 1.7088 | 1.5963 | 1.6356 | 1.5425 |
| | Ng | 1.6753 | 1.5941 | 1.7599 | 1.6383 | 1.6753 | 1.5630 |
| | NC | 1.6281 | 1.5544 | 1.7003 | 1.5804 | 1.6281 | 1.5362 |

TABLE 7-continued

|  |  |  |  |  |  |  |  |
|---|---|---|---|---|---|---|---|
|  | NF | 1.6560 | 1.5826 | 1.7331 | 1.6234 | 1.6560 | 1.5549 |
| 22, 23 | vd | 22.73 | 20.03 | 21.63 | 13.86 | 22.73 | 29.05 |
|  | θgd | 1.4220 | 1.0517 | 1.5594 | 0.9761 | 1.4220 | 1.0963 |
|  | θgF | 0.6895 | 0.4197 | 0.8170 | 0.3459 | 0.6895 | 0.4346 |
| 20, 21 | Δθgd | 0.0826 | −0.2996 | 0.2152 | −0.4049 | 0.0826 | −0.2178 |
| 18, 19 | ΔθgF | 0.0652 | −0.2147 | 0.1888 | −0.3130 | 0.0652 | −0.1688 |
| 24 | φ | 0.0158 | −0.0042 | 0.0078 | −0.0020 | 0.0151 | −0.0074 |
| 17 | Lt/ft |  | 3.758 |  | 3.758 |  | 9.400 |

| Conditional Expression |  | Seventeenth Embodiment | | Eighteenth Embodiment | | | |
|---|---|---|---|---|---|---|---|
|  |  | First Optical Element GNL1 3% TiO2 - UV-curable resin 2 | Second Optical Element GL1 10% ITO - N-polyvinyl carbazole | Second Optical Element GL1 10% ITO - N-polyvinyl carbazole | First Optical Element GNL1 N-polyvinyl carbazole | First Optical Element GNL2 UV-curable resin 1 | Second Optical Element GL2 5% ITO - UV-curable resin 2 |
|  | Nd | 1.5532 | 1.7127 | 1.7127 | 1.6959 | 1.6356 | 1.5425 |
|  | Ng | 1.5725 | 1.7772 | 1.7772 | 1.7516 | 1.6753 | 1.5630 |
|  | NC | 1.5494 | 1.6969 | 1.6969 | 1.6853 | 1.6281 | 1.5362 |
|  | NF | 1.5633 | 1.7483 | 1.7483 | 1.7246 | 1.6560 | 1.5549 |
| 22, 23 | vd | 39.81 | 13.85 | 13.85 | 17.68 | 22.73 | 29.05 |
|  | θgd | 1.3852 | 1.2527 | 1.2527 | 1.4155 | 1.4220 | 1.0963 |
|  | θgF | 0.6645 | 0.5604 | 0.5604 | 0.6856 | 0.6869 | 0.4346 |
| 20, 21 | Δθgd | 0.1063 | −0.1283 | −0.1283 | 0.0533 | 0.0826 | −0.2178 |
| 18, 19 | ΔθgF | 0.0898 | −0.0986 | −0.0986 | 0.0424 | 0.0652 | −0.1688 |
| 24 | φ | −0.0092 | 0.0086 | 0.0016 | −0.0014 | 0.0122 | −0.0036 |
| 17 | Lt/ft |  | 3.757 |  |  | 9.406 |  |

TABLE 8

|  | UV Curable Resin 2 | ITO | TiO2 |
|---|---|---|---|
| Nd | 1.5241 | 1.8571 | 2.3038 |
| Ng | 1.5371 | 1.9924 | 2.4568 |
| NC | 1.5212 | 1.7979 | 2.2803 |
| NF | 1.5313 | 1.9487 | 2.3745 |
| vd | 51.55 | 5.69 | 13.84 |
| θgd | 1.2695 | 0.8976 | 1.6241 |
| θgF | 0.5631 | 0.2901 | 0.8731 |

TABLE 9

| Conditional Expression |  | Fourteenth Embodiment | Fifteenth Embodiment | Sixteenth Embodiment | Eighteenth Embodiment |
|---|---|---|---|---|---|
|  | ΔθgF1a × φ1a/vd1a | 4.537E−05 | 6.817E−05 | 4.346E−05 | 3.510E−05 |
|  | ΔθgF2a × φ2/vd2a | 4.527E−05 | 4.599E−05 | 4.286E−05 | 2.092E−05 |
| 25 | (ΔθgF1a × φ1a/vd1a)/(ΔθgF2a × φ2a/vd2a) | 1.002E+00 | 1.482E+00 | 1.014E+00 | 1.678E+00 |

A digital still camera that includes one of the optical systems according to the above-described exemplary embodiments as an imaging optical system is described next with reference to FIG. 40.

Figure 40:
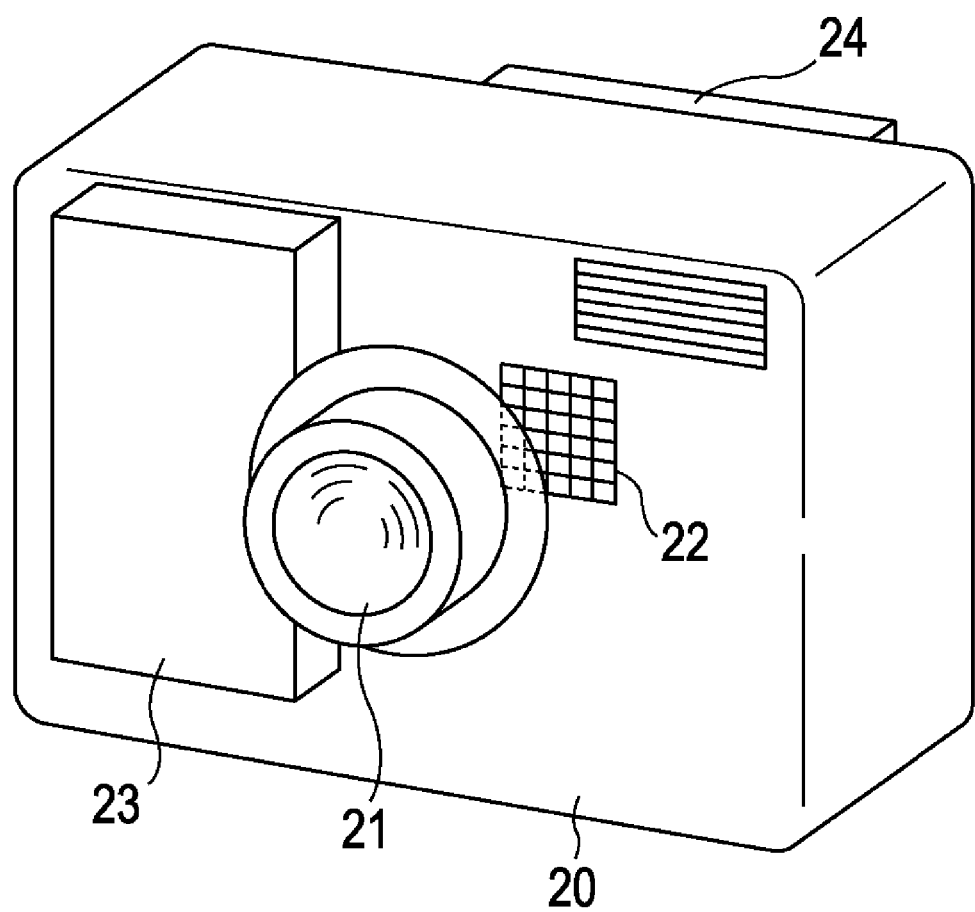
FIG. 40 is a schematic illustration of an image pickup apparatus according to an exemplary embodiment of the present invention.

As shown in FIG. 40, the digital still camera includes a camera body 20, an imaging optical system 21 according to one of the first to eighteenth exemplary embodiments, and a solid-state image pickup element (a photoelectric conversion element) 22, such as a CCD sensor or a CMOS sensor. The solid-state image pickup element 22 is incorporated in the camera body 20. The solid-state image pickup element 22 receives light of an object image formed by the imaging optical system 21.

The digital still camera further includes a memory 23 and a finder 24. The memory 23 stores information about the object image photo-electrically converted by the solid-state image pickup element 22. The finder 24 includes, for example, a liquid crystal display panel. The finder 24 is used for viewing the object image formed on the solid-state image pickup element 22.

In this way, by applying one of the optical systems according to the present invention to a digital still camera, a compact optical apparatus having high optical performance can be achieved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-326868 filed Dec. 4, 2006, No. 2007-035936 filed Feb. 16, 2007, and No. 2007-137748 filed May 24, 2007, which are hereby incorporated by reference herein in their entirety.

What is claimed is:

1. An optical system comprising:
    a first optical element and a second optical element on at least one of an enlargement side and a reduction side relative to a point P at which a light axis and a paraxial chief ray intersect, each of the first optical element and the second optical element comprising a solid material having a refractive light incident surface and a refractive light emergent surface, wherein the following conditional expressions are satisfied:

$$\Delta\theta gF1 > 0.0272,$$

$$\Delta\theta gF2 < -0.0278, \text{ and}$$

$$f1 \times f2 < 0,$$

where $\Delta\theta gF1$ and $\Delta\theta gF2$ denote anomalous partial dispersion values of the first optical element and the second optical element for the Fraunhofer g-line and F-line, respectively, and f1 and f2 denote focal lengths of the first optical element and the second optical element, respectively, when the light incident surfaces and the light emergent surfaces of the first optical element and the second optical element are in contact with air, and wherein the first optical element and the second optical element are disposed in the same lens group.

2. The optical system according to claim 1, wherein the following conditional expressions are satisfied:

$$\Delta\theta gd1 > 0.038, \text{ and}$$

$$\Delta\theta gd2 < -0.037,$$

where $\Delta\theta gd1$ and $\Delta\theta gd2$ denote anomalous partial dispersion values of the first optical element and the second optical element for the Fraunhofer g-line and d-line, respectively.

3. The optical system according to claim 1, wherein the following conditional expressions are satisfied:

$$vd1 < 60, \text{ and}$$

$$vd2 < 60,$$

where vd1 and vd2 denote Abbe numbers of the solid materials of the first optical element and the second optical element, respectively.

4. The optical system according to claim 1, wherein at least one of the surfaces of the first optical element and the second optical element is aspherical.

5. The optical system according to claim 1, wherein at least one of the surfaces of the first optical element and the second optical element is in contact with air.

6. The optical system according to claim 1, further comprising, in order from an object side to an image side:
a first lens group having a positive refractive power;
a second lens group having a negative refractive power;
an aperture stop;
a third lens group having a positive refractive power; and
a fourth lens group having a positive refractive power,
wherein the optical system serves as a zoom lens, and distances between the first through fourth lens groups are changed when zooming is performed, and wherein the first optical element and the second optical element are included in the first lens group.

7. The optical system according to claim 1, further comprising, in order from an object side to an image side:
a first lens group having a positive refractive power;
an aperture stop;
a second lens group having a negative refractive power; and
a third lens group having a positive refractive power,
wherein the first lens group is stationary, the second lens group is movable along the light axis, and the third lens group is stationary when focusing is performed, and
wherein the first optical element and the second optical element are included in the first lens group.

8. The optical system according to claim 1, further comprising, in order from an object side to an image side:
a first lens group having a negative refractive power;
a second lens group having a negative refractive power;
an aperture stop; and
a third lens group having a positive refractive power,
wherein the first lens group is stationary, the second lens group is movable along the light axis, and the third lens group is stationary when focusing is performed, and
wherein the first optical element and the second optical element are included in the third lens group.

9. An optical apparatus comprising:
the optical system according to claim 1.

10. The optical system according to claim 1, wherein the maximum height of a paraxial marginal ray from the light axis when the paraxial marginal ray passes through a lens surface on the enlargement side relative to the point P is greater than that on the reduction side relative to the point P, and wherein the following conditional expression is satisfied:

$$\phi1 \times \phi2 < 0,$$

where $\phi1$ and $\phi2$ denote the refractive powers of the first optical element and the second optical element, respectively, when the light incident and emergent surfaces of the first optical element and the second optical element are in contact with air.

11. The optical system according to claim 10, wherein the following conditional expression is satisfied:

$$Lt/ft < 1.0,$$

where ft denotes a focal length of the entire optical system, and Lt denotes a total lens length of the optical system.

12. The optical system according to claim 10, wherein the first optical element and the second optical element are disposed on the enlargement side relative to the point P.

13. The optical system according to claim 10, wherein the following conditional expressions are satisfied:

$$\phi1 > 0, \text{ and}$$

$$\phi2 < 0.$$

14. The optical system according to claim 10, wherein the following conditional expression is satisfied:

$$(\phi1 \times \Delta\theta gF1vd1)/(\phi2 \times \Delta\theta gF2vd2) < 1.5,$$

where vd1 and vd2 denote the Abbe numbers of the solid materials of the first optical element and the second optical element, respectively.

15. The optical system according to claim 10, further comprising, in order from an object side to an image side:
a first lens group having a positive refractive power;
a second lens group having a negative refractive power; and
a third lens group having a positive refractive power,
wherein the first lens group is stationary, the second lens group is movable along the light axis, and the third lens group is stationary when focusing is performed, and
wherein the first optical element and the second optical element are included in the first lens group.

16. The optical system according to claim 1, wherein the maximum height of a paraxial marginal ray from the light axis when the paraxial marginal ray passes through a lens surface on the enlargement side relative to the point P is less than that on the reduction side relative to the point P, and wherein the following conditional expression is satisfied:

$$\phi1 \times \phi2 < 0,$$

where $\phi1$ and $\phi2$ denote refractive powers of the first optical element and the second optical element, respectively, when the light incident and emergent surfaces of the first optical element and the second optical element are in contact with air.

17. The optical system according to claim 16, wherein the following conditional expression is satisfied:

$$2 < Lt/ft < 15,$$

where ft denotes a focal length of the entire optical system, and Lt denotes a total lens length of the optical system.

18. The optical system according to claim 16, wherein the first optical element and the second optical element are disposed on the reduction side relative to the point P.

19. The optical system according to claim 16, wherein the following conditional expressions are satisfied:

$$\phi 1a > 0, \text{ and}$$

$$\phi 2a < 0,$$

where $\phi 1a$ and $\phi 2a$ denote refractive powers of the first optical element and the second optical element disposed on the reduction side relative to the point P, respectively.

20. The optical system according to claim 16, wherein the following conditional expression is satisfied:

$$(\phi 1a \times \Delta\theta gF1a/vd1a)/(\phi 2a \times \Delta\theta gF2a/vd2a) > 0.8,$$

where $\phi 1a$ and $\phi 2a$ denote refractive powers of the first optical element and the second optical element disposed on the reduction side relative to the point P, respectively, vd1a and vd2a denote the Abbe numbers of the materials of the first optical element and the second optical element, respectively, and $\Delta\theta gF1a$ and $\Delta\theta gF2a$ denote anomalous partial dispersion values of the first optical element and the second optical element for the g-line and F-line, respectively.

21. The optical system according to claim 16, wherein the first optical element and the second optical element are disposed on the enlargement side relative to the point P and are disposed on the reduction side relative to the point P.

22. The optical system according to claim 16, wherein the following conditional expressions are satisfied:

$$\phi 1b < 0, \text{ and}$$

$$\phi 2b > 0,$$

where $\phi 1b$ and $\phi 2b$ denote the refractive powers of the first optical element and the second optical element disposed on the enlargement side relative to the point P, respectively.

23. An optical system comprising:
a first optical element and a second optical element on at least one of an enlargement side and a reduction side relative to a point P at which a light axis and a paraxial chief ray intersect, each of the first optical element and the second optical element comprising a solid material having a refractive light incident surface and a refractive light emergent surface,
wherein the following conditional expressions are satisfied:

$$\Delta\theta gF1 > 0.0272,$$

$$\Delta\theta gF2 < -0.0278, \text{ and}$$

$$f1 \times f2 < 0,$$

where $\Delta\theta gF1$ and $\Delta\theta gF2$ denote anomalous partial dispersion values of the first optical element and the second optical element for the Fraunhofer g-line and F-line, respectively, and f1 and f2 denote focal lengths of the first optical element and the second optical element, respectively, when the light incident surfaces and the light emergent surfaces of the first optical element and the second optical element are in contact with air, and
wherein the optical system further comprises, in order from an object side to an image side:
a first lens group having a positive refractive power;
a second lens group having a negative refractive power;
an aperture stop;
a third lens group having a positive refractive power; and
a fourth lens group having a positive refractive power,
wherein the optical system serves as a zoom lens, and distances between the first through fourth lens groups are changed when zooming is performed, and wherein the first optical element and the second optical element are included in the first lens group.

24. An optical system comprising:
a first optical element and a second optical element on at least one of an enlargement side and a reduction side relative to a point P at which a light axis and a paraxial chief ray intersect, each of the first optical element and the second optical element comprising a solid material having a refractive light incident surface and a refractive light emergent surface,
wherein the following conditional expressions are satisfied:

$$\Delta\theta gF1 > 0.0272,$$

$$\Delta\theta gF2 < -0.0278, \text{ and}$$

$$f1 \times f2 < 0,$$

where $\Delta\theta gF1$ and $\Delta\theta gF2$ denote anomalous partial dispersion values of the first optical element and the second optical element for the Fraunhofer g-line and F-line, respectively, and f1 and f2 denote focal lengths of the first optical element and the second optical element, respectively, when the light incident surfaces and the light emergent surfaces of the first optical element and the second optical element are in contact with air, and
wherein the optical system further comprises, in order from an object side to an image side:
a first lens group having a positive refractive power;
an aperture stop;
a second lens group having a negative refractive power; and
a third lens group having a positive refractive power,
wherein the first lens group is stationary, the second lens group is movable along the light axis, and the third lens group is stationary when focusing is performed, and
wherein the first optical element and the second optical element are included in the first lens group.

25. An optical system comprising:
a first optical element and a second optical element on at least one of an enlargement side and a reduction side relative to a point P at which a light axis and a paraxial chief ray intersect, each of the first optical element and the second optical element comprising a solid material having a refractive light incident surface and a refractive light emergent surface,
wherein the following conditional expressions are satisfied:

$$\Delta\theta gF1 > 0.0272,$$

$$\Delta\theta gF2 < -0.0278, \text{ and}$$

$$f1 \times f2 < 0,$$

where $\Delta\theta gF1$ and $\Delta\theta gF2$ denote anomalous partial dispersion values of the first optical element and the second optical element for the Fraunhofer g-line and F-line, respectively, and f1 and f2 denote focal lengths of the first optical element and the second optical element, respectively, when the light incident surfaces and the light emergent surfaces of the first optical element and the second optical element are in contact with air, and wherein the optical system further comprises, in order from an object side to an image side:

a first lens group having a negative refractive power;

a second lens group having a negative refractive power;

an aperture stop; and a third lens group having a positive refractive power, wherein the first lens group is stationary, the second lens group is movable along the light axis, and the third lens group is stationary when focusing is performed, and wherein the first optical element and the second optical element are included in the third lens group.

* * * * *